Feb. 21, 1961

R. L. PHELAN 2,972,444

FORM FEEDER AND MAGNETIC CODE READER
FOR AUTOMATIC ACCOUNTING MACHINE

Filed Sept. 20, 1957

INVENTOR.
ROY L. PHELAN

BY *J P Santo*

ATTORNEY

Feb. 21, 1961

R. L. PHELAN 2,972,444

FORM FEEDER AND MAGNETIC CODE READER
FOR AUTOMATIC ACCOUNTING MACHINE

Filed Sept. 20, 1957

INVENTOR.
ROY L. PHELAN

BY

*J P Santo*

ATTORNEY

INVENTOR.
ROY L. PHELAN
BY
JP Santo
ATTORNEY

INVENTOR
ROY L. PHELAN
BY
ATTORNEY

Feb. 21, 1961 R. L. PHELAN 2,972,444
FORM FEEDER AND MAGNETIC CODE READER
FOR AUTOMATIC ACCOUNTING MACHINE
Filed Sept. 20, 1957 29 Sheets-Sheet 6

INVENTOR
ROY L. PHELAN

BY JPSanto
ATTORNEY

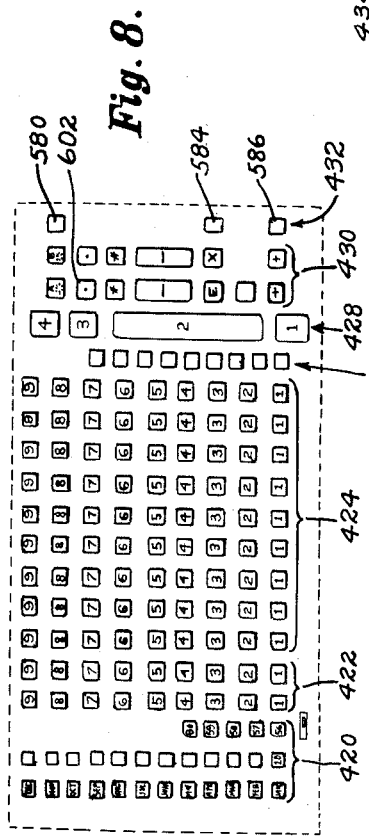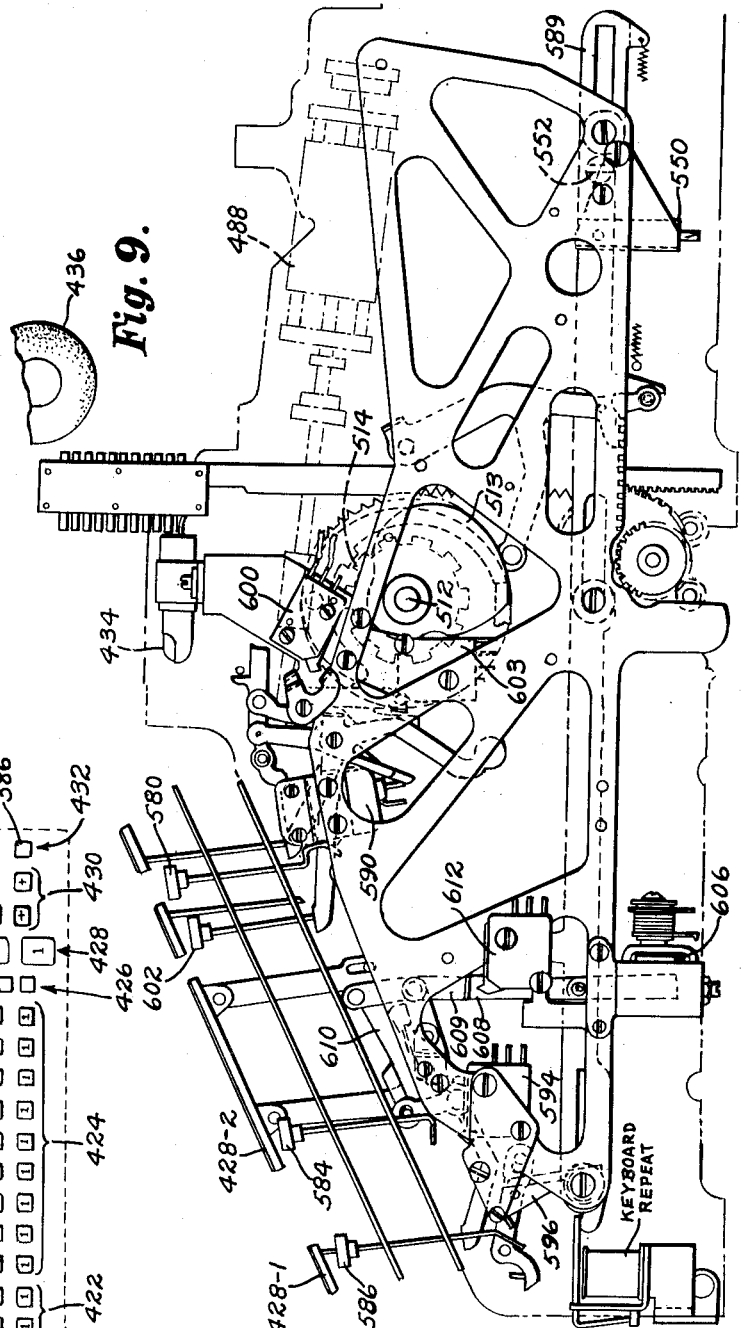
Fig. 8.
Fig. 9.
INVENTOR.
ROY L. PHELAN

Feb. 21, 1961

R. L. PHELAN 2,972,444

FORM FEEDER AND MAGNETIC CODE READER
FOR AUTOMATIC ACCOUNTING MACHINE

Filed Sept. 20, 1957

INVENTOR.
ROY L. PHELAN

BY

ATTORNEY

INVENTOR.
ROY L. PHELAN

INVENTOR.
ROY L. PHELAN

INVENTOR.
ROY L. PHELAN

ATTORNEY

INVENTOR.
ROY L. PHELAN
BY
JP Santo
ATTORNEY

Feb. 21, 1961 R. L. PHELAN 2,972,444
FORM FEEDER AND MAGNETIC CODE READER
FOR AUTOMATIC ACCOUNTING MACHINE
Filed Sept. 20, 1957 29 Sheets-Sheet 18

INVENTOR.
ROY L. PHELAN
BY
ATTORNEY

Feb. 21, 1961

R. L. PHELAN 2,972,444

FORM FEEDER AND MAGNETIC CODE READER
FOR AUTOMATIC ACCOUNTING MACHINE

Filed Sept. 20, 1957

INVENTOR.
ROY L. PHELAN
BY
JP Santo
ATTORNEY

INVENTOR.
ROY L. PHELAN

Feb. 21, 1961

R. L. PHELAN 2,972,444

FORM FEEDER AND MAGNETIC CODE READER
FOR AUTOMATIC ACCOUNTING MACHINE

Filed Sept. 20, 1957

| FIG.14 | FIG.15 |
|---|---|
| FIG.16 | FIG.17 |

Fig. 33.

| FIG.18 | FIG.19 | FIG.20 | FIG.21 | FIG.22 |
|---|---|---|---|---|
| FIG.23 | FIG.24 | FIG.25 | FIG.26 | FIG.27 |
| FIG.28 | FIG.29 | FIG.30 | FIG.31 | FIG.32 |

INVENTOR.
ROY L. PHELAN
BY
J P Santo
ATTORNEY.

United States Patent Office 2,972,444
Patented Feb. 21, 1961

2,972,444

FORM FEEDER AND MAGNETIC CODE READER FOR AUTOMATIC ACCOUNTING MACHINE

Roy L. Phelan, Phoenixville, Pa., assignor to Burroughs Corporation, Detroit, Mich., a corporation of Michigan Filed Sept. 20, 1957, Ser. No. 685,197

17 Claims. (Cl. 235—61.9)

This invention relates to a form feeder and magnetic code reader for business forms such as bank statements and ledgers of the type having numerical and other information stored in the form of magnetically polarized pulses on a magnetic tape thereon.

More particularly, the invention relates to means for automatically feeding magnetically coded documents past a reading station and sensing and transferring the information contained thereon to a variable storage listing and totaling device, the operation of which controls the automatic feeding of successive documents past the reading station.

The invention is shown in a data processing accounting system which includes an automatic sheet separating and feeding apparatus of the type disclosed in applicant's sole co-pending U.S. patent application S.N. 660,-231 filed May 20, 1957, now Patent No. 2,886,314, and an automatic accounting machine of the automatic old balance pick-up type disclosed in co-pending U.S. patent application S.N. 598,454, filed July 17, 1956, for W. W. Deighton et al., both of common ownership herewith.

The sheet separating and feeding device is adapted to separate and feed successive sheets from the top or front of a stack of magnetically coded documents past a magnetic reading head therein, which reads the encoded balance information stored in the form of magnetically polarized bits or pulses on a magnetically striped portion of a fed document and transfers this information electrically to the accounting machine. The accounting machine lists and prints the transferred information on a separate listing tape and accumulates this information for automatic trial balance operations or prints, accumulates and magnetically writes the transferred information on another magnetically striped document inserted therein for automatic balance transfer operations.

The invention seeks generally to mechanize accounting operations such as the taking of trial balance or balance transfer runs in which an operator must separately handle and read each document or statement card of a plurality of cards contained in a control classification account in order to list the final balance information from each card on an adding machine listing tape or to transfer the balance information to a new card for each individual account. Such operations not only require a considerable expenditure of time, but are subject to human errors in incorrectly reading the cards and/or incorrectly transferring the information therefrom.

While various systems have been proposed in the past for automatically transporting, reading and transferring information on documents to a fixed or variable storage device, such information has been in the form of punched holes, fluorescent spots or electrically conductive material, the handling of which has required mechanical synchronization of the feeding of the card with the available access time of the storage units in order to receive the information from the cards. Thus, any variation in the time during which the cards are conveyed through the reading station will cause errors in numerical transmission.

The apparatus employed in the present invention is characterized by self-synchronizing properties in that the timing of the transfer of the information is controlled by the card feeding through the reader section of the feeding apparatus. Thus, regardless of whether the card is early or late, all of the information contained thereon will still be sensed and transferred correctly. The pulses on the magnetically striped documents fed past the reader are arranged to generate their own timing track, thereby assuring correct distribution to the accounting machine, which operates only if a predetermined correct number of pulses are received from the form feeder and reader and controls the subsequent feeding of the next card in the feeder apparatus.

The form feeder and magnetic code reader is disclosed as an adjunct to the automatic accounting machine of the aforementioned Deighton et al. application and utilizes a minimum of additional controls and circuitry to permit information sensed by the magnetic code reader to be processed by the Deighton machine. Suitable controls interconnecting the two machines are provided to permit the Deighton machine to operate independently of or under the remote control of the form feeder and magnetic code reader to enable processing of magnetically encoded documents at rates much faster than heretofore humanly possible without the inherent errors attending such accounting operations as customarily performed.

Control means, discriminating against spurious pulses generated when the magnetic head intercepts the beginning and the end of the magnetic tape on a fed document, are provided in the aforesaid form feeder apparatus for detecting the presence of a card in the read station before the message on the tape has reached the magnetic sensing unit and for subsequently detecting the fact that the entire message has passed over the read head. A read control section and read check section, both contained in the accounting machine and operated in sequence under the remote control of the aforesaid control means of the feeder apparatus, respectively distribute the information pulses as they are received to an information storage section of the accounting machine and determine whether the correct number of pulses have been received and properly distributed prior to the initiation of an automatic accounting machine cycle during which the information stored is read into the accumulators of the accounting machine. Upon the completion of a successful read check operation in the Trial Balance mode of operation and the completion of a read check operation and the start of a magnetic write operation in the Balance Transfer mode, a card selection signal is supplied from the accounting apparatus to the feed section of the form feeder to initiate the automatic feed of the next card therein while the accounting machine is printing out the information sensed from the first card conveyed through the form feeder, thus resulting in overlapping cyclical operations of the two units of the system and enabling more rapid processing of forms therewith. Further means are provided to interrupt the operation of the form feeder apparatus when a misoperation occurs requiring the attention of an operator as in the case of a no-feed condition or jammed feed condition in the feeder or a misread operation in the accounting machine.

A preferred embodiment of the invention is described hereinafter by way of example with reference to the accompanying drawings in which:

Fig. 8 is a top plan view illustrating the keyboard layout of the accounting machine;

Fig. 9 is a side elevation view of the accounting machine illustrating various control switches employed therein;

Figure 14:
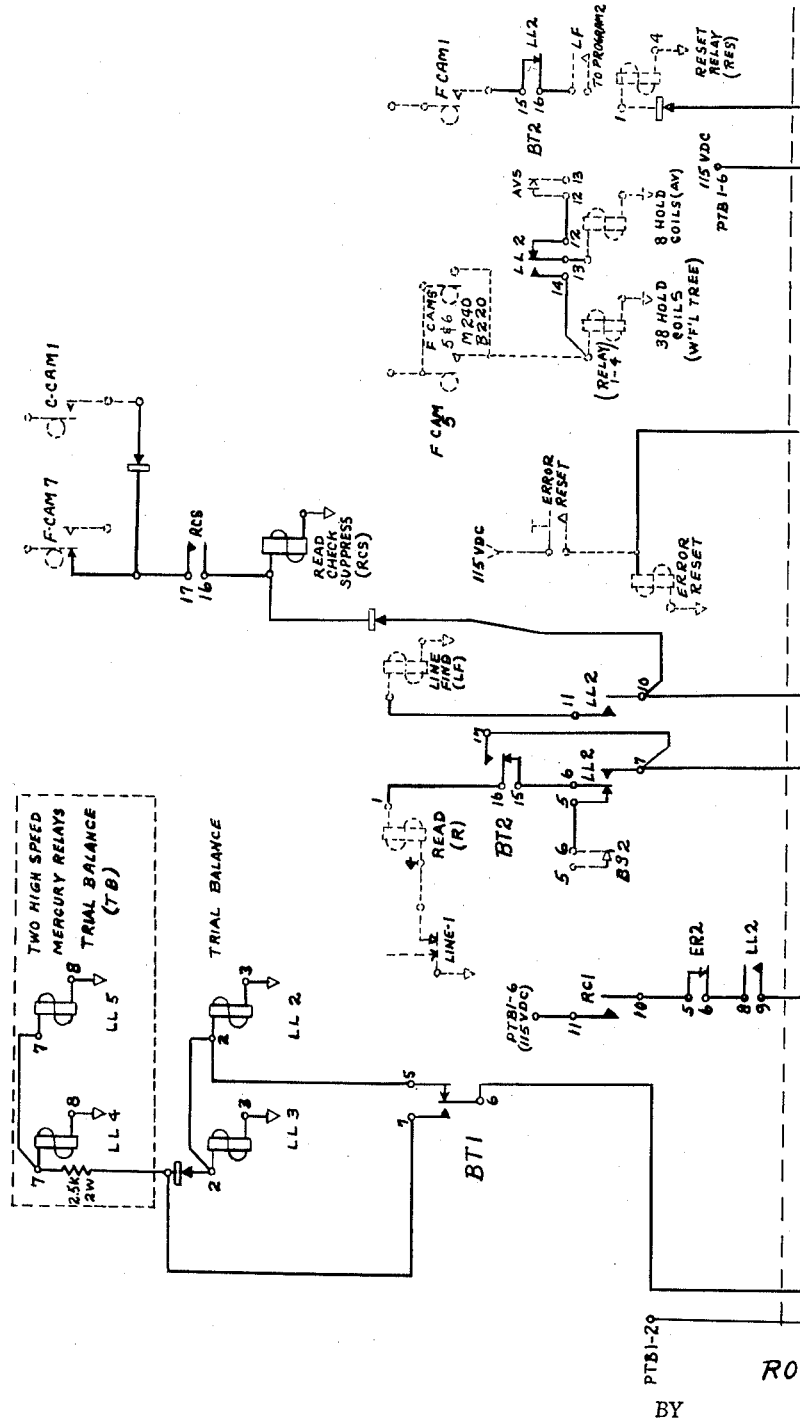
Figure 15:
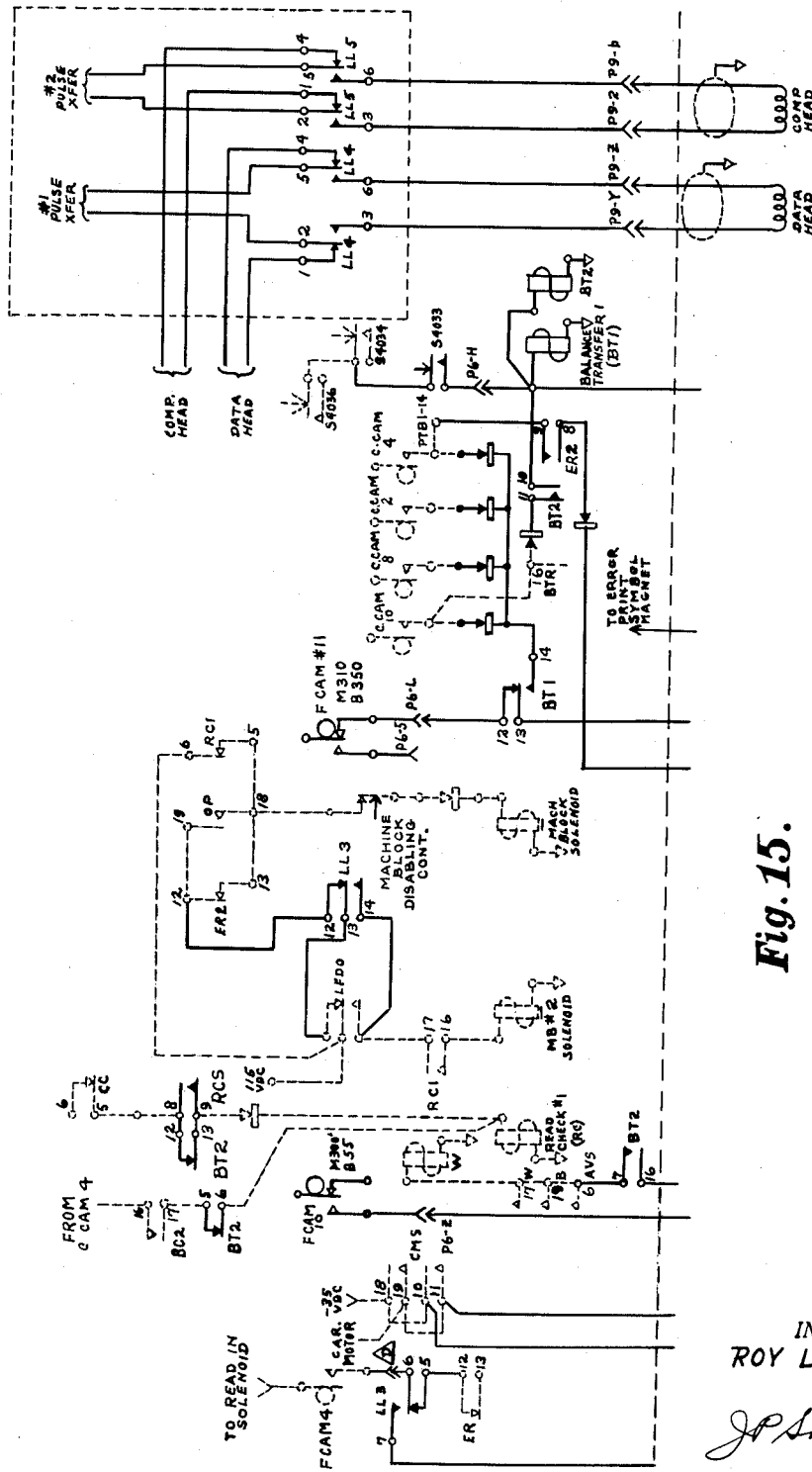
Figure 16:
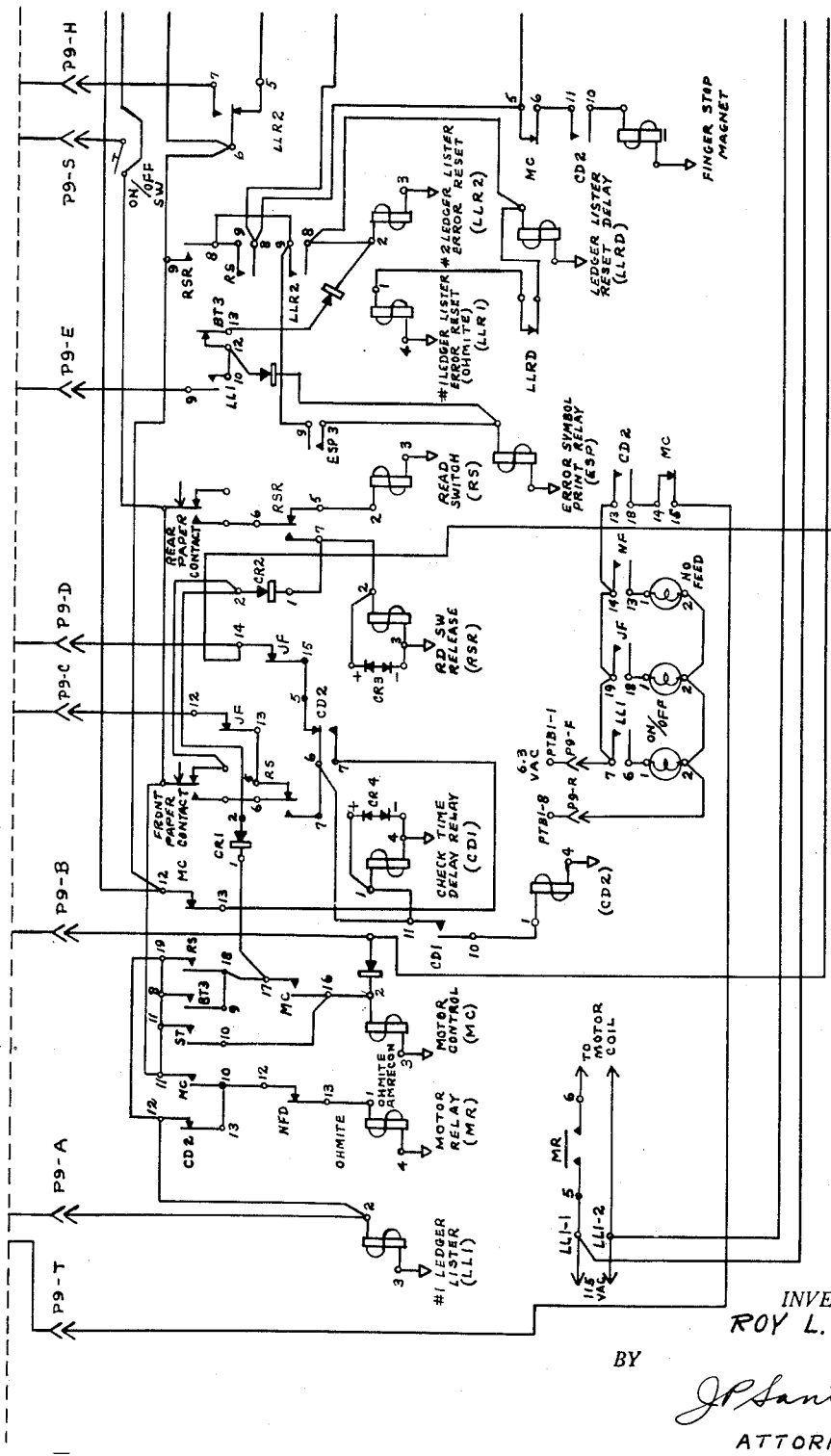
Figure 17:
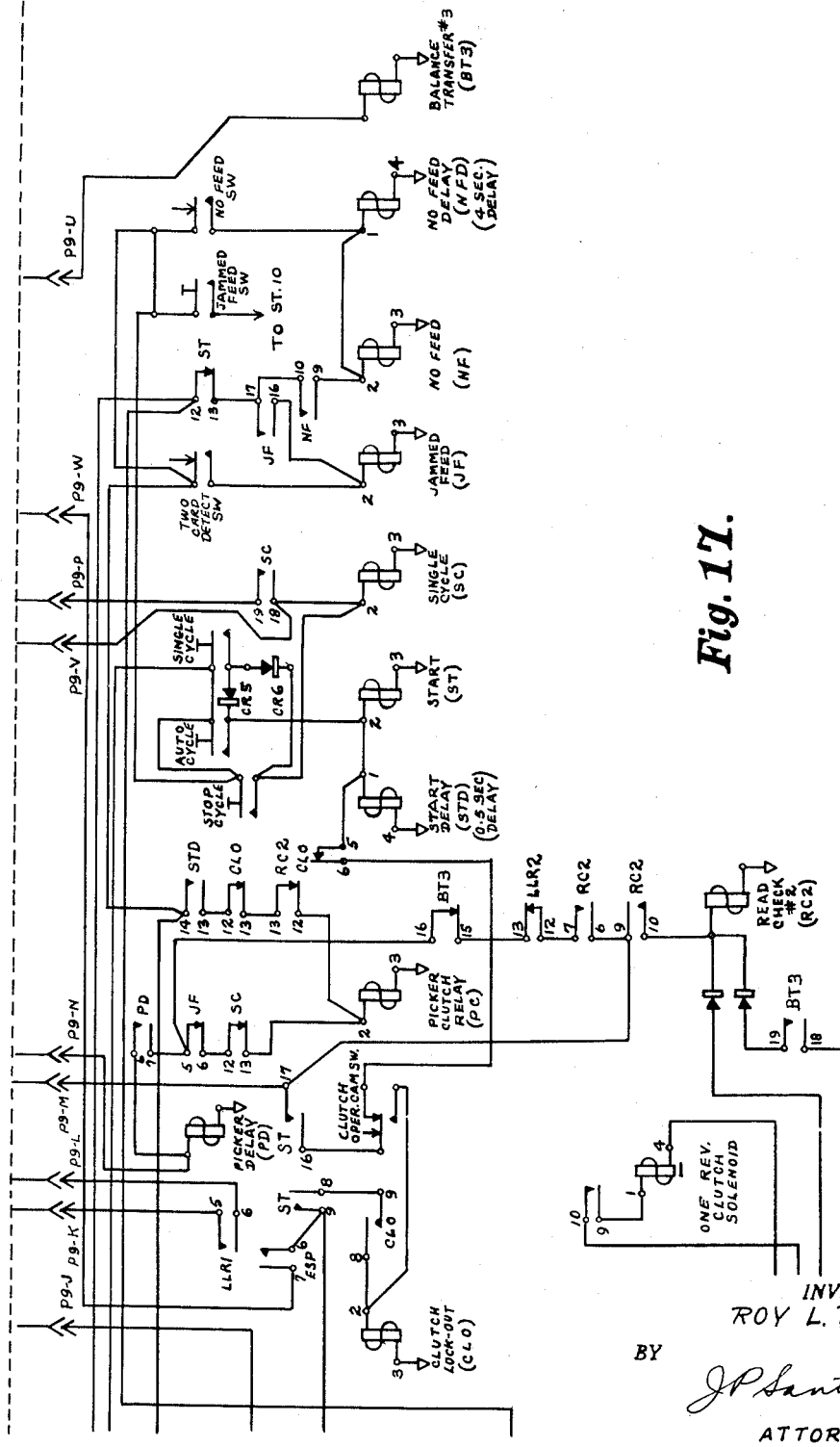

Figs. 14 to 17 inclusive constitute a schematic electrical diagram illustrating the components of the accounting apparatus directly associated with the components of the form feeder and magnetic code reader apparatus, the electrical control circuit wiring diagram of which is illustrated in Figs. 16 and 17;

Figs. 18 through 32 inclusive, constitute the schematic electrical circuit diagram of the control system of the accounting apparatus for use with the automatic form feeder and magnetic code reader apparatus;

Fig. 33 is a drawing sheet orientation chart for Fig. 18 to 32 and; Fig. 34 is a drawing sheet orientation chart for Figs. 14 to 17, inclusive.

The invention is illustrated herein embodied in a sheet separating and feeding apparatus 10 of the type set forth in applicant's co-pending U.S. patent application S.N. 660,231 filed May 20, 1957, now Patent No. 2,886,314, and an automatic accounting apparatus 12 of the type disclosed in the above-mentioned Deighton et al. application.

SHEET SEPARATOR AND FEEDER

The sheet separator and feeder apparatus 10, illustrated in Figs. 1 to 5, comprises a box-like frame 14, which is enclosed by a cabinet 15, that mounts an upright pair of laterally spaced, longitudinally extending side plates 16 and 17; a sheet stacker or pack advancer section generally indicated at 18; a suction type sheet separator and feeder section 20; and a sheet conveyor or advancer section 22. The pack advancer section 18 supports and presents a stack of magnetically striped work sheets indicated at S in Fig. 1 at one end of the machine to the sheet separator section 20 which separates and removes the top sheet from the pile and delivers it to a succession of longitudinally spaced lower feed rolls 24, 25 and 26, each of which is associated with a separate set of idler rollers 28, 29 and 30 respectively. The feeder section 20 delivers a separated sheet to the sheet advancer section 22 past a longitudinally spaced pair of paper actuated switches 32 and 34 and a magnetic reading head package 36 that is located between the said switches. The sheet advancer section 22 delivers the sheets in the same order in which they were separated to an adjustable form receiving, restacker chute 38 at the other end of the machine by means of a system of endless fabric belts or tapes 40, which encircle a tape drive roll 42 and a reversing drum 44 and are tensioned by spring loaded idler rollers, as 43.

Figure 3:
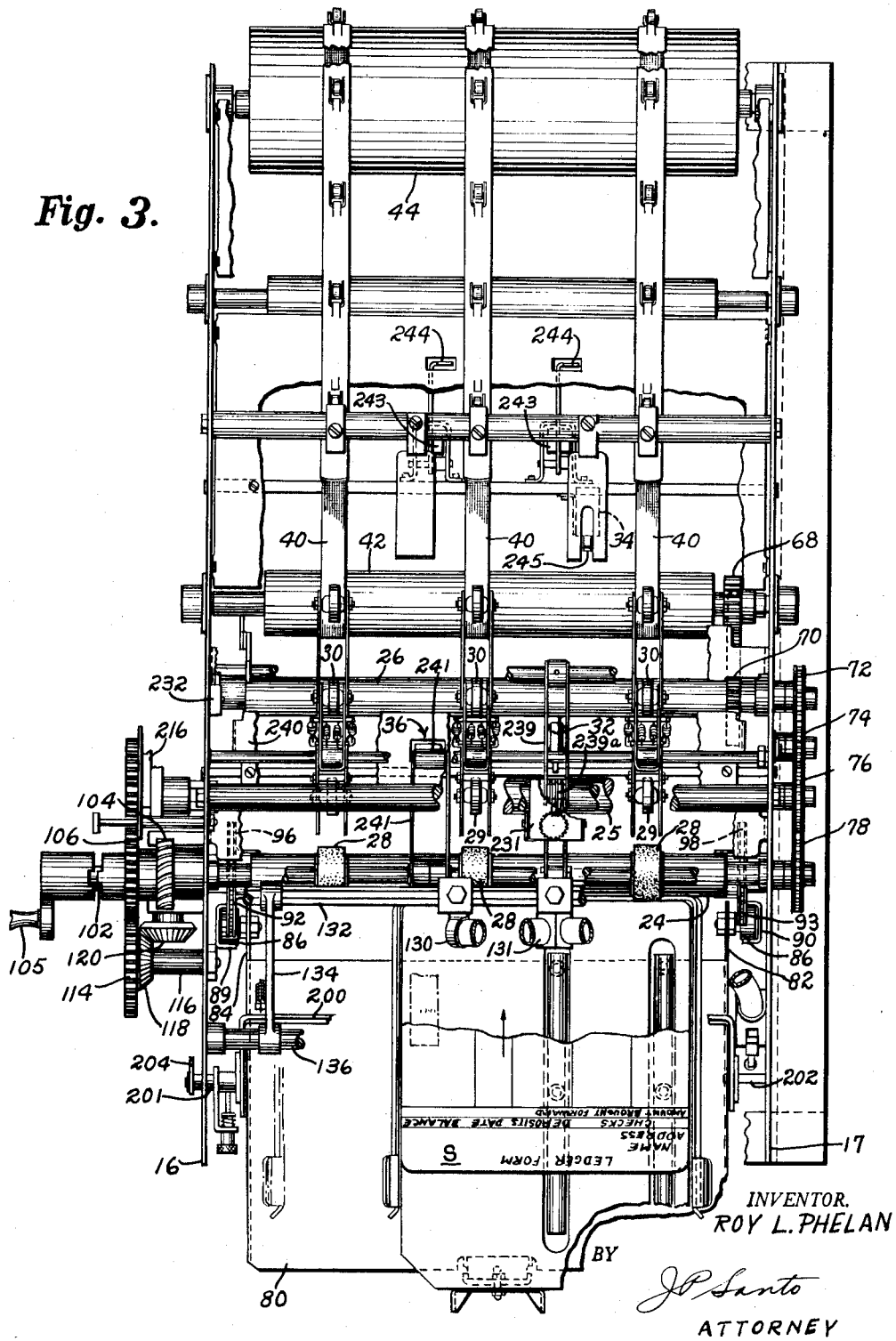
Fig. 3 is a top plan view with parts broken away of the sheet separator, feeder and reader apparatus.

The feed rolls of the sheet feeder section and the tape drive roll of the sheet advancer section are continuously driven from a drive motor 52, which drives a vacuum pump 54, a main drive shaft 56, and a power transmission 58 through an arrangement of associated belts, pulleys and gearing. Power is supplied from the transmission 58 to a ring gear 66 to drive a pair of pinions 68 and 70 secured to the tape drive roll 42 and to the lower feed roll 26, as indicated in Fig. 3 herein. Feed roll 26 mounts a sprocket wheel 72 on the outboard end thereof adjacent plate 17 and drives the lower feed rolls 25 and 24 through a chain belt 74, which links the sprocket wheel 72 and a pair of sprocket wheels 76 and 78 that are secured on the outboard ends of the feed rolls 25 and 24, respectively.

The pack advancer section 18 includes a horizontally disposed feed hopper 80 provided with depending side flanges 82, 84, each of which carries a pair of vertically spaced rollers 86, 87 that are guided for movement in a pair of verticaly extending, laterally spaced guide track channels 89, 90, and is supported by a pair of counterweighted chains 92, 93, which extend upward and around a pair of laterally spaced sprocket wheels 96, 98 mounted on a cross shaft 102 journaled in the side plates. Rotatably mounted on the outboard end of the cross shaft adjacent plate 16 is a manually operable lift crank handle 105, shown in Figs. 3 and 4, which is adapted to be brought manually into clutching engagement with the hub of an idler gear 106 rotatably mounted on shaft 102 to raise or lower the hopper 80. Idler 106 meshes with a gear 114, which is rotatably mounted on a laterally projecting stub shaft 116 secured to side plate 16 and has a bevel pinion 118 secured to the back face thereof. Pinion 118 meshes with a similar bevel pinion 120, which is drivingly secured to the shaft of a worm screw 107, shown in Fig. 4 to drive a worm gear 104 secured to the cross shaft 102, thereby raising or lowering the feed hopper 80 upon rotation of the lift crank handle 105.

Figure 4:
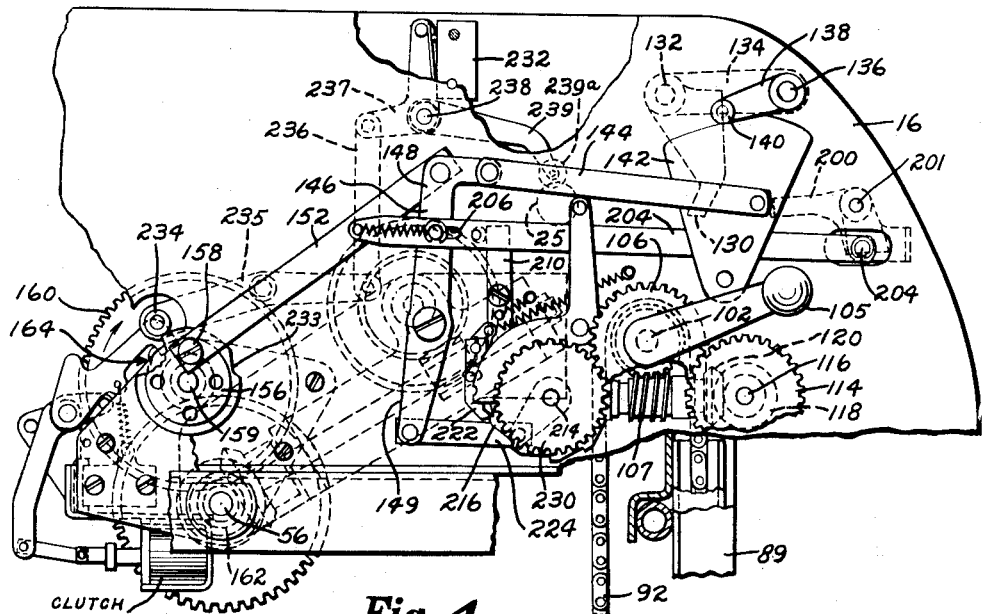
Fig. 4 is a fragmentary side elevation view illustrating some of the control mechanism of the form feeder apparatus.

The sheet separating section 20 includes a pair of suction feet 130, 131 mounted on a transverse rod 132 which is supported by a pair of spaced crank arms as 134 secured to a shaft 136 extending through side plate 16. Secured to the outboard end of shaft 136 is a lever 138 carrying a roller 140 which co-acts with a cam plate 142 pivotally mounted on the side plate 16, as indicated in Fig. 4. Cam plate 142 is adapted to be rocked about its pivot through a reciprocable link 144 upon energization of a solenoid actuated one-revolution clutch, indicated generally at 164, through which power is applied from the main drive shaft 56 and gears 162 and 160 to rotate a cross shaft 159, the solenoid together with its associated mechanism and the construction of the one revolution clutch being more fully described in applicant's aforementioned U.S. patent application S.N. 660,231, now Patent No. 2,886,314.

Figure 5:
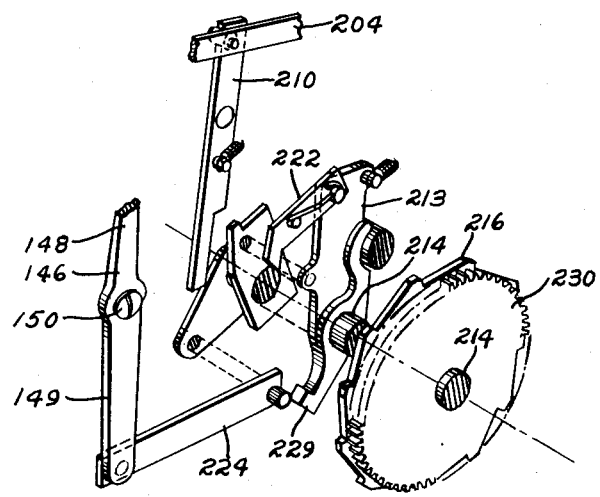
Fig. 5 is an exploded perspective view of a part of the operating mechanism of the form feeder apparatus.

Mounted on the outboard end of the shaft 159 adjacent plate 16 is a drive roller 156 having an eccentrically located stud 158 thereon to which is pivotally coupled one end of a drive link 152. The other end of the drive link 152 is pivotally connected to the upper arm of a bell crank 146, which is pivoted to the side plate 16 at 150 as indicated in Figs. 4 and 5. The upper arm of the bell crank 146 is coupled to the reciprocable link 144 to oscillate the shaft 136 through the cam plate 142 and roller 140. This action imparts a rocking movement to shaft 136 to lower and then raise the suction feet 130 and 131 which are swung thereafter in a clockwise direction to move a sheet from the top of the stack into the bite of the front feed rolls 24, 28, as more fully explained in U.S. Patent 2,561,030.

In order to raise the stacker or pack advancer section 18 and to maintain the top of the stack at a predetermined elevation as successive sheets are withdrawn therefrom, the sheet separator and feeder apparatus 10 also includes a stack height sensing mechanism which controls the automatic operation of a pack advancer mechanism through which power is applied from the lower end of the bell crank 146 to impart a rotative advancing movement to the cross shaft 102, as shown and described in U.S. Patent 2,358,560.

As indicated in Figs. 3, 4 and 5, the stack height sensing mechanism includes in general, a transverse bail 200 that is rotatably mounted at its offset ends on a pair of bail pivots 201 and 202. Bail pivot 201 extends through plate 16 and is pivotally coupled to a thrust link or bar 204, which is supportingly connected to the upper arm 148 of the bell crank 146 by a pin and slot connection indicated at 206. As the height of the stack falls below a predetermined height or position, the bail 200, resting on the top of the stack, swings downwardly about its pivot 201, to pull bar 204 to the right and, by this action, operates a trip latch 210 of the pack advancing mechanism to permit a link 224, which is pivotally coupled to the lower arm 149 of the rockable bell crank 146 to engage the foot 229 of a pawl carrier 213. The pawl carrier 213 is rotatably mounted on a shaft 214 having a ratchet wheel 216 secured thereto and carries a pivotable pawl 222 thereon, which engages a tooth of the ratchet wheel and advances the latter one tooth upon movement of the carrier by the link 224, as described more fully in applicant's aforementioned patent application S.N. 660,231, now Patent No. 2,886,314. Secured to the ratchet wheel 216 is a gear 230, which meshes with the gear 106 on cross shaft 102 and increments the movement of the shaft from the ratchet wheel operating mechanism as long as the trip latch 210 is retained in its unlatched position as determined by the height of the stack.

The operation of the above-described sheet separator and feeder apparatus 10 is controlled by a plurality of electrical components arranged by physical location at a card reading station, an error station, a control switch panel and a relay gate. The reading station located between the feed rolls 24 and 26 of the sheet feeder includes a Two Card sensing switch 231, a No (card) Feed sensing switch 232, the magnetic head package 36 and the front paper switch 32. The Two Card sensing switch 231 is a roller actuated switch located directly above the first feed roll 24 and is similar to that shown and described in U.S. Patent 2,393,614. It functions to sense a jam feed condition as where more than one card is fed from the sheet separator and, in the present invention, energizes a Jammed Feed Relay JF, which is located in the relay gate of the sheet separator and feeder apparatus, to interrupt a circuit over which electrical pulses sensed by the magnetic head package 36 from the cards conveyed through the sheet separator and feeder apparatus 10 are transferred to the accounting apparatus 12.

The No Feed switch 232 is mounted on the inner face of side plate 16 and is actuated from a cam plate 233 carried by the drive collar 156 on the output side of cross shaft 159 which is operatively driven from the main drive shaft 56 through the one revolution clutch, as previously described. The cam plate 233 cooperates with a roller 234, which projects through an opening in side plate 16 and is provided on one end of a bell crank 235 that is located inwardly of plate 16 and is coupled through a link 236 to another bell crank 237, as indicated in Fig. 4.

Bell crank 237 is rigidly secured to a shaft 238 which is journaled between the side plates 16 and 17 and drives a spring loaded arm 239 down against the form above the second feed roll 25. If the sheet separating mechanism has been actuated and a form has not been fed thereby, an annularly grooved roller 239a on the end of the arm 239 is permitted to drop into complementary annular grooves provided in the feed roll 25, permitting the switch 232 to close and energize a No Feed Relay NF and No Feed Delay Relay NFD contained in the relay gate of the machine 10.

Figure 11:
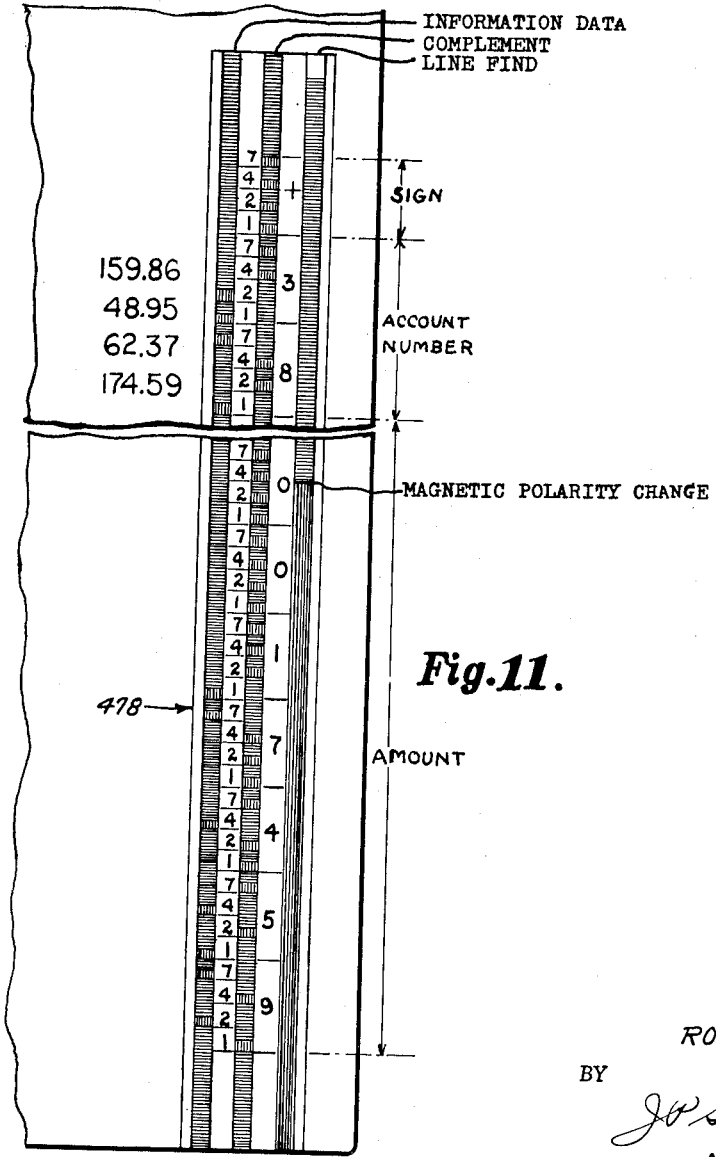
Fig. 11 is a fragmentary portion of the magnetic tape memory provided on the ledger form of Fig. 10 and illustrates the disposition of magnetic pulse bits of encoded information therein.

The reading head assembly 36 includes a pair of magnetic heads, which are similar in construction to the heads employed in the magnetic head package in the accounting machine and are mounted to sense the data track and complement track of the tape of Fig. 11. The heads are mounted with the air gap or tape engaging pole portions of the heads projecting through an opening in a bed plate 240, which is located above feed roll 25, and flush with the top of the bed plate. An idler roller 241 is located over the head assembly to hold the paper in position as it traverses over the magnetic head unit.

The front paper switch 32 senses the leading edge of the document or form being fed through the sheet separator and feeder apparatus 10 to indicate that the form is in proper position to allow signals from the read head package 36 to pass to a timing unit and an information storage unit in the accounting machine later described. The front paper switch is positioned under the bed plate 240 and is set so that its actuating arm 242 will be engaged by the bottom or leading edge of the fed form and will close the switch when the bottom edge of the form is just past, say ¼ inch, the read head 36, thereby assuring that the magnetic tape, which extends to the bottom edge of the form, will be over the read heads when the contacts of the front paper switch are caused to close.

The error station is located directly behind the read station in the line of feed and includes the back paper switch 34 and a pair of Finger Stop Magnets, as 243, which, when simultaneously energized, move a pair of fingers 244 into the path of the card being fed through the feeder apparatus, thereby stopping the card. The rear paper switch 34 is positioned so that its actuating arm 245 will engage the bottom edge of the fed form to actuate the switch when the bottom or leading edge of the form is, say, 6 inches past the air gaps of the magnetic read head assembly 36 and functions to actuate electrical controls which interrupt the circuit over which pulses from the magnetic heads 36 are transmitted to the timing unit and information storage unit in the accounting machine, as hereinafter more fully described.

Figure 1:
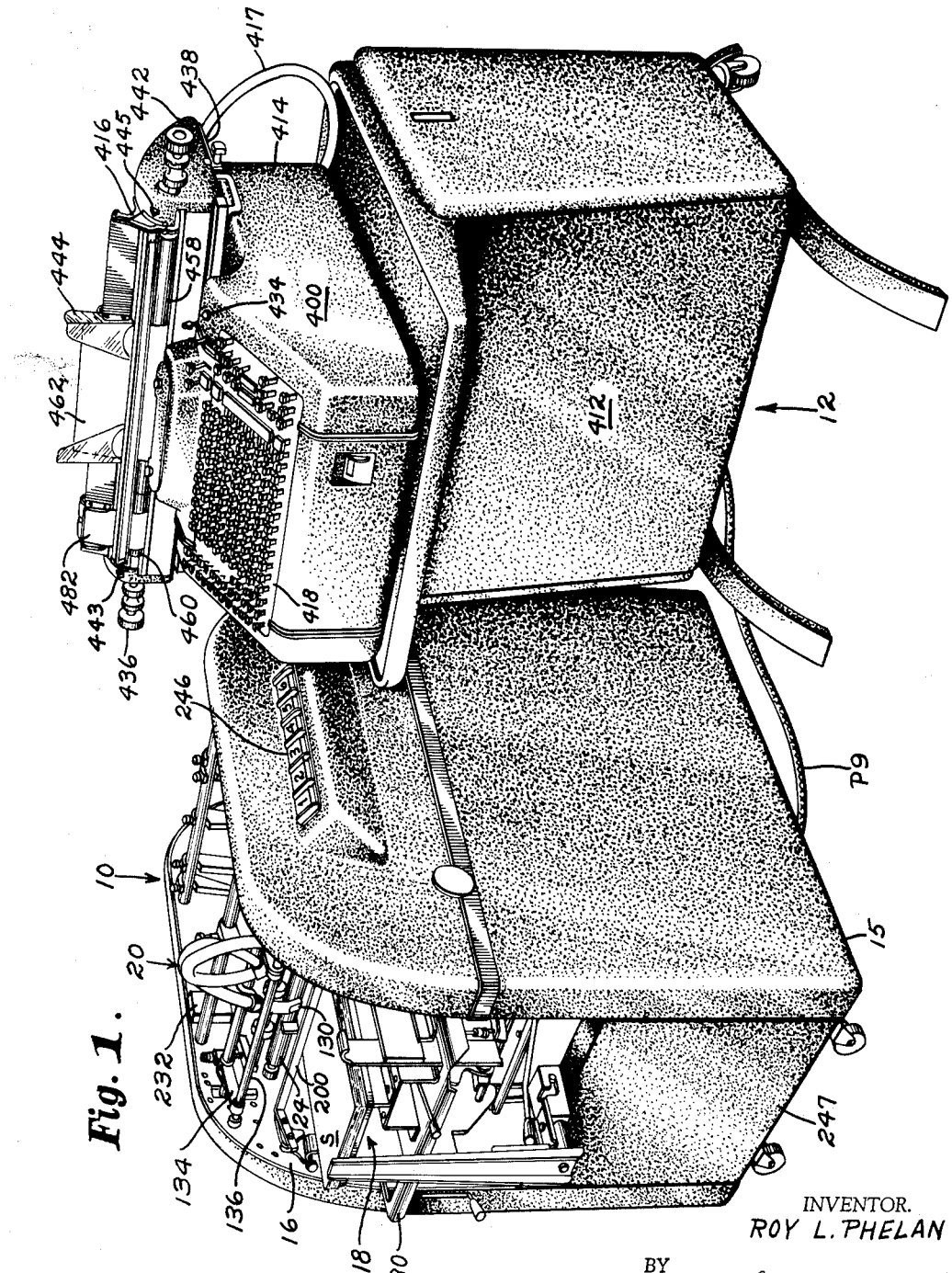
Fig. 1 is a perspective view of an automatic form feeder and magnetic code reader apparatus interconnected with an automatic accounting apparatus for accomplishing automatic Trial Balance Operations and Balance Transfer Operations in accordance with the present invention.
Figure 2:
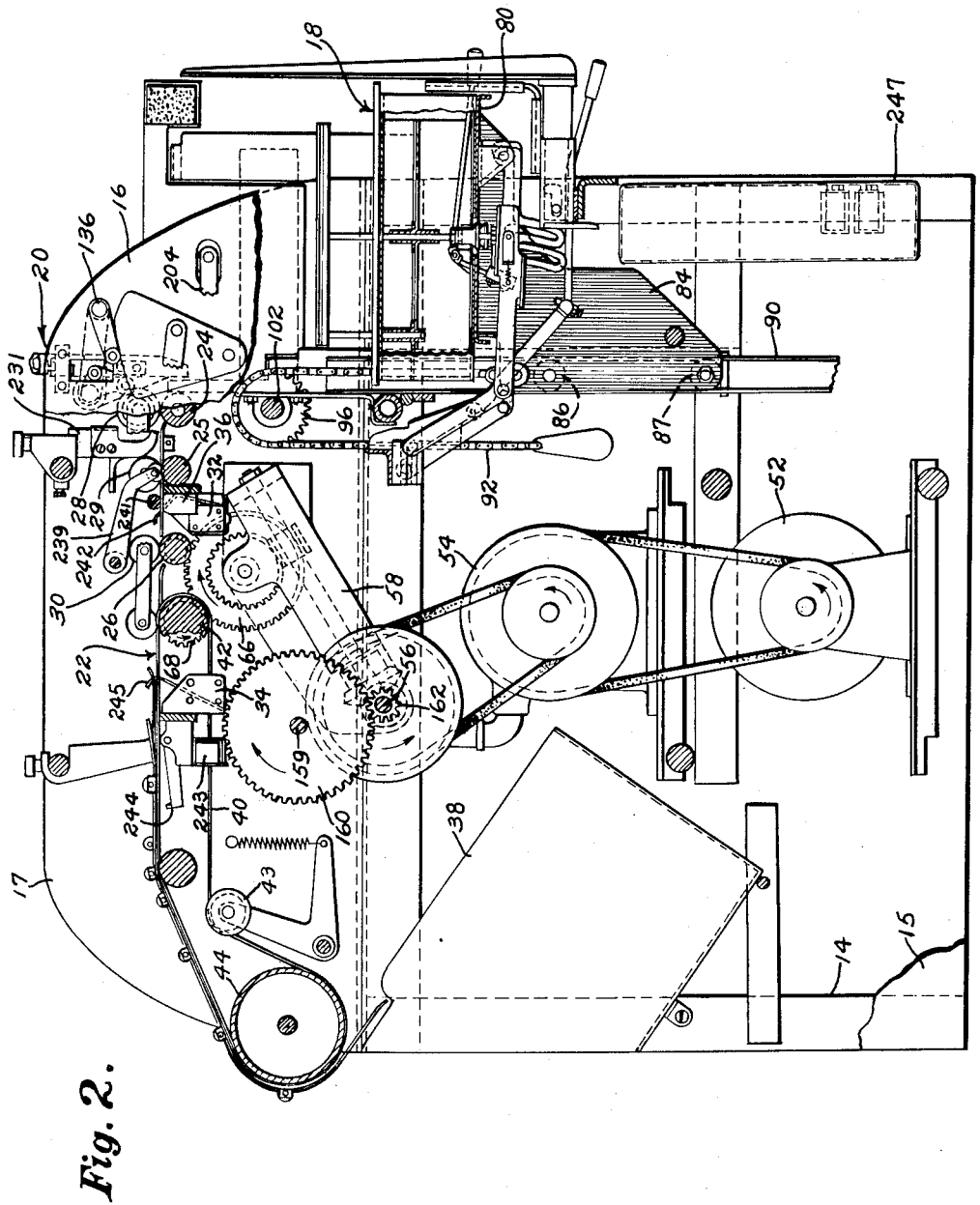
Fig. 2 is side elevation view with parts broken away of the form separator, feeder and reader apparatus.

The control panel illustrated at 246 in Fig. 1 comprises six, individually, manually operable push buttons including from left to right in the relative order named, an On-Off button 1, Single Cycle button 2, Auto Cycle button 3, Stop Cycle button 4, Jammed Feed button 5 and a No Feed button 6, each of which operates a separate switch to control various operations and functions of the sheet feeder apparatus 10 and are shown in the schematic electrical circuit diagram of Figs. 16 and 17 later to be described.

The relay gate 247 is a box unit, hinge mounted to the main frame of the machine 10 so that it can be swung out for ready access to the open back thereof on which is mounted a total of 22 commercially available electrical relays, which are listed in the relay Table I below, and a terminal board for wiring thereof as illustrated in the schematic electrical control circuit wiring diagram of Figs. 16 and 17, the operation of which will be later described.

Table I

| Relay: | Designation |
|---|---|
| #1 Ledger Lister Relay | LL1 |
| Motor Relay | MR |
| Motor Control Relay | MC |
| Checking Time Delay #1 | CD1 |
| Checking Time Delay #2 | CD2 |
| Read Switch Release Relay | RSR |
| Read Switch Relay | RS |
| Error Symbol Print Relay | ESP |
| #1 Ledger Lister Error Reset | LLR1 |
| #2 Ledger Lister Error Reset | LLR2 |
| Ledger Lister Reset Delay | LLRD |
| Clutch Lock-out Relay | CLO |
| Picker Delay Relay | PD |
| Picker Clutch Relay | PC |
| Read Check #2 Relay | RC2 |
| Start Delay Relay | STD |
| Start Relay | ST |
| Single Cycle Relay | SC |
| Jammed Feed Relay | JF |
| No Feed Relay | NF |
| No Feed Delay Relay | NFD |
| Balance Transfer #3 Relay | BT3 |

ACCOUNTING APPARATUS—ACCOUNTING MACHINE

The accounting apparatus 12 includes an accounting machine 400 supported on a posting desk unit 412, which houses various electrical components and circuitry for controlling various operations of the accounting machine. The machine includes a stationary base portion 414 and a movable carriage portion 416, which is mounted for travel on the base portion from left to right and return and is connected thereto by a cable 417. Except for certain modifications of the base portion and the carriage portion, which are described more fully in the aforementioned Deighton application, the accounting machine illustrated herein is a commercially available accounting machine manufactured by Burroughs Corporation of Detroit, Michigan, and is similar mechanically to the accounting machine described in U.S. Patent 2,629,549 filed in the name of T. M. Butler to which reference should be made for a detailed description of the mechanical structure and operation thereof.

The base portion 414 contains a keyboard 418 having a plurality of banks of depressible keys for indexing numerical and certain fixed information into the machine and several groups of motor bars and functional control keys for initiating various controls and accounting operations thereof. As indicated in Fig. 8, the keyboard includes three banks 420 of date and year keys on the left hand portion thereof, two banks 422 of account number verification keys, nine banks 424 of amount keys, a bank 426 of character or symbol keys, a bank 428 of four motor bar keys, two banks 430 of functional control keys also referred to as result keys, and an auxiliary bank 432 of special functional control keys which has been added to the right side of the keyboard of the Butler machine.

The carriage 416 of the modified accounting machine includes automatic form feeding, information sensing and altering, and certain machine controlling mechanisms enabling the carriage to be controlled by the record member inserted therein. The exterior structure of the carriage is generally similar to that described in the Butler patent and includes a platen assembly generally indicated at 436, an electromechanical control panel also called a program tray 438, a pair of extended side covers as 442, a paper guide or chute 444, and a pair of indicating lamps 443 and 445. Interiorly, the carriage structure comprises a form or document handling mechanism for automatically feeding the record medium into and out of the carriage and means for sensing recorded data stored magnetically or otherwise on the record member. As viewed in Figs. 6 and 7, the major components of the carriage include a carriage drive motor 446, a main program cam shaft 448, a series of front feed rollers indicated generally at 450, a series of paper drive rollers indicated generally at 452, and several paper sensing electrical switches 454, 455 and 456.

Figure 10:
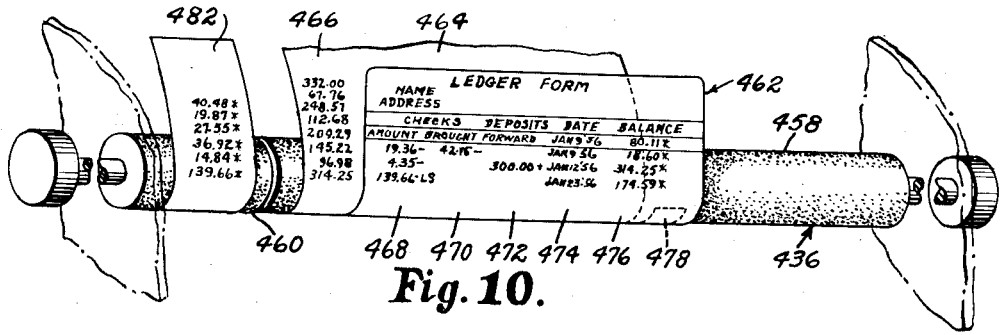
Fig. 10 illustrates a ledger form provided with a magnetic memory portion such as may be used with the accounting machine employed herein.

The platen assembly 436 is split into two sections, 458 and 460, which are mounted for independent relative rotation about a common axis as described in the aforementioned Deighton application, and is adapted to be rocked bodily into contact with or slightly away from a series of front pressure rollers 450, as described in the Butler patent. As indicated in Fig. 10, the longer right hand platen section 458 receives a document or record member such as a bank statement or ledger form 462 and a carbonized journal web or sheet 464 underlying all but the right hand portion of the ledger form, as shown. Reading from left to right on the overlapping journal sheet and ledger form, there is provided a column on the journal sheet indicated at 466 for dates and old accounting balances, only the old balances being illustrated. On the ledger form 462 there are provided two check entering positions 468 and 470, a deposit entry position 472, and finally a position for dates 474 and new balances 476.

Of particular significance is the provision on the ledger form 462 of an erasable memory or storage portion, indicated in dotted outline 478, upon which information may be stored and later removed. For banking purposes, this memory portion may temporarily store the last new balance which then becomes the old balance when a new transaction is entered on the ledger form. The information storage portion 478 comprises a coating of magnetic material arranged in a narrow, elongated strip or column, which extends to the bottom edge of the form and is preferably located on the back or reverse side and adjacent the right hand margin thereof.

The shorter left hand platen section 460 receives an adding machine tape 482 on which check entries may be listed for obtaining a subtotal.

ACCOUNTING MACHINE—BASE STRUCTURE

Figure 6:
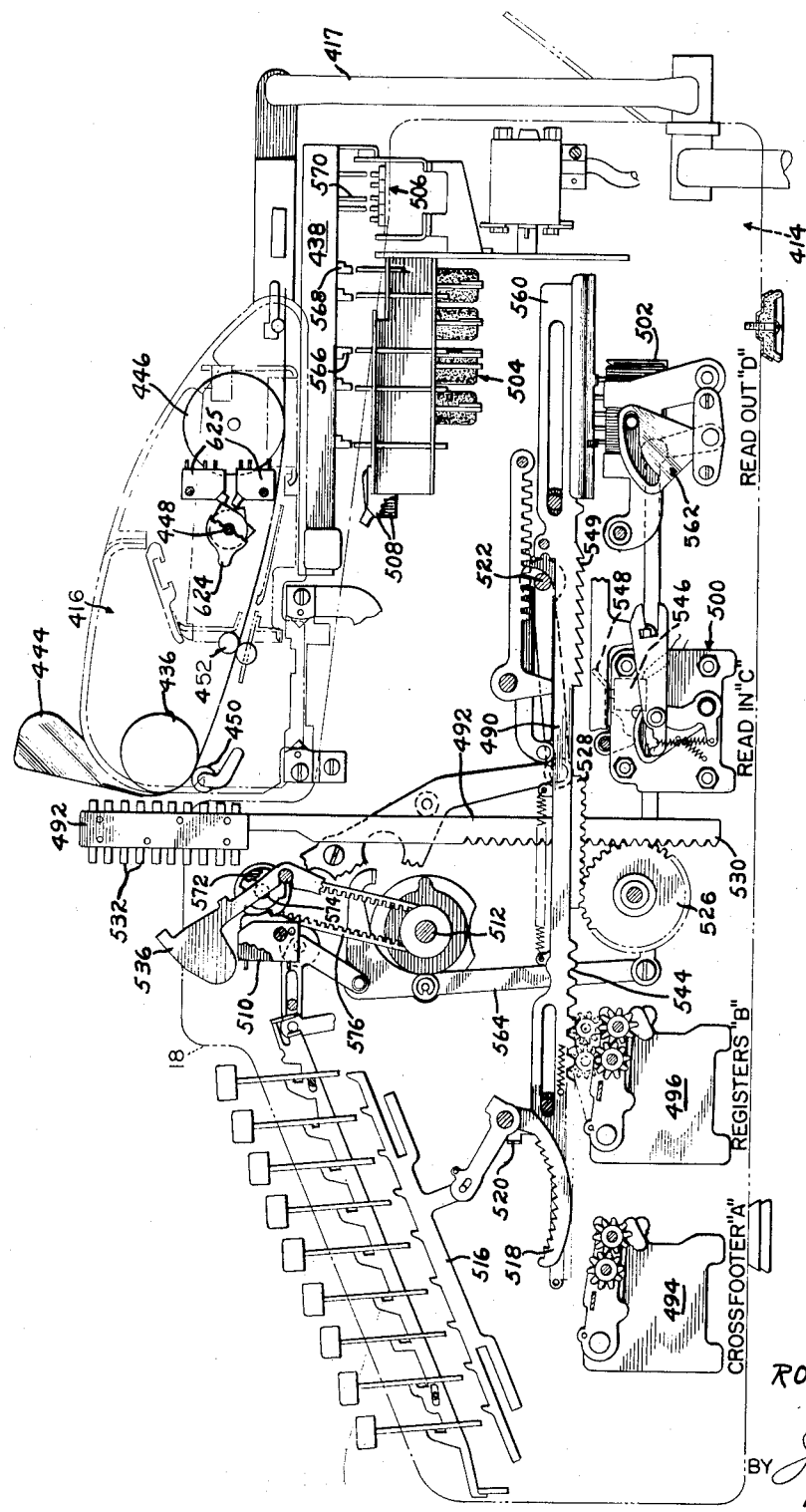
Fig. 6 is a diagrammatic side view of the modified accounting machine of the accounting apparatus employed with the automatic form separator, feeder and reader apparatus of Figs. 2 to 5 to obtain automatic Trial Balance and Balance Transfer Operations in accordance with the present invention.

Referring to Fig. 6, the base structure of the accounting machine includes the keyboard 418, an electric drive motor 488, a plurality of horizontally extending actuator racks 490, a plurality of vertically extending print bars 492 and a pair of accumulators or register units 494, and 496, all of which are contained in the Butler machine. As described in the aforementioned Deighton et al. application, the base portion has been modified to include a read-in unit 500, a read-out unit 502, a bank of tappet control solenoids 504, a bank of carriage position operated lane switches 506, a pair of "in-tab" switches 508, and a bank of timing switches 510.

The drive motor 488 indicated in dotted outline in Fig. 9 transmits power to a cam shaft 512 through a one revolution clutch 514, as described in the Butler patent. Depression of a motor bar or operational control key trips the clutch to apply the motor drive and rotate the cam shaft 512, which is the main controlling instrumentality of the Butler machine and carries a plurality of timing cams, as 513, thereon that actuate various mechanisms and index various machine functions at their proper times during the machine cycle.

Associated with each bank of keys, to the left of the motor bars, is a separate index strip as 516 which is permitted to move rearwardly upon rotation of the main cam shaft 512 to limit on the stem of a depressed key of a bank of keys associated with that strip as indicated in Fig. 6. Movement of the strip 516 rotates a differential stop sector 518, which is coupled to the strip, into the path of a formed ear 520, one of which is provided on each of the actuator racks 490. Extending transversely through all of the racks is a reciprocable actuating rod 522 which is moved upon rotation of the main cam shaft by a cam follower linkage mechanism as indicated in the Butler patent, to permit forward movement of each of the actuator racks to individual positions determined by the index strip and differential stop sector provided for each rack.

Forward movement of each rack rotates a bull gear 526 that meshes with a toothed portion 528 of an associated rack and a toothed portion 530 provided on the lower end of an associated print bar 492 carrying a plurality of longitudinally movable type slugs 532 on the upper end thereof, a separate print bar being provided for each actuator rack. Each print bar is thus elevated to a position where a type slug 532 corresponding to the value of a depressed key of a bank of keys associated with a particular print bar may be struck by a pivotally mounted hammer 536 to leave an impression upon the recording medium interposed between the type slugs and the platen assembly 36.

The accumulators 494 and 496 located in the Register A and Register B positions, respectively, are illustrated as being of the so-called crossfooter variety, each of which includes a plurality of spaced sets of meshed pinions, as 540 and 542, which, either through depression of various ones of the result keys or under the control of the program panel 438, are selectively adapted to be brought into mesh with another toothed portion 544 of each amount rack during either the forward or return movement thereof for effecting different calculating operations, as described more fully in the Butler patent.

The read-in unit 500, shown located in the Register C position, serves to convert electrical signals into rack positions in determining quantities to be printed or entered into the machine and comprises a series of nine solenoids as 546, one of which is provided for each of the nine amount racks of the machine. Each of the rack stop solenoids has a clapper 548 which is adapted to engage any one of a series of ten buttress teeth 549 provided on each actuator rack and to stop the rack when the energizing circuit for the solenoid is interrupted through a timing generator, indicated at 720 in Fig. 22 herein. The read-in unit, including the timing generator, is disclosed and claimed in co-pending U.S. patent application of Bradshaw S.N. 492,186 filed March 4, 1955, now Patent No. 2,822,752, for Indicating Apparatus assigned to the present assignee, to which reference may be made for a detailed description of the construction and operation of these components.

The read-out device 502, illustrated in the Register D position, is disclosed and claimed in co-pending U.S. application S.N. 492,232, filed March 4, 1955, now Patent No. 2,914,759, in the name of Deighton et al. entitled Data Storage, Read-Out and Transfer Apparatus, assigned to the present assignee and comprises a bank of eleven decimal switch units, which serve to sense the mechanical positions of the racks associated with the account number and amount keys. Each decimal switch unit includes five, single-pole, three-position switches, each having a contact arm, which is connected to a common input terminal and is adapted to be selectively actuated by a coded slide arrangement 560 provided on each actuator rack to contact one of a stationary pair of output contacts associated with each contact arm, whereby the input terminal may be selectively connected to any one of ten decimal output terminals in accordance with the position of the rack associated with a designated decimal switch unit. The bank of decimal switches is mounted on a rocker assembly 562 and cam actuated linkage 564 operated from the main cam shaft 512 of the base portion of the machine and is caused to move into engagement with the racks after the racks have moved to the position determined by the keyboard and/or the accumulators and after the racks have stopped in a forward direction. The engagement of the decimal switch units with the racks causes one of the movable switch contact arms of each decimal switch unit to close against one of its associated stationary contacts corresponding to a quanity indexed into an associated bank of keys, producing an electrical indication of the positions of the racks when a source of potential is applied to common or input terminal of the decimal switch unit. This information is retained in the individual decimal switch units upon completion of the base machine cycle after the racks have been restored to their normal positions at the rear of the machine.

Figure 24:
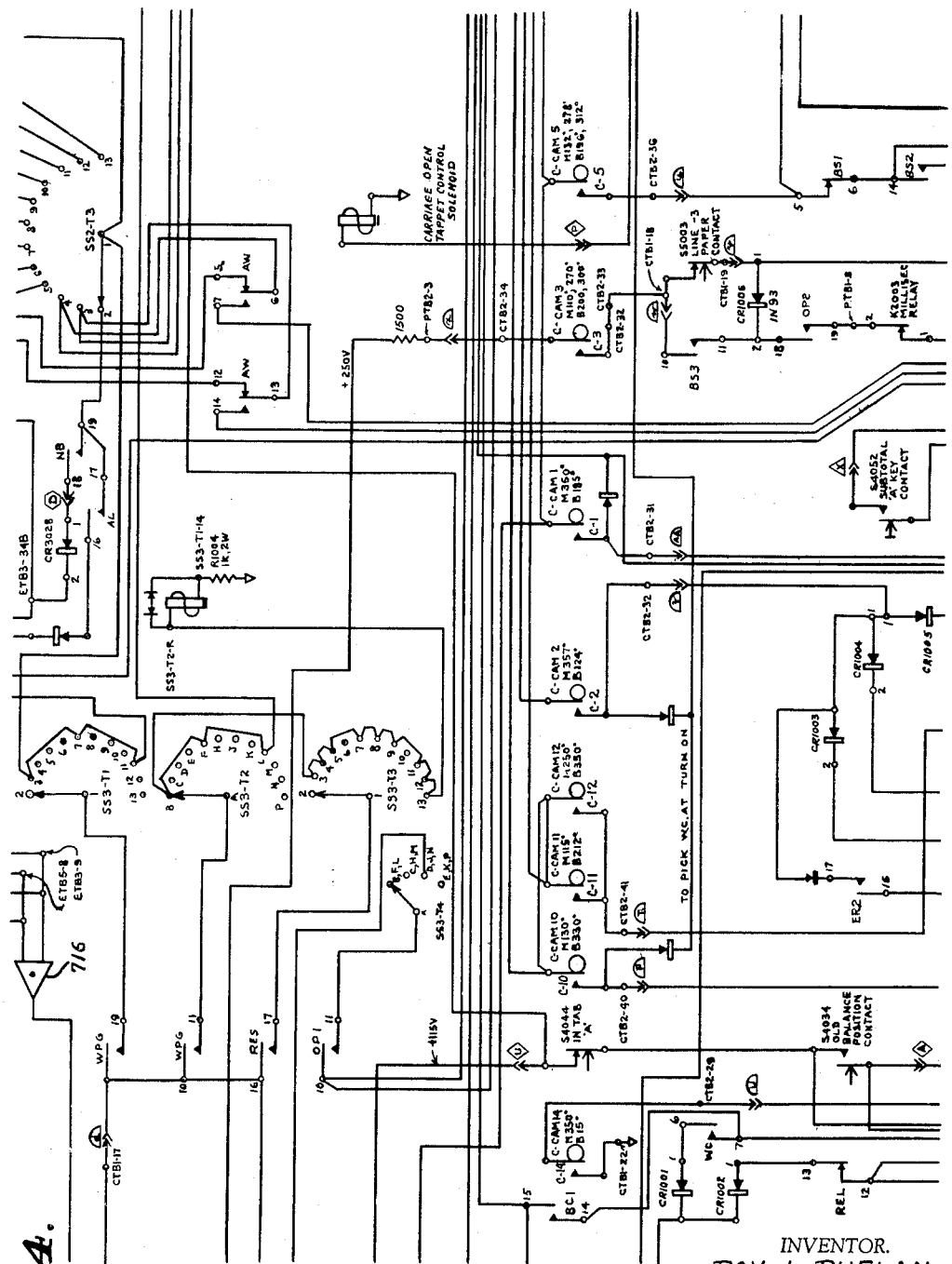
Figure 25:
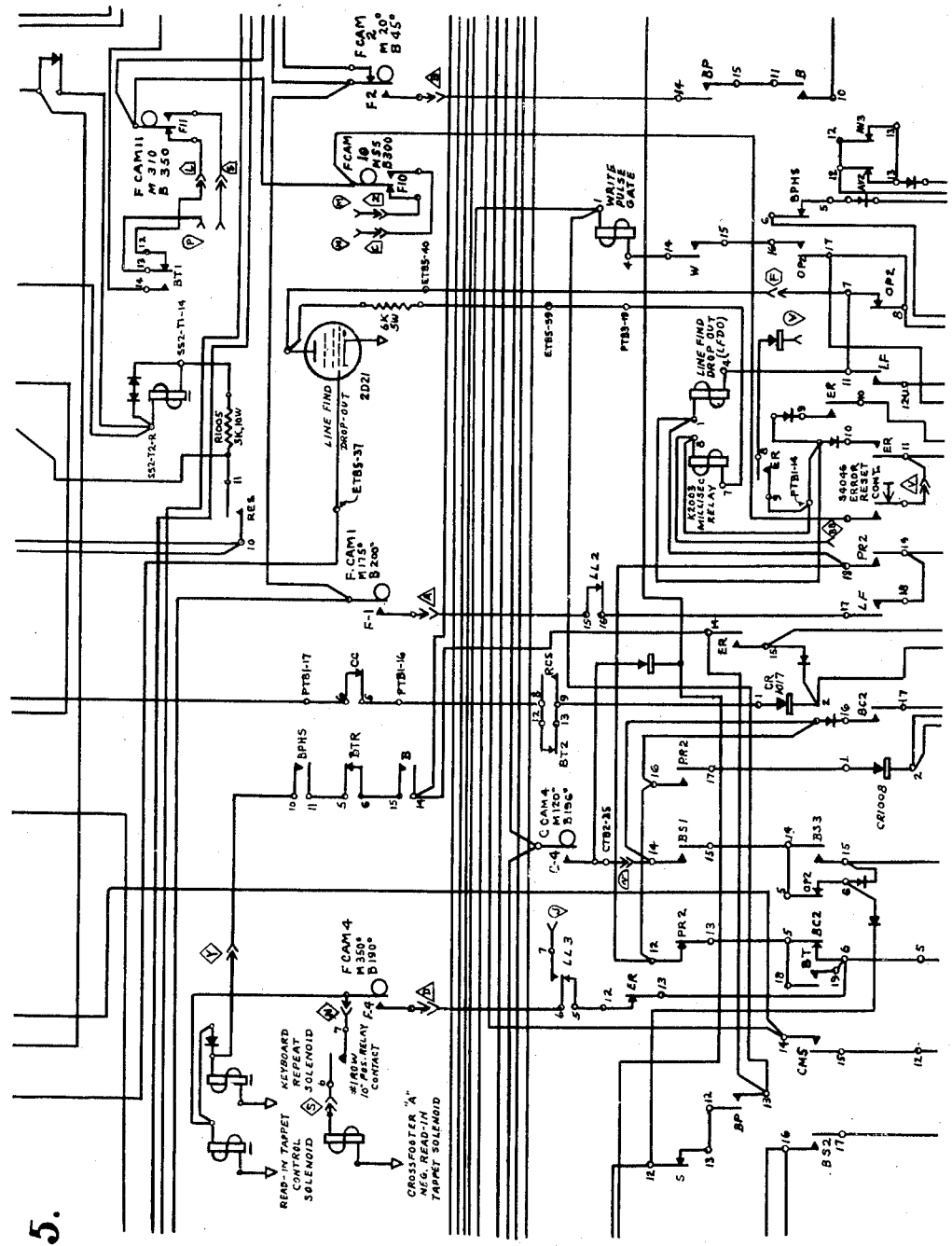

The tappet control solenoids 504 shown in Figs. 6, 24 and 25 are illustrated and described in co-pending U.S. application S.N. 492,266 filed March 4, 1955, now U.S. Patent 2,836,355 for Remote Function Control System in the names of Banik et al. assigned to the present assignee and serve to control various functions of the accounting machine including read-in, keyboard repeat, carriage open, and crossfooter A subtract, as described in the aforementioned Deighton et al. application S.N. 598,454, hereafter referred to as the principal Deighton application. The tappet control solenoids cooperate with depending pins 566 on the under side of the control panel 438 of the Butler machine and enable information to be read into the machine independent of carriage position.

The control panel 438 is actually a part of the carriage of the machine and comprises a rectangular, inverted shallow pan having a plurality of laterally and longitudinally spaced control pins as 568 depending therefrom. The control pins are of several different lengths and cooperate at preselected positions of the movable carriage with a sensing mechanism, which includes a series of sensing tappets, bell cranks and associated levers to effect various automatic functional controls of the machine similar to those effected by manually depressing various ones of the functional control keys, as described in the Butler patent.

The bank of lane switches, illustrated at 506 in Fig. 6, cooperate with an additional set of control pins 570, which have been added to extend the capacity of the control panel of the Butler machine, and are adapted to be selectively actuated as the carriage and control panel move transversely back and forth to provide various electrical indications in accordance with the carriage positions.

The in-tab switches indicated diagrammatically at 508 in Fig. 6 herein, are utilized to provide an electrical indication in the control system of the modified accounting machine to signify that the carriage has stopped in a tabular position and are more fully shown and described in the aforementioned principal Deighton application.

The bank of timing cam switches 510 contained in the base portion of the modified Butler machine is illustrated and described more fully in connection with Figs. 100–104 of the aforementioned principal Deighton et al. application S.N. 598,454 and are utilized to control electrical circuits over which electrical signals are provided dependent upon cam shaft rotation. The timing switches are actuated by a series of spaced cams 572 carried by an auxiliary cam shaft 574 which is driven by a pulley and toothed timing belt arrangement 576 from the main cam shaft 512 of the Butler machine.

The keyboard 418 of the accounting machine is generally similar to that illustrated in the aforesaid Butler patent except for certain ones of the functional control keys located along the right margin of the keyboard to provide certain desired features and functions. As indicated in Figs. 8 and 9, the additional control keys include a latch down on-off key 580, a momentary reset key 584 and a latch down type account verification key 586, each of which cooperates with a separate electrical switch, 590, 594 and 596, respectively.

Above the on-off key 580 is a ready-light 434, which is illuminated after depressing the on-off key. Motor bar 428-1, the new balance bar, actuates a momentary electrical switch 600 when the motor bar is depressed to supply an electrical control signal and initiate a machine cycle to cause the machine to print the new balance.

A similar momentary switch 603 has been added to the subtotal A key (A*) 602 such that when it is depressed the switch will close and give an electrical signal that initiates a subtotal operation called for by the operator.

To provide automatic motor bar operation of the Butler machine, the Checks motor bar 428-2 is operated by a solenoid 606, the energization of which draws its plunger 608 downwardly to pull links 609 and 610, thus depressing the bar, and actuates a switch 612 to give an electrical indication of this operation.

The machine also includes a machine block solenoid and associated mechanism shown and described in connection with Figs. 99-101 of the aforementioned Deighton et al. application S.N. 598,454 which serves to prevent the machine from initiating a subsequent accounting cycle through the depression of a motor bar while the machine is still cycling from a previously initiated machine cycle.

The accounting machine also includes means for sensing the sign of the amount entered into or retained in the base machine in accordance with the position of the A symbol slide 589 of Fig. 9, herein based upon Fig. 92 of the aforementioned principal Deighton application. As more fully described in the Butler patent, when the machine cycles, the A slide 589 is spring urged forward and, when a negative balance has been computed, the slide will stop at one position at which a minus sign will be printed. Longitudinal movement of the symbol slide causes a camming member 552 to close a negative balance and accounting switch 550 providing an electrical indication of the fact that a negative amount has been entered in the A crossfooter. Should the sign of the number be positive, the A symbol slide will stop in another position and an electrical circuit will not be completed through the switch.

ACCOUNTING MACHINE—INTERNAL CARRIAGE STRUCTURE

The internal structure of the carriage portion of the automatic accounting machine is described more fully in the aforementioned principal Deighton et al. application S.N. 598,454 and comprises a form or document handling mechanism for automatically feeding the magnetically striped record medium into and out of the carriage and means for sensing recorded data stored magnetically or otherwise on the record member 462 inserted in the guide chute 444. In addition to the platen assembly 436, the major components of the carriage illustrated in Figs. 6 and 7 herein, include the carriage drive motor 446, the main program cam shaft 448, a paper feed drive roller assembly 452, a multiple magnetic head assembly 453, a front paper sensing switch 454, and a pair of rear paper sensing switches 455 and 456.

The carriage drive motor 446 is operably coupled through a gear box 616 to drive both the main program cam shaft 448 and the paper feed drive shaft 486 when a record medium is inserted into the machine as sensed by the front paper sensing switch 454. Located immediately adjacent the output side of the carriage drive motor is an emitter or rotary contactor pulser unit 618, which serves to provide discrete square wave pulses for writing coded information through the magnetic head assembly 453 on the magnetizable parts of the documents handled by the carriage and constitutes a synchronizing element between the paper and the pulse writing equipment.

The carriage program cam shaft 448 is driven from the output of the carriage drive motor 446 through a one-revolution, solenoid actuated clutch 620 having a driven portion, which is connected to the output of the motor through the gear box 616, and an engageable portion, which is coupled to the cam shaft through a 5 to 1 reduction worm gear and arrangement indicated at 622 by means of which the carriage program cam shaft 448 is rotated ⅕ revolution or 72° of each cyclical revolution of the clutch. As the machine operates automatically, the carriage cam shaft rotates in four discrete steps, the first step extending from 0° to 144°; the second 144° to 216°; the third from 216° to 288°; and the fourth from 288° to 360°. The cam shaft 448 is the main controlling element of the carriage and carries a plurality of mechanical timing cams, which control the motions of various elements of the carriage, and a plurality of electrical timing cams 624, which operate a series of momentary contact type electrical switches 625 located at the right side of the carriage behind the cam shaft. These switches, called the carriage program cam switches, complete electrical circuits to route electrical signals to various remote parts of the control system for the accounting machine apparatus as required for automatic operation thereof.

The mechanism for automatically moving the ledger statement forms into and out of the carriage includes a positive engagement, magnet operated reverse clutch 626, which is continuously driven from the drive motor through the gear box 616, and a magnetically actuated, bi-directional, fractional revolution form feed drive clutch 628, which drives the paper feed drive shaft 486 on which is mounted a series of laterally spaced lower drive rollers 630, 632, 634 and 636 of the paper drive roller assembly.

The reverse clutch 626 is more fully shown and described in connection with Fig. 17 of the principal Deighton application and is adapted to drive the form feed drive clutch 628 in either one of two directions in accordance with the condition of energization of the operating magnet 627 of the reverse clutch.

The form feed drive clutch 628 is the subject of copending U.S. application S.N. 536,121 filed September 23, 1955, now Patent No. 2,927,670, in the name of R. A. Wallace for a Fractional Revolution Bi-Directional Clutch and is provided in order to stop and to start the form on discrete lines, since the reverse clutch 626, from which the form feed drive clutch is driven, is continuously rotating.

The drive rollers 630, 632 and 636 cooperate with a series of retractable idler rollers 640, 642 and 646, to grip and drive the paper into and out of the carriage, while the roller 634 backs the similarly retractable magnetic head assembly 453. The magnetic head assembly serves to read certain information including sign information, account number information, old balance information and line find information, the latter serving for automatically indexing the platen to the first available line of a previously coded record member. The head also serves to write magnetically encoded sign, account number, new balance and new line find information on the first available line of the record member for subsequent use thereof.

Each of the three laterally spaced idler rollers 640, 642 and 646 is suspended over a different one of the aforementioned drive rollers by a pair of crank arms, 648, 649, which are spring biased to lower an idler roller on its drive roller by means of a lifter member 651 actuated from a cam carried by the program cam shaft 448.

The magnetic head assembly 453 is shown and described in Figs. 67 through 69 of the principal Deighton et al. application and includes three identical electromagnetic heads, which are potted in a unitary assembly. The assembly is mounted on and is adapted to be raised and lowered against the drive roll 634 by a lifting mechanism, which is actuated from a cam on the carriage cam shaft in a manner similar to the lifter mechanism provided for each of the idler rollers.

Associated with a part of the lifting mechanism of each of the idler rollers 640, 642 and 646 is a separate paper pusher and squaring mechanism 650, 652 and 656, which is movable from a raised inoperative position to a lower paper engaging position, as shown and described more fully in the principal Deighton et al. application. Rotation of the carriage cam shaft 486 causes the laterally spaced pusher elements to move forward to engage and then square the leading edge of the document, if it has been inserted askew into the guide chute, and continues to move the pushers forward to move the document to a predetermined forward reference or zero position. Continued rotation of the cam shaft raises the pushers to clear the leading edge of the aligned document, which is then gripped in the carriage by the paper drive rollers and propelled rearwardly thereof. At the end of this cycle of rotation of the cam shaft, the pushers have been retracted and again lowered to block the entry of the document past that point.

Figure 7:
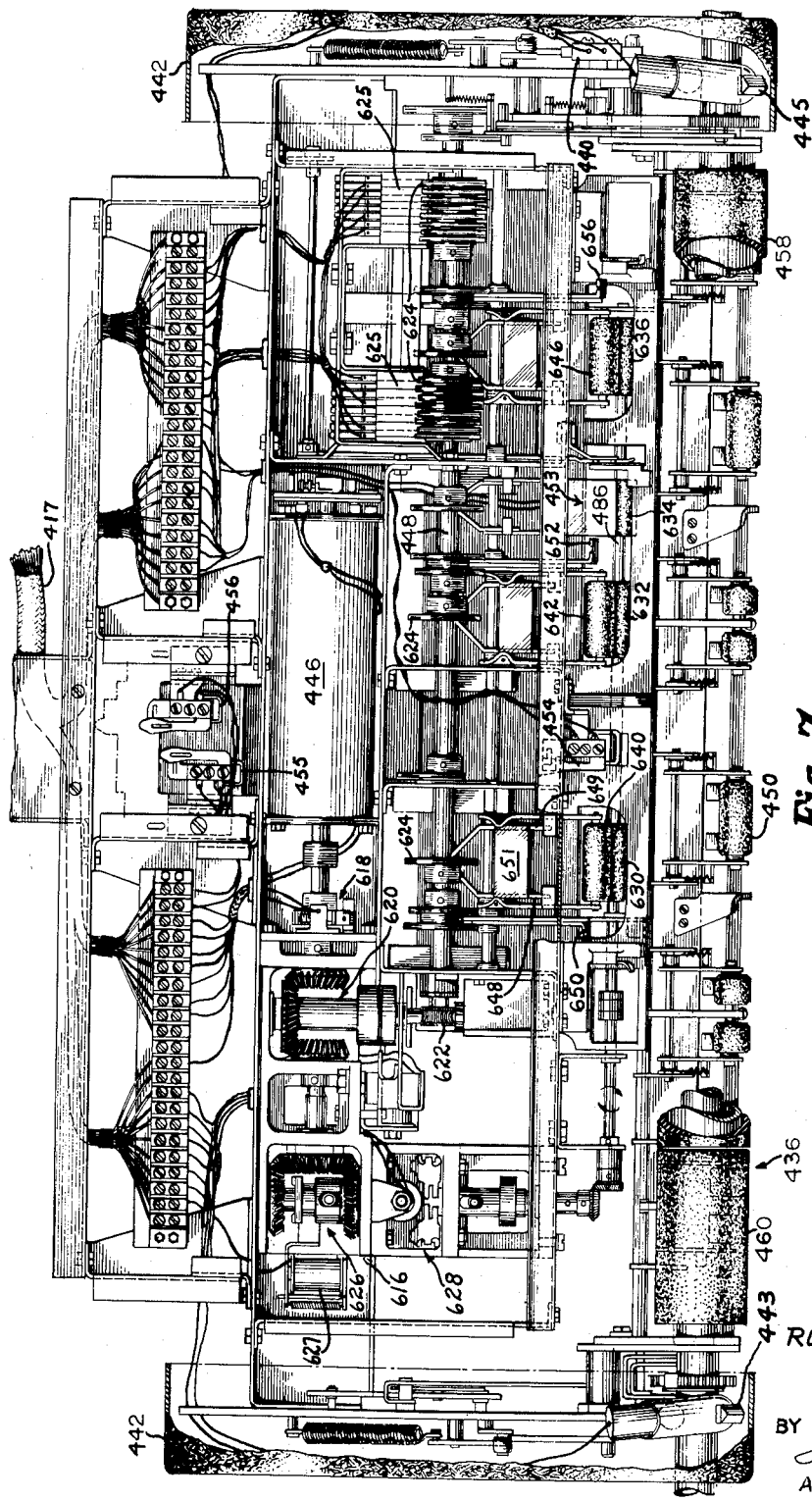
Fig. 7 is a top plan view of the automatic paper carriage of the modified accounting machine.

The paper sensing switches 454, 455 and 456 sense the insertion of the record medium into the machine carriage and control the operation of components of the carriage for shifting the document to certain positions to accomplish desired functions. These switches are illustrated in Fig. 7 as being of the roller actuated type, the front paper switch 454 being located near the front of the carriage and the switches 455 and 456 located at the rear thereof. The front paper switch is actuated by the leading or advancing edge of a document inserted in the carriage and completes an electrical circuit causing the carriage drive motor 446 to operate and to rotate the carriage cam shaft. Rotation of the cam shaft causes the paper pushers to come forward and square the paper after which the feed rollers grip the paper and propel it further into the carriage, as mentioned above.

It will be appreciated that the advancing edge of the record member or document is actually the bottom edge thereof. This edge in cooperation with the rear paper switches 455 and 456 controls the recording of information on the document, when it is first used in line measured relationship to the top edge of the document. Thereafter, information stored on the memory strip 478 of the record member will contribute to the control of the movement thereof, and particularly to find the proper line for recording information on the record member.

With particular reference to the ledger form illustrated in Fig. 10, the line identified as "Amount Brought Forward" is considered as the starting position or zero printing line. This zero line is located approximately four lines from the upper edge of the ledger form. The lines between the zero reference line and the upper edge of the ledger are referred to in order as "minus four line," "minus three line," "minus two line" and "minus one line."

The rear paper switches 455 and 456 control the line spacing of the record medium. These switches are generally similar to the front paper switch 454 and are operated to open their contacts when a sheet is fed between their rollers. The rear paper switches are separated by a distance equivalent to a predetermined line spacing, such as two printed line spaces on the record member, and are operated at different times and separated points by the bottom or top edge of the record member as it is moved in either direction. The rear paper switches control the operation of the reverse clutch 626 to stop the ledger card at the next adjacent line position in the direction that it is traveling. Thus, to stop an unused blank ledger form so that its zero line is in print position, the rear paper switch 455 is located on the carriage for operation when the "minus one" line is in print position and becomes active to control the stoppage of the paper drive clutch 628 when the "zero (0)" line is in print position. The distance between the switches is sufficient to allow time for the actuation of various electrical control circuit elements which in turn cause the paper driving rollers, by gripping the record member therebetween, to position the record member at the printing station such that the old balance will be printed in the area of the ledger or statement form identified as the "Amount Brought Forward" line.

As explained in the principal Deighton application, the balance information on a previously used record card is also encoded on the magnetizable portion 478 thereof in the form of magnetically polarized bits of information which are serially arranged in a modified (1, 2, 4, 7) binary decimal code on two parallel tracks, including an information data track and a complement track and accommodating three types of data disposed in 12 digital positions or locations along the length thereof. As indicated in Fig. 11 herein, the first digital position is provided for recording the algebraic sign, + or −, of the encoded amount information; the second and third digital positions, accept two decimal digits of an account number; and the fourth to twelfth digital positions, the actual amount information. Since each decimal digit is represented by 4 pulses, a total of 48 pulses are required. Thus each time a read or write cycle occurs, a check can be made to determine if exactly 48 pulses are counted. The tracks thus provide an internal checking means as well as a timing means.

The third track on the tape is the line find track. When the record member is first inserted into the carriage of the machine as a new account, balance forward, or balance transfer operation, the track is magnetically prepared by polarizing it along its entire length in a positive direction. Subsequently, after a new balance has been printed, one of the heads, viz., the line find head, of the magnetic head assembly pulses the line find track in a negative direction while the paper moves into the carriage. Thus, the line find track always has one place where the magnetic polarity changes from positive to negative, as indicated in Fig. 11 which illustrates a magnetic polarity change in the line find track relative to the last printed balance.

ACCOUNTING MACHINE—EXTERIOR CARRIAGE STRUCTURE

In addition to the split platen assembly 436 and program panel 438, the carriage exterior structure includes a platen opening and closing mechanism, a pressure roller actuating mechanism, a split platen spacing mechanism, an auxiliary spacing mechanism and a journal roll mechanism, all of which mechanisms are shown and described in separate similarly entitled sections of the principal Deighton application.

The platen opening and closing mechanism, illustrated in Figs. 75, 77, 78, 87 and 88 of the principal Deighton application, facilitates insertion of papers from the front of the platen as described in the Butler patent and permits the platen to be moved either rearwardly from its normal print impact receiving position or forwardly toward this position. The pressure roller actuating mechanism serves to prevent movement of the document when the carriage opens and closes and is described in connection with Figs. 7, 76, 79, 85 to 86c, 87, and 88 of the aforementioned Deighton application. The opening of the carriage to withdraw the platen from the paper gripping rollers actuates a Carriage Open Switch which is indicated at 440 in Fig. 7 therein and is included in an electrical control circuit to indicate the open condition of the carriage paper rollers 450. The split platen spacing mechanism permits simultaneous or independent rotation of the split platen sections and includes mechanism for automatically rotating the platen sections in a direction to feed paper out of the carriage and a disabling mechanism to allow selective spacing of the two platens independently of one another, as described in connection with Figs. 4, 5, 6 and 80 to 84 of the principal Deighton application. The auxiliary spacing mechanism is described with reference to Figs. 80 to 82 of the aforementioned application and permits the right hand platen 458 to space when the carriage is open, since the normal spacing mechanism of the machine operates only on a closed platen. The journal roll mechanism is identical in construction and operation to that employed in the Butler machine.

POSTING DESK

The posting desk 13 on which the accounting machine is supported includes a power supply section; an electronic pulse amplifying section, pulse shaping section, writing section and coincidence pulse error checking section; and an electrical control relay section, information distributing and scanning section and an information storage section, all of which are shown together with the electrical components contained within the accounting machine in the schematic electrical diagram of Figs. 18–32 representing the control system of the accounting apparatus.

Figure 18:
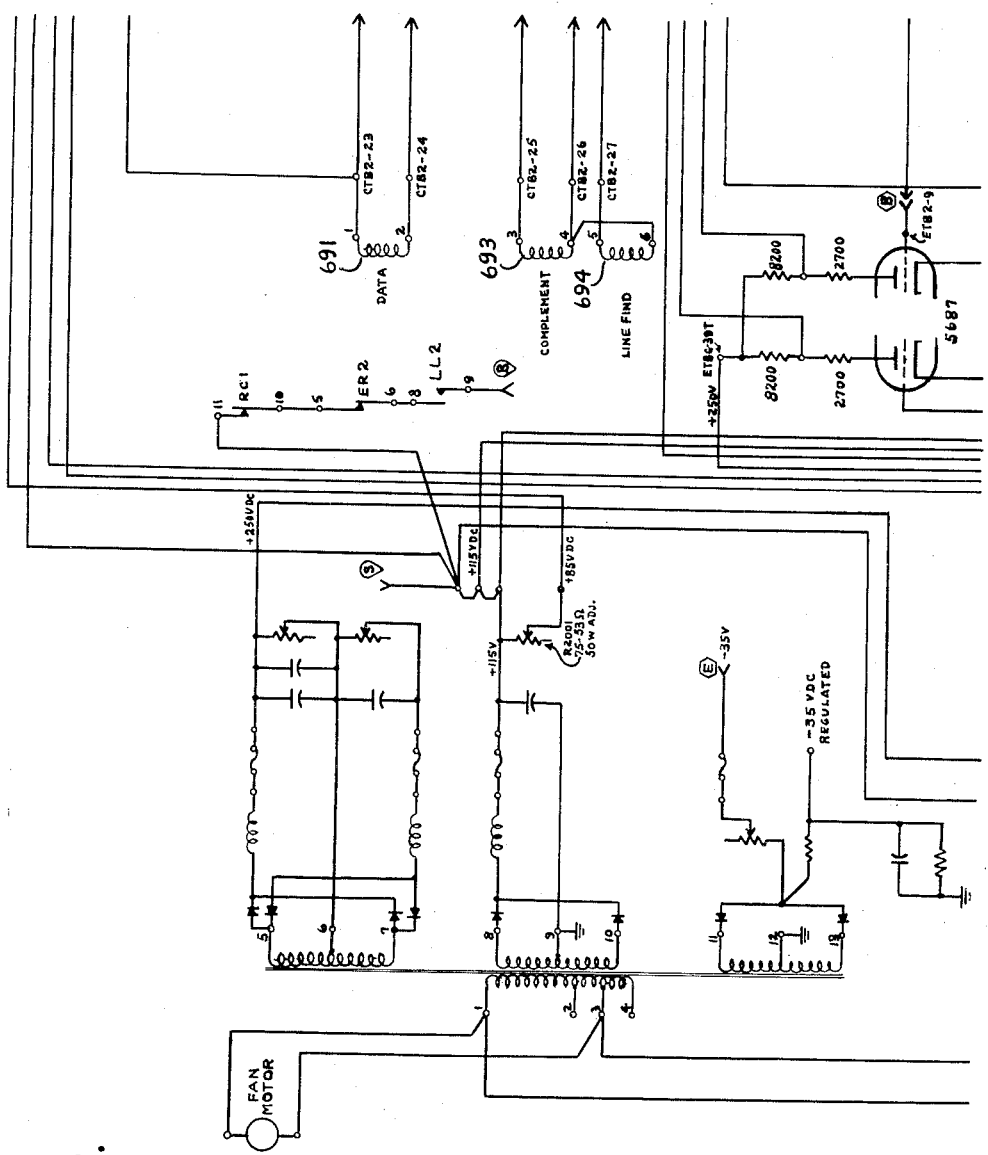
Figure 23:
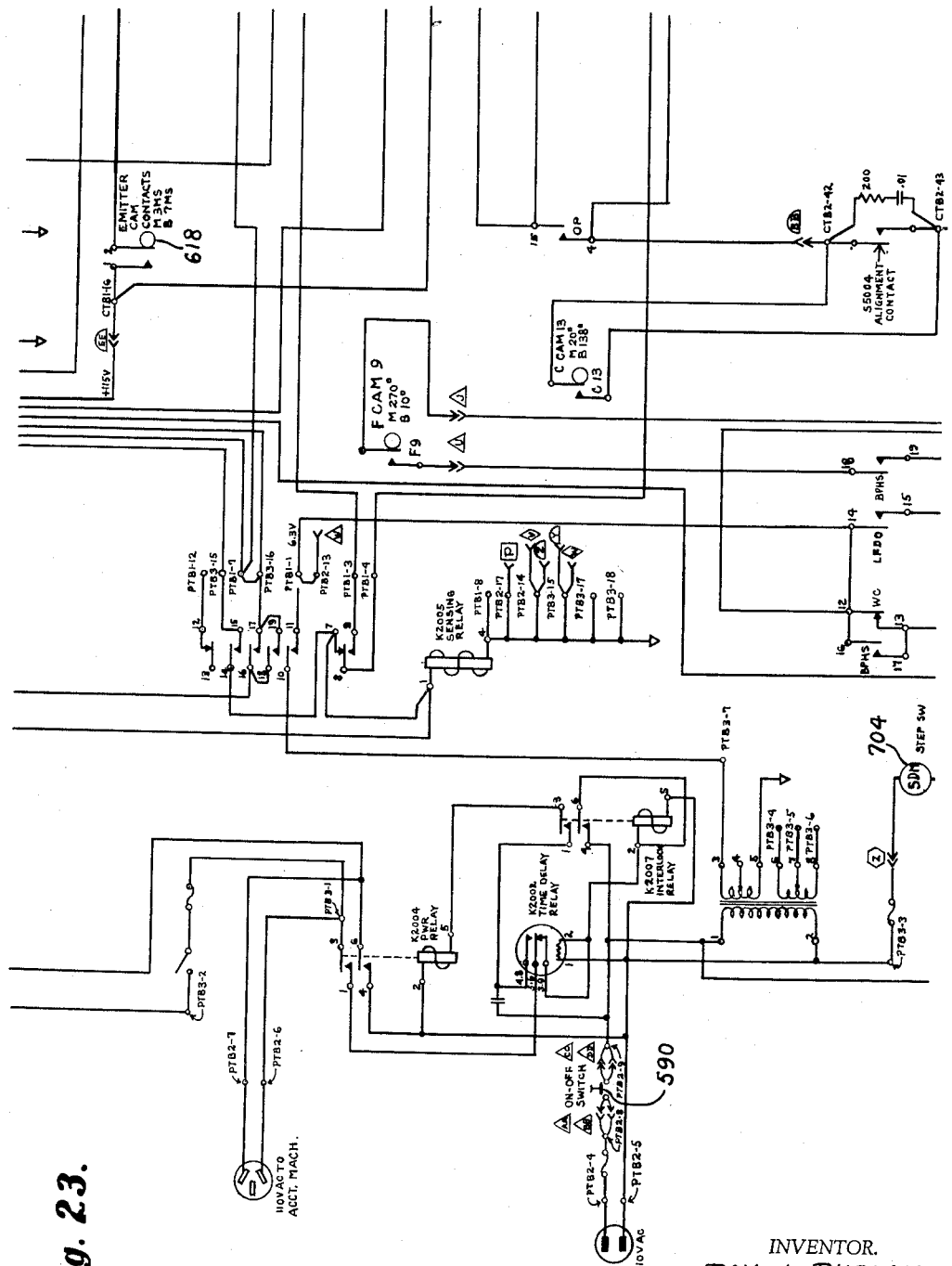

The power supply illustrated in Figs. 18 and 23 provides the necessary operating voltages including +250 volts D.C., +115 volts D.C., +85 volts D.C. and −35 volts regulated D.C. to the various electrical and electronic components of the control system housed within the accounting machine and the posting desk. Associated directly with the power supply are several relays including a time delay relay K2002, power relay K2004, voltage sensing relay K2005, and interlock relay K2007. Relay K2007 is energized with time delay relay K2002 when the On-Off switch 590 of the accounting machine is actuated by depressing the On-Off key 580, and closes its contacts to complete a circuit through a set of contacts of K2002, when the later relay "times out," to energize the main power relay K2004 through whose contacts power is supplied to the primary of the power transformer of the power supply. The contacts of the voltage sensing relay K2005 transfer to supply operating potential to various parts of the electrical control system when the output of the power supply attains its quiescent operating level.

Figure 19:
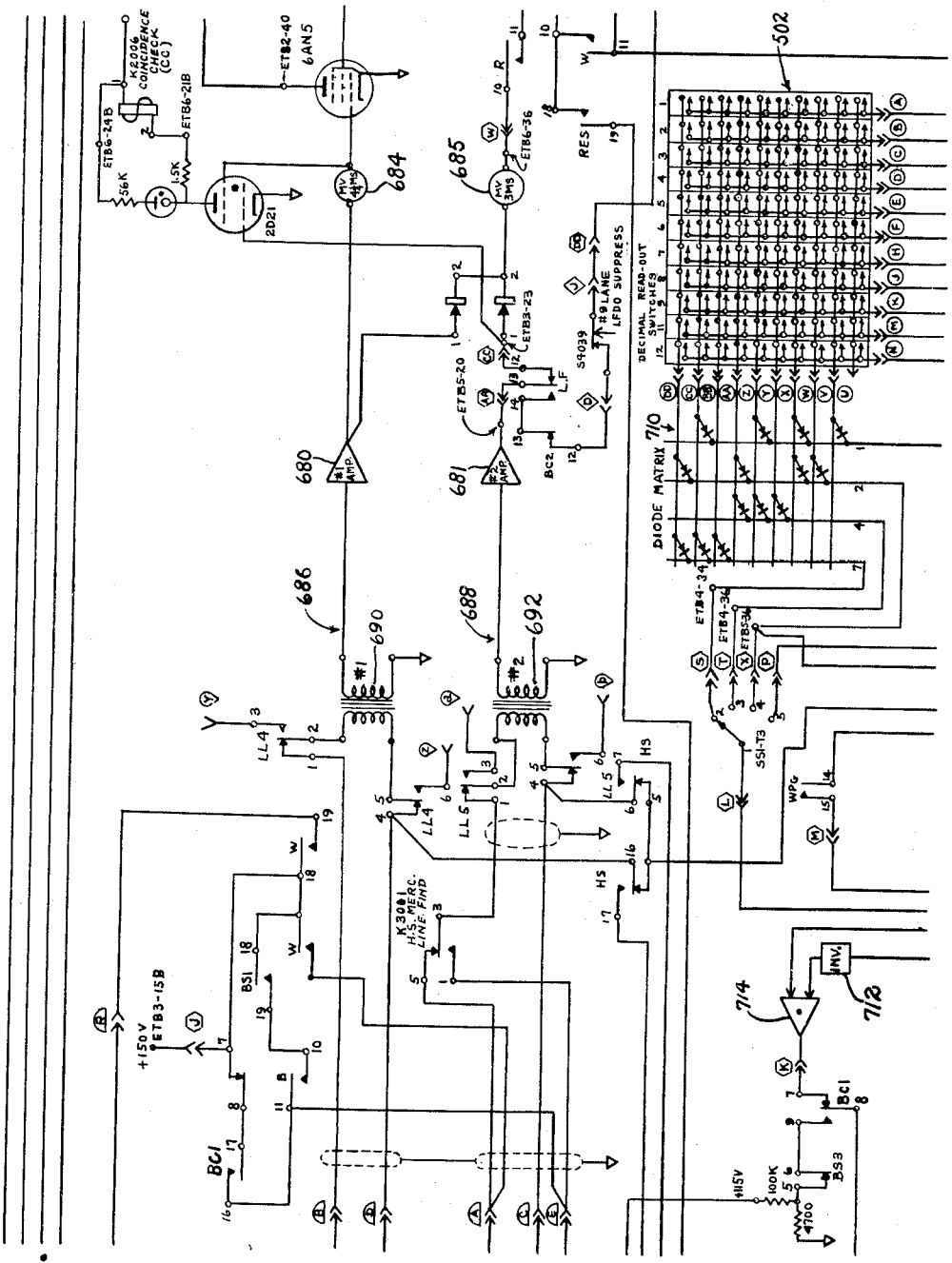

The pulse amplifying and shaping section is illustrated diagrammatically in Figs. 18 and 19 and comprises a pair of pulse amplifiers 680 and 681 and a pair of multi-vibrators 684 and 685 connected in a pair of circuit channels 686 and 688 each containing an amplifier and a multi-vibrator. The #1 pulse amplifier 680 in the upper or information channel 686 is normally coupled through a pulse transformer 690 and the back contacts of a Ledger Lister Relay LL4 in the form feeder and magnetic code reader 16 hereinafter referred to as the ledger lister, to the data head 691 of the magnetic head package in the accounting machine. The #2 pulse amplifier 681 in the other or complement channel 688 is normally coupled through a separate pulse transformer 692, the back contacts of another Ledger Lister Relay LL5 and either the back or front contacts of a high speed mercury Line Find relay K3001–LF to the complement head 693 or the line find head 694, respectively, of the magnetic head package of the accounting machine, depending upon the condition of the latter relay.

Except for the duration of the output pulses derived therefrom, the multi-vibrators are of similar design and may be of the conventional one-shot variety. The multi-vibrator 684 is supplied from the #1 channel amplifier 680 in the information data channel and supplies a 4¼ millisecond pulse to a pentode type 6AN5 vacuum type connected to a clock in the form of a multi-level electrical stepper switch that distributes the pulses to the information storage relay section indicated generally at 700 through two of the levels of two different sections of the stepper switch. The other multi-vibrator 685 is fed from both channel amplifiers and supplies a 3 millisecond pulse to a pentode type 6216 vacuum tube which drives or advances the aforesaid sections of the clocking stepper switch.

A coincidence tube, such as a type 2D21 thyratron, has a pair of its control grids connected to respective ones of the information and complement channels, as shown, and energizes a Coincidence Check Relay K2006 in the plate circuit thereof in the event that a pulse should occur simultaneously in each of these two channels, signifying an error condition as described hereinafter. Another electronic component in the form of a type 2D21 thyratron tube illustrated in Fig. 25 is employed as an electronic switching element in the line find drop out control circuitry mentioned hereinafter.

The stepper switch is described in co-pending U.S. patent application S.N. 492,247 entitled Program Scanning Apparatus, filed March 4, 1955, now Patent No. 2,906,838, for W. W. Deighton and comprises a stepper switch motor illustrated at 704 in Fig. 23, and three stepper switch selections, labeled SS1, SS2, and SS3. The stepper switch drive motor is energized from the alternating circuit mains upon actuation of the On-Off switch of the accounting machine. Each stepper switch section includes 4 switching levers or tiers T1–T4, each of which tiers contains 12 step contacts and a rotary switch arm. The rotary switch arms of each stepper switch section are advanced by the drive motor through a friction clutch mechanism operated by a magnet identified in the drawings as SS1M, SS2M and SS3M, one of which is provided for each stepper switch section. The 4 rotor arms of each stepped switch section turn synchronously with each other and step from one contact of each tier to the next succeeding contact of that tier on the break or removal of a pulse applied to the clutch operating magnet associated with that stepper switch section.

Figure 20:
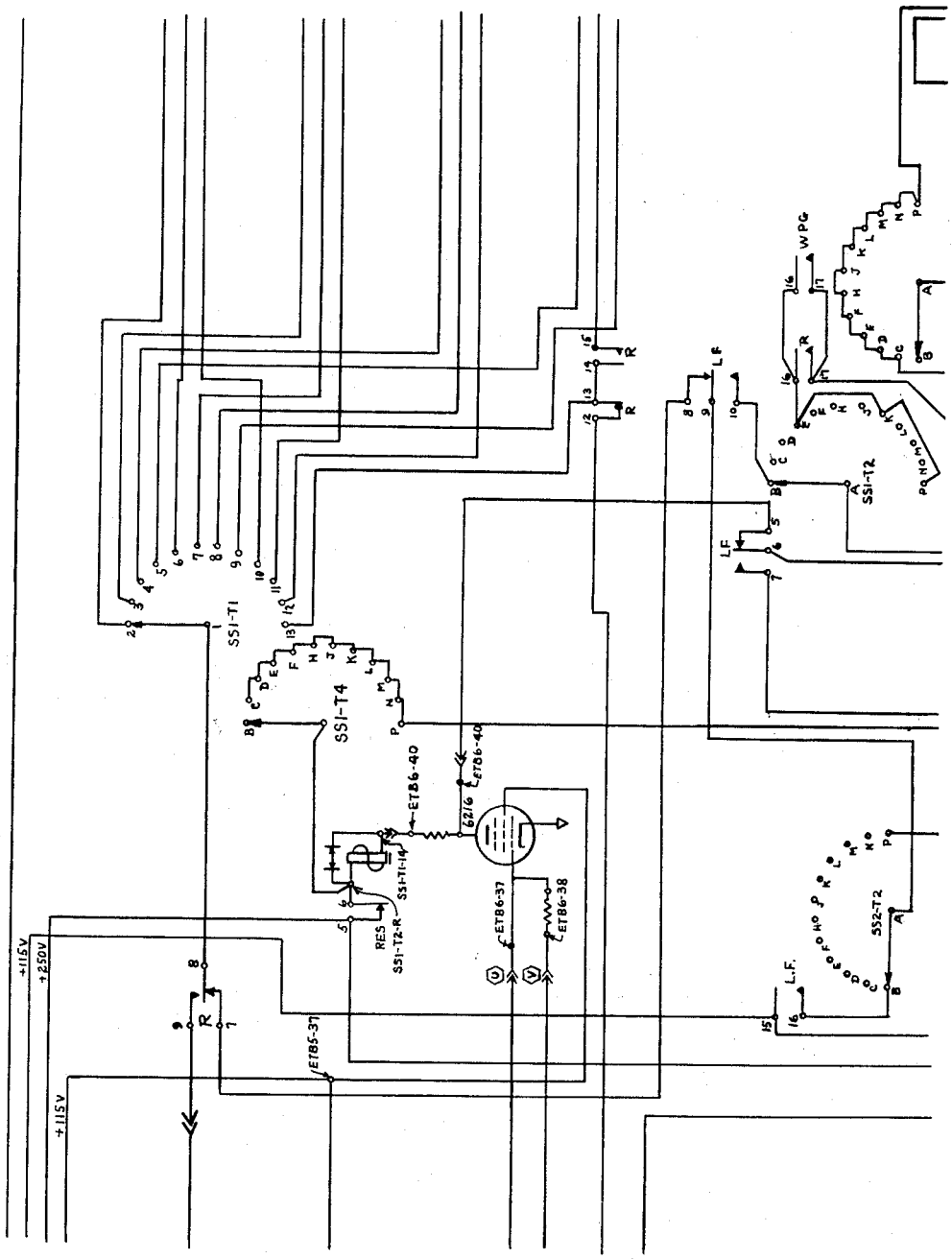
Figure 21:
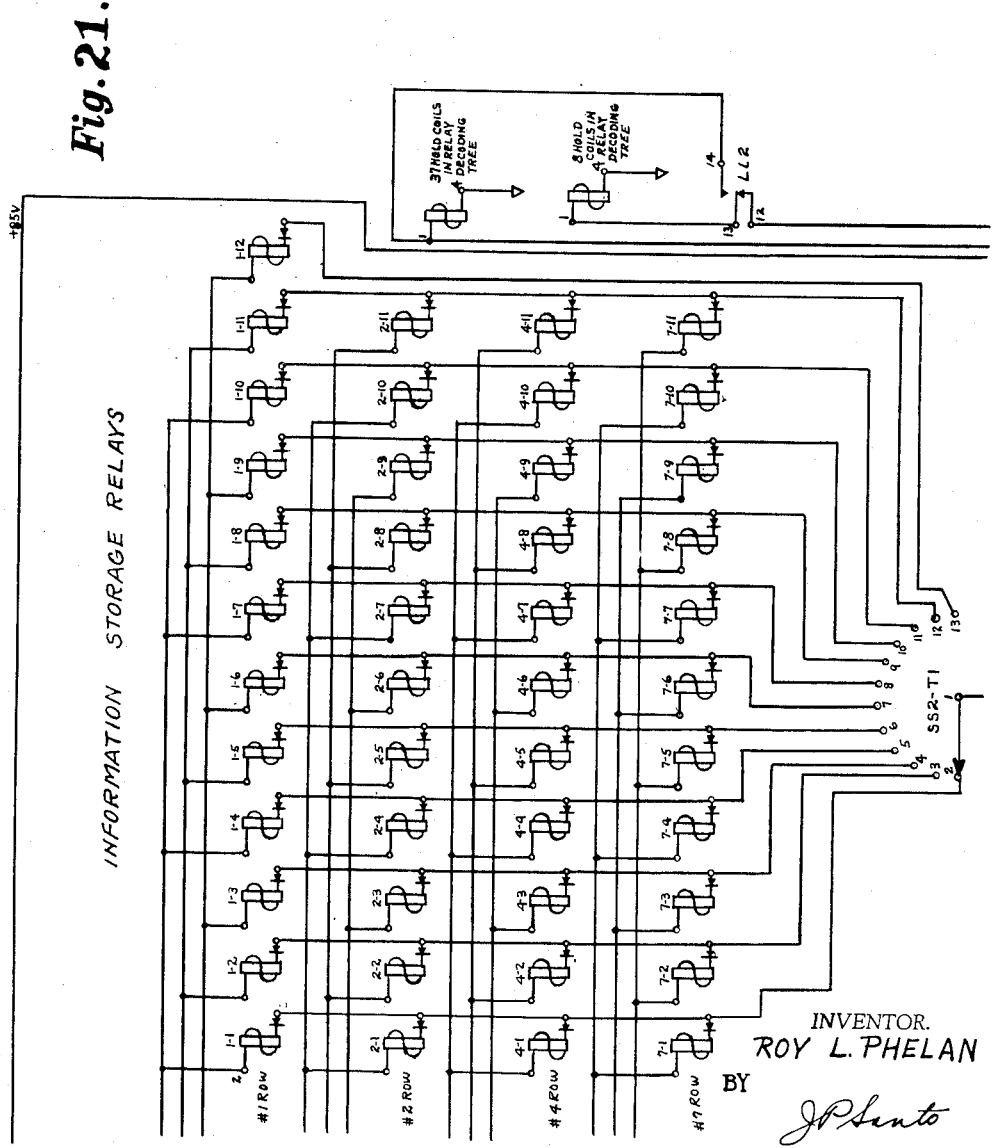

Stepper switch sections SS1–T1 and SS2–T2 have their stationary contacts conneteed to the opposite terminals of the pick coils of the information storage relay section, as shown in Figs. 20 and 21, and may be considered as a pulse distributor portion of the stepper switch, through which information pulses derived from the information channel are applied to the information storage relays. The operating magnets SS1M and SS2M, for the first and second sections SS1 and SS2 of the stepper switch are included in a control circuit that controls the advancement of the stepper switch which may be considered as a clock or operation synchronizing element of the control system. The operating magnet SS1M of stepper switch section SS1 is energized by each pulse applied to a stepper switch driver tube 6216 from the information and the complement channels, while the operating magnet SS2M of SS2 is contained in a circuit which includes the second tier T2 of SS1 and is energized from the application of every 4th, 8th, and 12th pulse applied thereto from the output of the driver tube.

Stepper switch sections SS1–T4 and SS2–T4 are included in a reset or error checking circuit and serve to reset the stepper switch section in the event that an incorrect number of pulses have been received from the magnetic tape on the record medium, as described in the principal Deighton application.

The third tier, T3, of stepper switch sections SS1 and SS2 is included in a scanning portion of the stepper switch, which, during the writing operation of the accounting machine, scans the setting of the decimal portions of the read-out unit. The decimal switch read-out unit 502 is located in the base structure of the accounting machine, and is illustrated diagrammatically in Fig. 19 herein. During the writing cycle, the contacts of a Write Pulse Gate Relay WPG of Fig. 25 are closed, and pulses derived from the opening and closing of the emitter cam contacts 1, 2, shown in Fig. 23 are supplied through the first or home contact position B of SS3–T2 to the operating magnet SS3M of the third section SS3 of the stepper switch. This section of the stepper switch is utilized in the write operation as a first "full" pulse discriminator and a gate to assure that the first pulse written on the tape will be of sufficient duration to operate step switch sections SS1 and SS2, as described in the principal Deighton application. The very first pulse supplied from the emitter, is not supplied to the write tube, but through the first contact B of SS3–T2 to energize SS3M and advance it to its next contact position C from which subsequent emitter pulses are supplied thereafter through contact 3 of SS3–T1 to the rotor or distributor arm of SS2–T3 and the grid of the stepper switch driver tube 6216 and through another set of closed contacts of the relay WPG to the electronic writing section. The application of subsequent pulses to the grid of the stepper drive tube and to the rotor arm SS2–T3 pulses the inputs of the decimal switches in succession through SS2–T3. Tier 3 of SS3 is used as a reset tier in a reset circuit, while T4 serves to check the stepping of SS3 into a proper position after a writing operation, as described in the principal Deighton application.

The data output terminals of the decimal switches are bussed to the input terminals U to Z and AA to DD of a decimal to binary diode matrix encoder 710 located in the posting desk and shown diagrammatically in Fig. 19. The data bit output lines 1, 2, 4 and 7 of the encoder section are connected through the first four step contacts of SS1–T3 to the electronic writing section of the accounting apparatus. It will be noted that the input to the decimal read-out switches and the output of the diode matrix are scanned by different tiers of the same two step switch sections used in routing the read or information pulses to the correct coil in the whiffle tree.

The write pulse generator is constituted by the emitter 618, which is mechanically coupled to the feed roll drive shaft 486. With the form feed drive rolls 630, 632, 634 and 636 turning so as to drive the paper or record medium at a speed of 10 inches per second, the emitter cam contacts will make for 3 milliseconds and break for 7 milliseconds. This will place the data pulses along the magnetic strip as positively polarized pulses for 0.03" with a 0.07" erased portion between pulses. The total length per pulse is then 1/10", which means that 48 pulses will require 4.8" of tape. Since the emitter is mechanically coupled or synchronous with the feed rolls, the pulses will be equidistantly spaced along the length of the magnetic track regardless of variations of motor speed.

The electronic components of the pulse writing section contained in the posting desk include an inverter 712 and a pair of diode "And" gates 714 and 716, all of conventional design, and a double triode vacuum tube. The vacuum tube may be a type 5687 and is divided into a data write section and a complement write section, the plates of which are connected to the data head 691 and to the complement 693 and line find 694 heads, respectively, of the magnetic head package, as indicated in the drawings.

Figure 22:
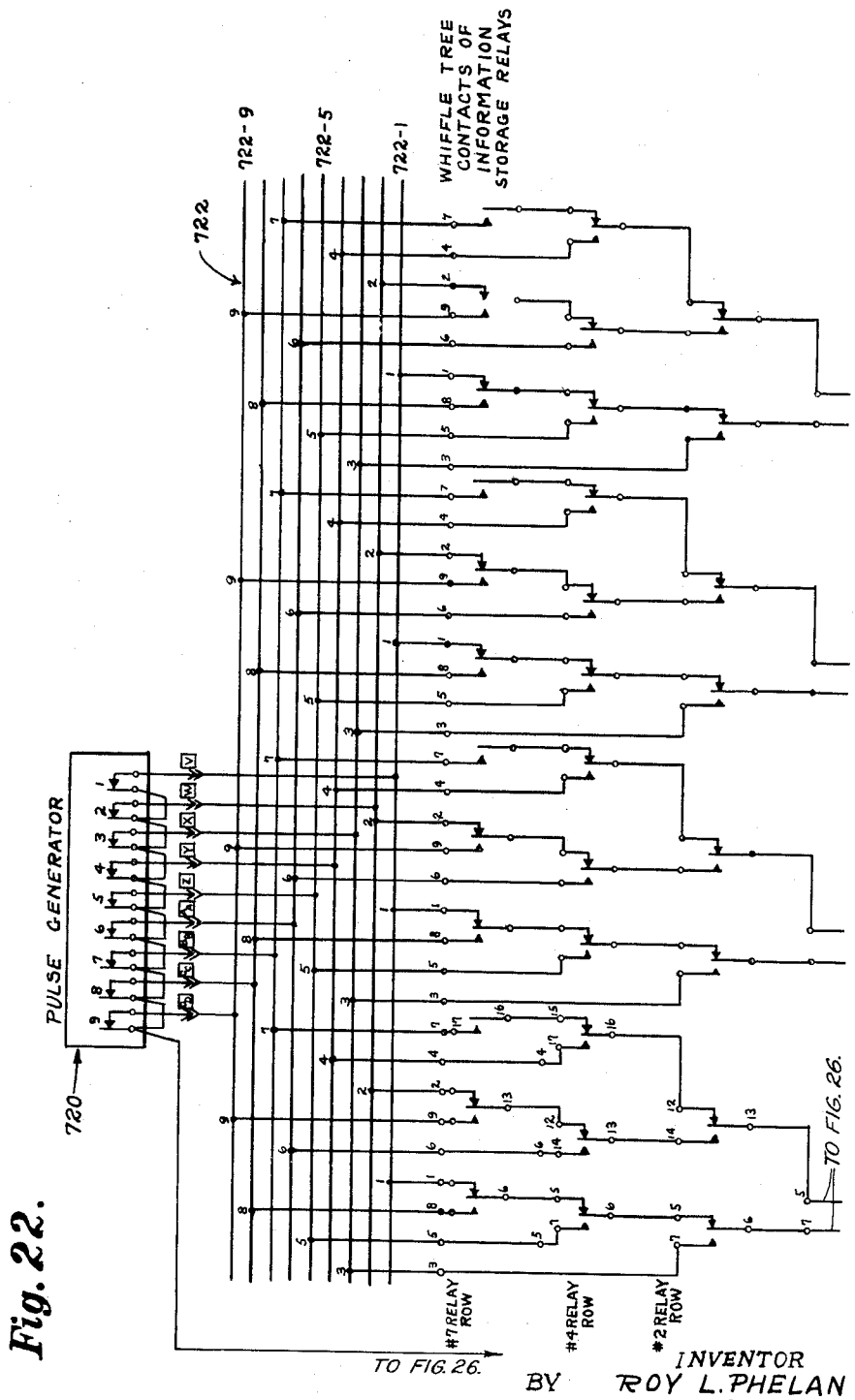
Figure 27:
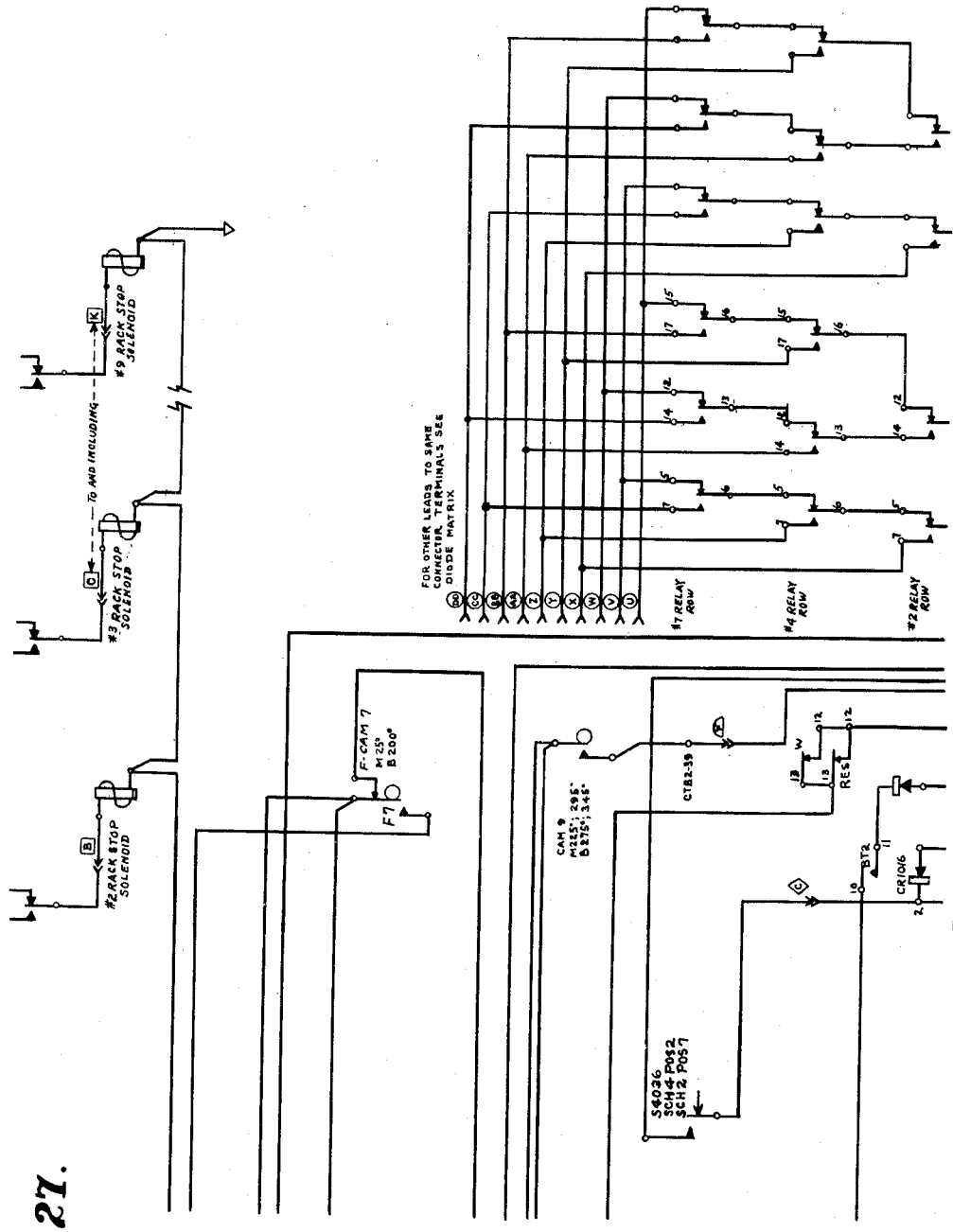

The information storage relays, also called the code analyzing storage whiffle tree, comprise a total of 45 relay magnets, illustrated schematically in Fig. 21 herein. The contacts of the individual storage relays are of the Form C variety, with an operating strap or movable switch arm or armature that is normally spring biased against one of a pair of stationary contact buttons as indicated in Figs. 22 and 27 herein. Each magnet is provided with a pick coil, which, when energized, will cause its contacts to be transferred from the normally open position to a closed position, and a hold coil, which in its energized condition prevents the relay switch arm or armature from dropping out after the pick coil has been pulsed to pick the armature and then de-energized. The pick coils of the information storage relay magnets are designated in Fig. 21 by the characters 1–1, 2–1, 4–1 and 7–1; 2–1, 2–2, 4–2 and 7–2; . . . etc., the first digit representing the row or information bit and the second digit, the column of the particular information storage relay magnet. There are four horizontally disposed information bit rows and twelve vertically disposed storage columns, the twelfth column of which contains only one pick coil. The 36 pick coils contained in the first nine columns 1–9 correspond to and are energized in accordance with the nine orders of amount information contained on the magnetic tape of the record medium and together with the read in apparatus and pulse generator, transfer this information into the accounting machine to position the nine amount racks through which the information is entered into the accumulators and the print bars are raised to a position in which the information may be printed on the record medium.

The eight pick coils 1–10 to 7–10 and 1–11 to 7–11 contained in columns 10 and 11 of the information storage section, store account number information therein as read from the magnetic tape. This information is used during Balance Transfer operations to verify the magnetically coded account number on the record medium against two digits of an account number which the operator manually indexes into the two banks of account number keys of the accounting machine. Lack of correspondence between the account number read from the tape and that indexed into the machine prevents transfer of the information read from the tape to the card in the accounting machine and energizes an error signal lamp 445 to warn the operator of this error condition.

Pick coil 1–12 serves to sense the algebraic sign, + or −, of the amount information on the magnetic tape.

Figure 26:
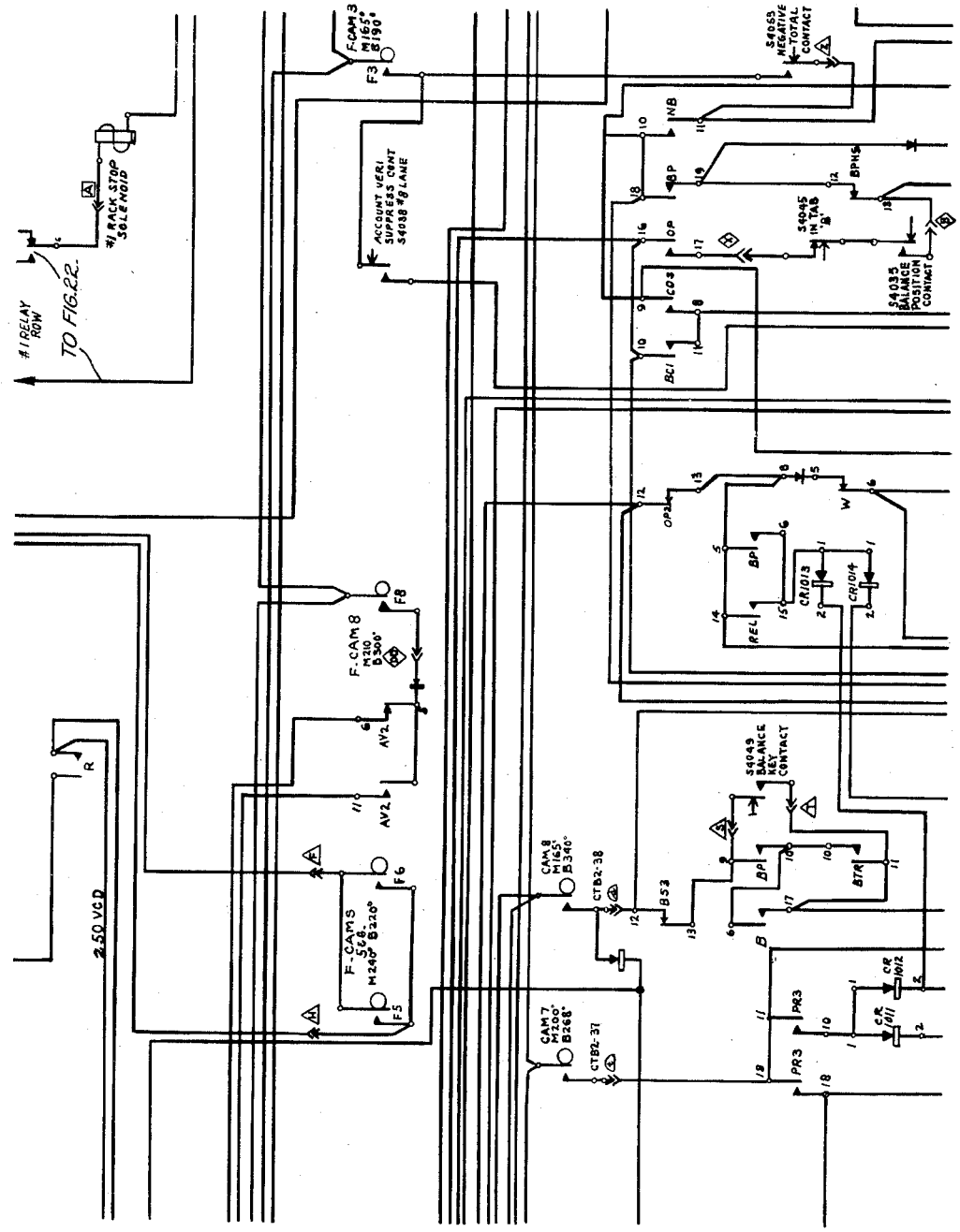

The hold coils of the 36 information bit relay magnets provided for the amount information and the hold coil of the sign sensing relay magnet are arranged in a parallel circuit grouping of 37 hold coils energized from the power supply through a cam switch actuated from the main cam shaft of the base structure of the accounting machine as shown in Figs. 21 and 26, while the 8 hold coils provided for the account verification information storage magnets are arranged in a separate parallel circuit grouping of 8 coils, since the account verification information is used at a different time in the operating cycle of the accounting apparatus than the amount information.

In order to utilize the information stored in the relay whiffle tree, the balance information read from the tape must be transferred into the base machine for printing and storage in a crossfooter. This transfer is affected by means of the earlier described read-in unit 500 in the base machine which operates in conjunction with the whiffle tree relay contacts.

In the embodiment of the modified accounting machine employed herein, this read-in unit comprises nine amount rack stop solenoids 546, illustrated in Figs. 6, 26 and 27, and a pulse generator, illustrated at 720 in Fig. 22 herein. Since the account number racks are stopped by the indexing of keys in the amount banks, no rack stop solenoids are provided for these actuator racks. As described earlier with reference to Fig. 6, each amount rack stop solenoid controls a clapper 548 located directly under a saw tooth series of notches 549 cut in the lower edge of each amount actuator rack 490, which will in turn, control the type bars and crossfooter accumulators. The position of each notch on the rack with respect to the clapper of an associated solenoid represents a definite digit position. If the rack is stopped in the first notch as it is traversed forwardly from the back toward the front of the base machine, a "0" will be stored in the crossfooter and set up to print by means of an associated type bar. If the rack is stopped in the second notch, the digit "1" will be printed and stored, etc. Thus, for each successive notch, successive digits will be printed and stored up to and including the digit "9."

The pulse generator 720, associated with the read-in unit, operates in synchronism with the rack movement as described in the aforementioned patent application S.N. 492,247 and includes nine S.P.S.T. Form B switch contacts, one of the switch contacts of each of which switches is connected to a 115 volt D.C. power line through a switch (Fig. 27) actuated by a timing cam on the main cam shaft of the base portion of the accounting machine as indicated in Figs. 22 and 27 of the schematic circuit wiring diagram. The other switch contact of each of the pulse generator timing switches is connected to a different one of nine main bus conductors, shown collectively at 722 in Fig. 22. Each main bus conductor has nine branch conductors extending therefrom, and each of these branch conductors is connected to a different one of the stationary contact buttons associated with one of the pick coils of a column or order of information storage magnets associated with a rack stop solenoid, as indicated in the drawings.

Where the record medium inserted in the carriage of the accounting machine has had balance information previously encoded thereon, this information will be read by the magnetic head package as the record is drawn into the accounting machine and will be distributed through the distribution levels of the stepper switch to energize the appropriate pick coils of the information storage magnet sections and cause them to transfer their associated contacts. The coding of the information on the magnetic tape is such that one or more of the relay pick coils of each columnar order of storage magnets associated with a designated rack stop solenoid will be pulsed or energized from the information channel for any one of the digits 1 to 9 of each order of amount information. Thus for any one of the digits 1 to 9, a series circuit will be completed from one of the movable switch contacts of the pulse generator, a main bus conductor and a branch conductor through one or more of the switch contacts associated with the pick coils of a column or order of information storage magnets to the rack stop solenoid for that order of information, and the rack stop solenoid, therefore, will be energized.

As the racks and the slide controlling the contacts of the pulse generator move toward the front of the base machine, the contacts of the pulse generator open in timed succession to de-energize the respective solenoids. The "One" contacts on the pulse generator will open first to interrupt the energizing circuit or circuits of the rack stop solenoids that are energized from the #1 main bus 722–1 through the contacts 7, 6 of pick coils 1–1 through 1–9. The contacts of the pulse generator open a sufficient time, approximately 7 milliseconds, in advance of the time required for the clapper of the de-energized read-in magnet to engage the saw tooth on the actuator rack to stop the actuator rack, causing it to raise the print bar to the print "1" position and to index and store a "1" in the accumulator section associated with that rack. The racks continue to move in conjunction with the pulse generator slide so that the #2 pulse generator switch contact will open approximately seven milliseconds before the time a released "read-in" clapper will engage the saw tooth on the racks that stop the rack in a position where a "2" will be stored and printed by the base machine. Since all the racks move in unison, the foregoing applies to the relationship between all the racks and their respective "read-in" solenoid clappers.

The control relay section of the control system of the accounting apparatus includes a plurality of control relays and solenoids, which together with the aforementioned power supply relays of Fig. 23 and the tappet control solenoids of Figs. 24 and 25, effect various control functions of the system as described in the principal Deighton et al. application. For purposes of convenience and ready reference these components are listed in the relay and solenoid Table II below, together with the symbol designation of each of these components and its figure location.

Table II

| Relay-Solenoid | Design. | Fig. Location |
|---|---|---|
| Motor Bar #2 | MB 2 | 28 |
| Operate Relays | OP 1 and 2 | 28 |
| Bal. Position Hold Suppress | BPHS | 29 |
| Account Release | AR | 29 |
| Release | REL | 29 |
| Cge. Motor Start | CMS | 29 |
| Program Cam Clutch Sol | | 20 |
| Blank Card Relays | BC 1 and 2 | 29 |
| Drive Clutch Sol | | 29 |
| Back Stop Relays | BS 1, 2 and 3 | 29 |
| Reverse Clutch Sol | | 30 |
| Read Relay | R | 30 |
| Line Find Relays | LF and K3001 | 30, 19 |
| Error Reset | ER 2 | 30 |
| Read Check | RC | 30 |
| Acct. Verification Error | | 30 |
| #2 Program | PR 2 | 30 |
| Error Reset | ER | 30 |
| Line Find Drop Out Relays | LFDO and K2003 | 25 |
| Write Pulse Gate | WPG | 25 |
| Machine Block Sol | | 30 |
| #3 Program | PR 3 | 31 |
| Balance | B | 31 |
| Account Write | AW | 31 |
| Write | W | 31 |
| Acct. Verification Set-up | AVS | 31 |
| Write Check | WC | 31 |
| Cge. Open Suppress | COS | 31 |
| Balance Position | BP | 31 |
| Error Symbol Print Mag | | 31 |
| Negative Balance | NB | 31 |
| Bal. Transfer and Reconstr | BTR | 31 |
| Reset | RES | 32 |
| Acct. Verification | AV 1, 2, 3 | 32 |
| Balance Transfer | BT 1 and 2 | 30 |
| Voltage Sensing Relay | K2002 | 23 |
| Power Relay | K2004 | 23 |
| Power Supply Time Delay | K2005 | 23 |
| Coincidence Check Relay | CC-K2006 | 19 |
| Power Supply Interlock | K2007 | 23 |
| Read Check Suppress | RCS | 30 |
| Head Switching Relay | HS | 29 |
| Ledger Lister Relays | LL2 to LL5 | 29 |

The cam actuated timing switches 510 contained within the base structure of the accounting machine and the cam actuated timing switches 625 contained within the carriage thereof are illustrated schematically in Figs. 23 to 27 herein, and bear the designations F1 and F11 and C1 through C5 and C7 through C14, respectively.

Figure 28:
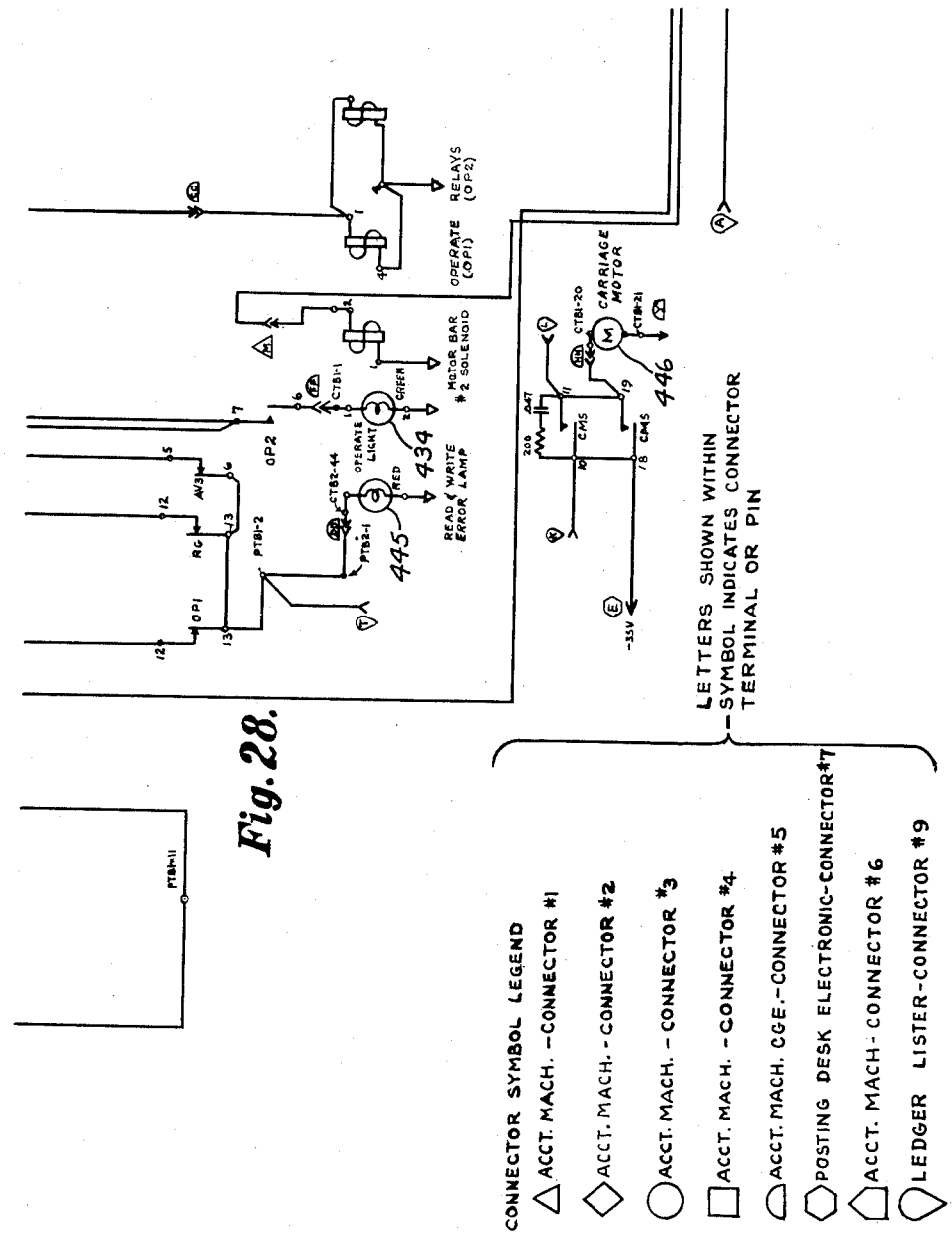
Figure 29:
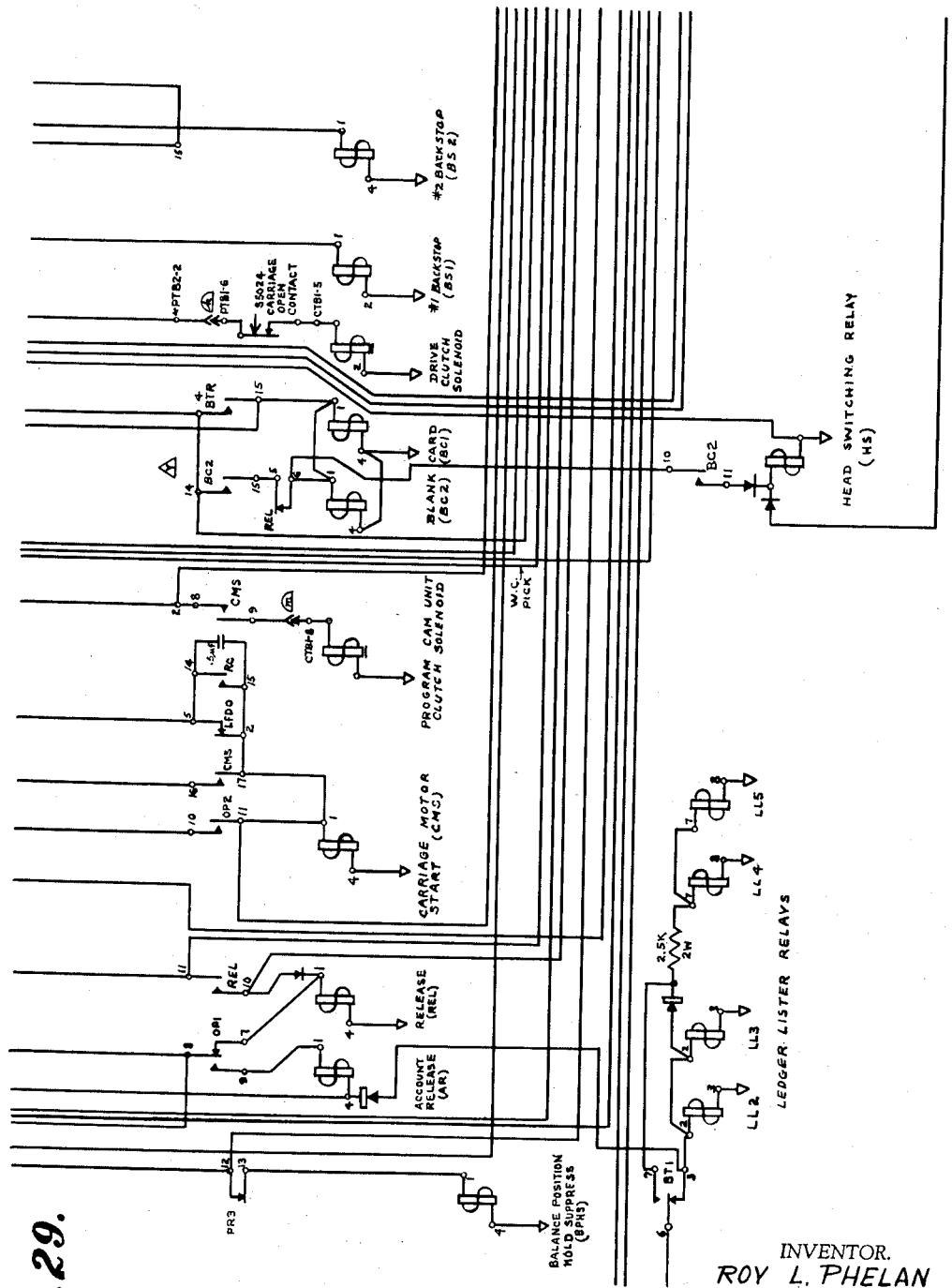
Figure 30:
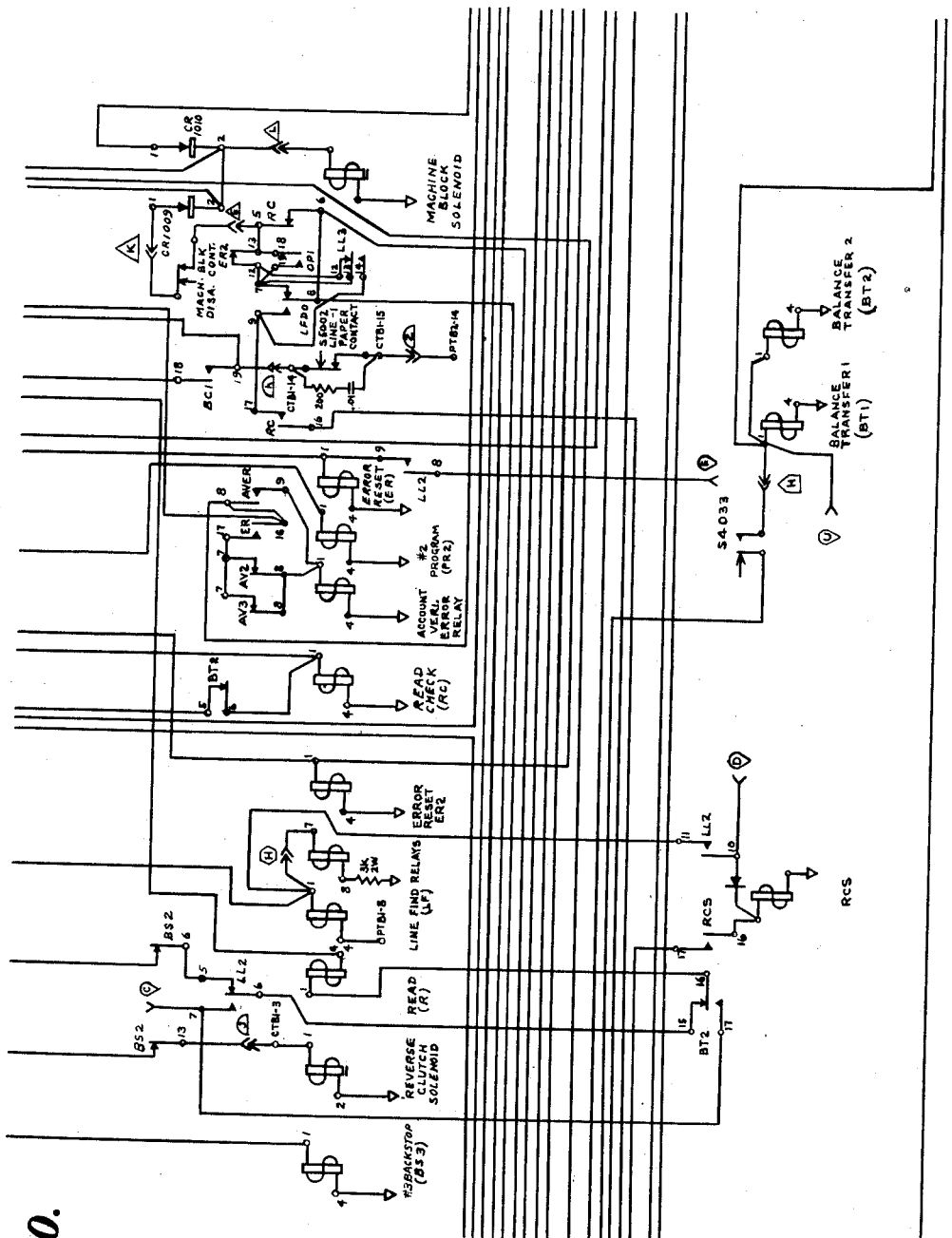

The lane switches 506 and in-tab switches 508 in the accounting machine are indicated on the accounting machine are indicated on the schematic circuit diagram of Figs. 18–32, by the designations S4033, Balance Transfer Position (Fig. 30); S4034, Old Balance Position (Fig. 24); S4035, Balance Position (Fig. 26); S4036, Balance Transfer Schedule Position (Fig. 26); S4038, Account Verification Suppress (Fig. 26); S4039, Line Find Drop Out Suppress (Fig. 19); S4044, In-Tab "A" (Fig. 24); S4045, In-Tab "B" (Fig. 26); and S4053, Negative Total (Fig. 26).

Other switches shown in the schematic drawings include the carriage Alignment or front paper sensing switch S5004 (Fig. 23), the Line minus One and Line minus Three rear paper sensing switches S5002 (Fig. 30) and S5003 (Fig. 24), Carriage Open switch S5024 (Fig. 24) and several key actuated switches including S4046, Error Reset (Fig. 25), S4049, Balance Key (Fig. 26), and S4052, Sub-total "A" Key (Fig. 24).

In order to adapt the accounting machine of the principal Deighton application for operation with the automatic form feeding and reading apparatus, several additional control relays have been added thereto, including Ledger Lister relays LL2–LL5, Head Switching relays HS and a Read Check Suppress Relay RCS, as illustrated in Figs. 29 and 30 herein. The Ledger Relays LL2–LL5 adapt the accounting apparatus for automatic Trial Balance and Balance Transfer operations and also constitute a magnetic head selector 730 through which the magnetic heads of the magnetic head package 36 contained in the Ledger Lister, may be connected in place of the magnetic head package 453 in the accounting machine to transfer information into the information channel and the complement channel of the accounting apparatus control system during read operations. These relays, together with other slight modifications of the accounting machine and apparatus of the Deighton application are also shown in the control circuit drawings of Figs. 14-17 herein, in which Figs. 16 and 17 illustrate the electrical relays and control equipment included in the Ledger Lister 10, and Figs. 14 and 15, the components in the accounting machine and posting desk of the accounting apparatus that are directly associated with or affected by the automatic form feeding or listing machine 10. The components indicated by the dashed and dotted lines on Figs. 14 and 15 are already included in the accounting machine and apparatus as described in the Deighton application and are also to be found in the schematic electric circuit diagram of Figs. 18 to 32.

Figure 12:
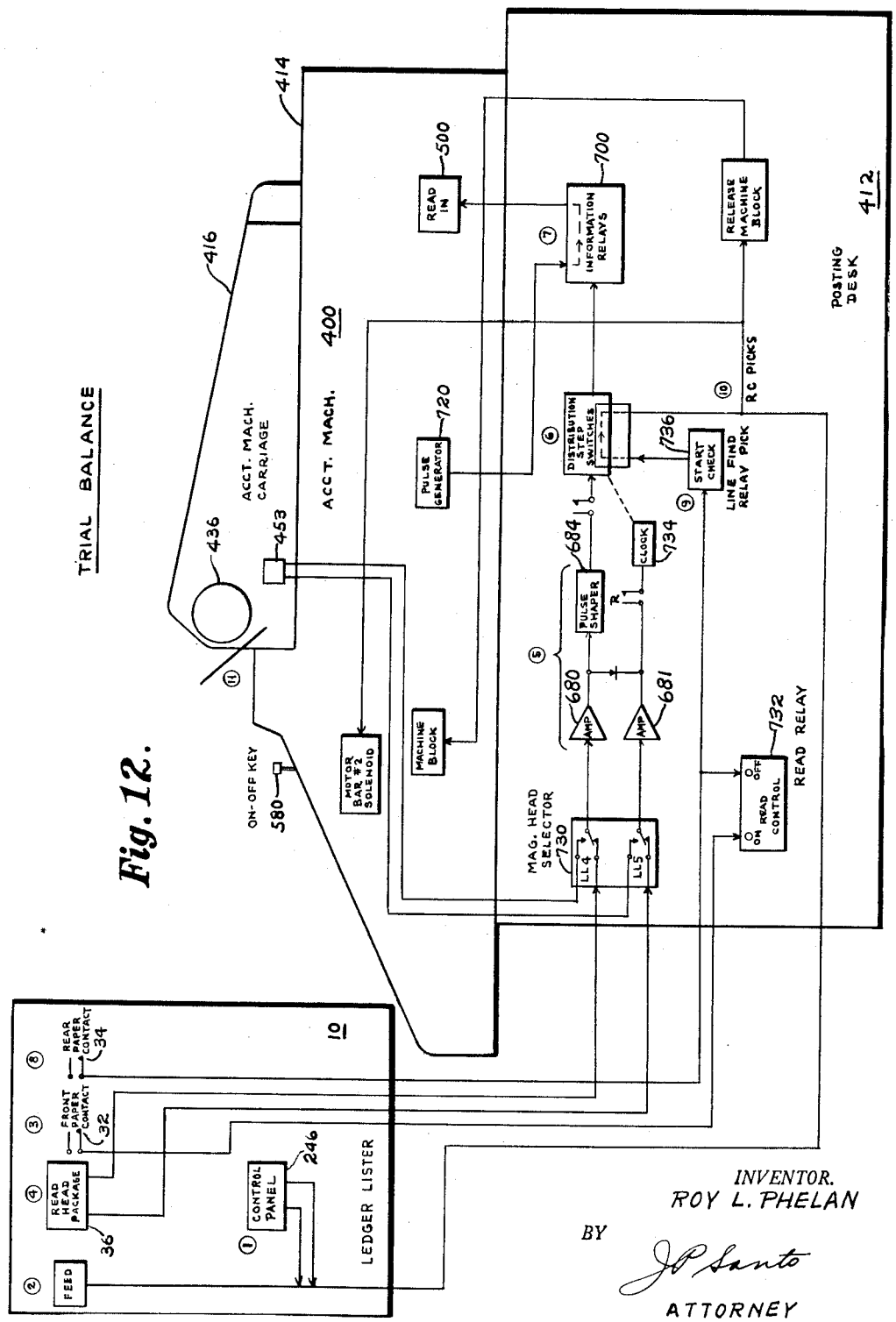
Fig. 12 is a functional block diagram illustrating the sequence of operations performed by the form feeder and magnetic code reader apparatus coupled to the automatic accounting apparatus for accomplishing automatic Trial Balance Operations.
Figure 13:
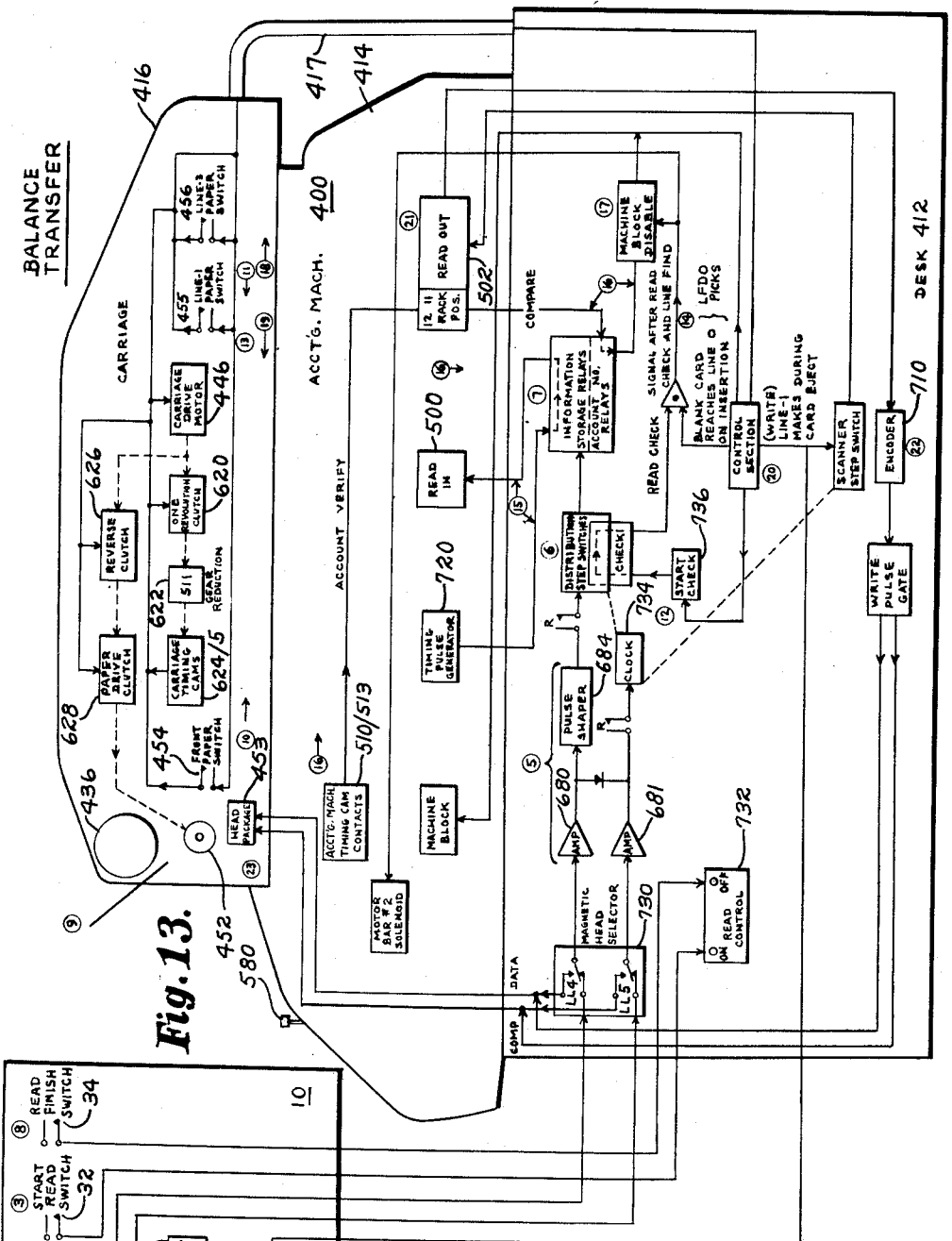
Fig. 13 is a functional block diagram illustrating the sequence of operations performed by the above apparatus for accomplishing automatic Balance Transfer operations.

In order to obtain a general understanding of how the Ledger Lister operates with the accounting apparatus, reference is made to the system operation block diagrams of Figs. 12 and 13, which illustrate the sequence of operations for the Trial Balance and the Balance Transfer operating modes, respectively, of the magnetic reading and ledger listing apparatus coupled with the automatic accounting machine of the Deighton application.

TRIAL BALANCE-OPERATION AND CIRCUITRY

Referring to the block diagram of Fig. 12, which illustrates the sequence of operations for the automatic Trial Balance operating mode, a stack of ledger cards is placed in the hopper of the Ledger Lister and the carriage of the accounting machine is placed in a trial balance stop position. The On-Off key switch 590 on the keyboard of the accounting machine is actuated to energize the power supply in the posting desk of the accounting apparatus to supply operating voltage to the various control circuits of the system. Upon actuation of the On-Off button 1 on the control panel 246 of the Ledger Lister, operating voltage is supplied from the power supply of the accounting apparatus to start the drive motor 52 in the Ledger Lister, as described in the Start Section hereinafter, and to energize the five Ledger Lister Relays, LL2 to LL5 of which are located in the accounting apparatus. In the Balance Transfer operation, later to be described, LL2 and LL3 are dropped out by the operation of the Balance Transfer relays BT1 and BT2. LL4 and LL5 are energized for both modes of operations and constitute a magnetic-head selector 730, operation of which transfers the control of the accounting machine from the magnetic head package 453 located in the carriage thereof to the magnetic head package 36 in the Ledger Lister.

The Single Cycle or Auto-Cycle button on the control panel of the Ledger Lister is then depressed to energize the Picker Clutch relay PC for the One-revolution Clutch Solenoid of Fig. 17, thereby to start a card feed cycle during which a card is picked from the top of the stack of cards in the form hopper and conveyed past the read head package 36 of the Ledger Lister.

As the leading or bottom edge of the card reaches the reading station and passes over the read head package, it deflects the actuating arm 242 of the Ledger Lister front paper switch 32, which is spaced a very slight distance past the read heads such that the magnetic tape on the document will be under the read heads when the switch is actuated prior to the start of the message on the tape. This assures that the pulse generated by the change in the permeability of the gap of the magnetic field as the leading edge of the tape encounters or passes over the heads will not be applied to the information and complement channels, as otherwise would be the case if the contacts of the front paper switch had closed before the tape was over the read heads.

The aforesaid front paper switch closes its contacts to turn on a read control unit 732 comprising the Read Relay R, which is contained in the posting desk of the accounting machine and is energized over a circuit illustrated in Figs. 14 and 16 extending from +115 volts D.C. through the transferred contacts of the actuated front paper switch, contact points 6, 5 of the Read Switch Relay RS in the Ledger Lister, the normally closed contact points 13, 12 of the Jammed Feed Relay JF in the Ledger Lister, through the cable and cable connector P9-C, through contact points 6 and 7 of LL2 Relay and points 15, 16 of BT2 Relay to energize the Read Relay R. The Read Relay then transfers its various contacts in the control circuit of the accounting apparatus to permit pulses sensed from the data and complement tracks of the conveyed form by the two magnetic read heads of the Ledger Lister to be applied through the contacts of the magnetic head selector 730 in the accounting apparatus to the information and complement channels of the control circuit of the accounting apparatus. The pulses derived from the information head are applied to the information channel 686 through the #1 amplifier 680 and the 4½ millisecond pulse-shaping multi-vibrator 684 and are distributed by means of the clock or stepper switch 734 through the distribution levels of the stepper switch to pick the appropriate information relays of the information storage section 700 of the accounting apparatus. The balance information from the tape will remain in these relays until the accounting machine cycles.

The Read Relay or read control section of the accounting apparatus is dropped out or turned off when the leading edge of the form depresses the actuator arm 245 of the rear paper switch 34 in the Ledger Lister, at which time the read heads therein will have sensed the entire message contained on the tape. The rear paper switch in operating transfers its contacts to complete an energizing circuit to the Read Switch relay RS, which in turn transfers its contacts to open the energizing circuit of the Read Relay R, as may be ascertained from Figs. 14 and 16. De-energizing the Read Relay R causes it to open its contacts in the information and complement channels of the accounting apparatus, thereby to immobilize or prevent transfer of any further pulses to the accounting apparatus from the magnetic head package in the Ledger Lister.

The rear paper switch 34 in the Ledger Lister is so positioned relative to the read head package 36 that all of pulses on tape will have passed the heads when this switch operates to open its contacts, but a portion of the tape will still be over the heads so that a pulse derived from the change in the permeability of the air gap when the end of the tape passes over the read heads will not be transferred to the accounting apparatus and cause erroneous operation thereof.

By way of example, the magnetically striped ledger form illustrated herein has a nominal paper length of 10½ inches, and the length of the magnetic tape measured from the bottom edge of the form is 7 inches. The pulse message starts approximately 1 inch from the bottom edge of the tape and, for a message unit of 48 pulses at a pulse packing density of 10 pulses per inch, requires an additional 4.8 inches of tape. The front paper switch 32 is set so that the tape is ¼ inch past the read head package 36 before the switch is actuated and its contacts make, and the rear paper switch 34 is positioned 6 inches behind the front paper switch to assure that all of the pulse message on the tape will have been sensed by the read heads when the leading or bottom edge of the form actuates the rear paper switch to turn off the read control unit before the end of the tape passes over the read heads.

When the rear paper switch transfers its contacts, it energizes the Read Switch Relay RS in the Ledger Lister, which then transfers its contacts 5 and 6 to energize the LF relays constituting a start check section 736 of the accounting apparatus. Since the rear paper switch is positioned 6 inches behind the front paper switch and the form is 10½ inches long, both of these switches will be actuated or closed for 4½" of paper travel, during which time the start check section starts a check of the number of pulses that have been received from the magnetically coded document fed through the Ledger Lister by checking the setting of the stepper switch clock sections. If 48 pulses or bits have been transferred correctly from the Ledger Lister, the rotor arms of these stepper switch sections will have been advanced through a complete operating cycle and will have returned to their home position. Under these conditions, a circuit is completed from 115 volts D.C., through the transferred contacts 15, 16; 9, 10; and 6, 7 of the Line Find Relays, tier 2 of each of the "homed" stepper switch sections SS1 and SS2, and the normally closed contacts 12, 13, of the de-energized Balance Transfer relay BT2 and contacts 5, 6 of the Coincidence Check Relay CC to energize the Read Check Relay RC of Fig. 30 indicating that a correct read check has been made, provided that a coincidence check has not occurred.

The Read Check Relay RC upon transferring its contacts completes an energizing circuit to the Motor Bar #2 solenoid MB2 of Fig. 28 and breaks the energizing circuit to the Machine Block Solenoid to release the machaine block and initiate an operating cycle of the accounting machine, the Machine Block Solenoid normally being energized over a circuit extending from 115 volts D.C. through the normally closed contact points 5, 6 of RC1 and an isolation diode, as shown in Fig. 30. The Motor Bar #2 circuit may be traced from 115 volts D.C. through a set of normally closed contacts of the Line Find Drop Out Relay LFDO, through the transferred front contacts 13, 14 of LL3, and the transferred contacts 17, 16 of RC1. Through another set of contacts, the Read Check Relay RC completes an energizing circuit extending from 115 volts D.C., through points 10, 11 of RC1, contacts 5, 6 of ER2, contacts 8, 9 of LL2, cable connector P9–B, and an isolation diode to the Read Check Relay RC2 of the Ledger Lister. RC2 is held by cam actuated switch F10 from 300° to 55° of the accounting machine cycle during which time it establishes an energizing circuit to the Picker Clutch magnet PC in the Ledger Lister to start another card therethrough when the Ledger Lister is under auto cycle operation. The card being fed will be processed in exactly the same manner as the previous one when it is fed through the read station of the Ledger Lister. This card does not reach the read station until the information stored in the information storage relays of the accounting machine has been printed and stored in the cross-footer during the accounting machine cycle.

When the accounting machine is cycled, the read-in tappet control mechanism thereof is operated so that the movement of the actuator racks will be limited by the electrical read-in unit in the modified accounting machine. Voltage is applied to the read-in tappet control solenoid over a circuit extending from 115 volts D.C. applied through the Ledger Lister On-Off switch of Fig. 16 and through the normally closed points 6 and 5 of LLR2, through the cable and cable connector P9–J, through points 7 and 6 of LL3, and through a cam actuated timing switch F4 contained in the accounting machine, to the read-in tappet control solenoid of Fig. 15. This enables the electromechanical read-in unit to control the racks as determined by the numbers set up in the information storage relays during the accounting machine cycle. Carriage control is set to store the number to be printed in crossfooter "A," which will receive the balance from each card in turn and thus will hold a total of all of the cards read.

The general sequence of operations performed by the Ledger Lister coupled to the accounting apparatus for performing automatic Trial Balance operations is summarized below.

(1) Start feed.
(2) Feed card in Ledger Lister.
(3) Read Control on.
(4) Read balance information.
(5) Amplify pulses.
(6) Distribute pulses.
(7) Store Information in information relays.
(8) Read Control off.
(9) Start check.
(10) Activate feed, Release Machine Block, and energize Motor Bar #2 Solenoid.
(11) Print balance information.
(12) Return to (2) and repeat operation for each card.

BALANCE TRANSFER OPERATION—GENERAL

The block diagram of Fig. 13 illustrates the sequence of operations performed by the Ledger Lister coupled to the accounting apparatus for accomplishing automatic Balance Transfer operations. The operating sequence is presented in summary manner below, but will be described in greater detail hereinafter with reference to the schematic control circuit diagrams of Figs. 14 to 32.

(1) Start feed.
(2) Feed card in Ledger Lister.
(3) Read Control On.
(4) Read Balance Information.
(5) Amplify pulses.
(6) Distribute pulses.
(7) Store Information in storage relays.
(8) Read Control Off.
(9) Insert blank card into accounting machine carriage to actuate alignment or front paper switch in accounting machine.
(10) Transport blank card into carriage to Line minus 4 and polarize line find track positively.
(11) Reverse blank card feed.
(12) Start feed.
(13) Stop blank card at Line "0."
(14) Release Machine Block Solenoid and energize Motor Bar #2 Magnet to start first accounting machine cycle.
(15) Read Information from storage relays into accounting machine through read-in unit and set decimal switches.
(16) Account Verify.
(17) Release Machine Block for second accounting machine cycle.
(18) Transport card to Line minus 4 after second accounting machine cycle and write Line Find information.
(19) Reverse feed and eject card.
(20) Start Balance Write and energize Ledger Lister feed delay.
(21) Scan Decimal Read-Out Switches.
(22) Encode pulses.
(23) Write Balance Information.
(24) Activate feed.
(25) Return to (2) and repeat operation for each card.

LEDGER LISTER—START SECTION

Turning to the start section of the Ledger Lister, which will be described in connection with the control circuit schematic of Figs. 14 to 17, when the Ledger Lister On-Off switch is made, operating voltage is impressed across the Motor Relay coil MR over a circuit which extends from the on-off switch, the normally closed contact points 12, 13 of the Checking Time Delay Relay CD2 and contacts 12, 13 of the No Feed Delay Relay NFD to the Motor Relay coil. Contacts 5, 6 of the Motor Relay close to permit 115 volts A.C. to be impressed across the motor coil windings and start the Ledger Lister drive motor 52 which activates the pump 54 and drives the paper feed drive rollers 24, 25 and 26.

Depressing the Auto Cycle button switch allows voltage to be impressed across both the Start Relay ST and Start Delay Relay STD. The Start Relay provides an auxiliary starting circuit for the Motor Relay MR in the event that CD2 points 12 and 13 are open, as in the case of an error condition, and closes its contacts 10 and 11 to furnish voltage to the Motor Control Relay MC. Approximately ½ second after the energization of the Start Relay and the Start Delay Relay, contacts 14 and 13 of STD close to establish an energizing circuit to the Picker Clutch Relay PC from 115 volts D.C., contacts 14 and 13 of STD, the normally closed contacts 12 and 13 of the Clutch Lockout Relay CLO and 12 and 13 of the Read Check Relay RC2 to the Picker Clutch Relay Coil. Contacts 10 and 11 of PC then close to permit 115 volts A.C. to be impressed across the One-Revolution Clutch Solenoid, allowing the clutch 164 to engage and the picker section to be driven one complete revolution, to cause a form to be picked and processed.

When the sheet separator or picker section moves, cam switch 232 associated with the cam plate 233 drive to the suction feet is operated. This switch is termed the Clutch Operate Cam Switch, and, when operated, it opens the hold voltage to drop out the Start Relays, the hold circuit for the start relays being traced from 115 volts D.C. supplied through cam actuated switch F10 in the accounting machine, through the cable connector P9–M, through contacts 17 and 16 of the Start Relay ST, the normally closed contacts of the Clutch Operate Cam Switch, and contacts 6 and 5 of the Clutch Lock Out relay CLO to the Start Relay and Start Delay Relay coils. The start relays will not be de-energized until the picker section starts moving, which signifies that both Start and Start Delay Relays have completed their jobs.

A second card feed initiated by the start circuit is prevented by the operation of the Clutch Lock Out Relay. When the Clutch Operate Cam Switch transfers its contacts, the hold voltage to the Start relays is transferred to the Clutch Lock Out Relay coil, which is held energized through its own contact points 8 and 9 and contacts 8 and 9 of ST relay connected to 115 volts D.C. This hold circuit will keep the CLO relay operated until the Start Relays drop out. CLO points 12 and 13 in the Picker Clutch Relay circuit will remain open until the STD 13 and 14 points open, or whenever the Auto Cycle or Single Cycle switches are released, thus preventing the Picker Clutch Relay PC from being operated a second time, and thereby prevent another cord feed cycle, if the operator should have held the Single Cycle or Auto Cycle switch buttons depressed during this time.

LEDGER LISTER—SINGLE CYCLE OPERATION

Depression of the Single Cycle button switch causes the Start relays to be picked by allowing 115 volts D.C. to pass through isolation diode CR 1005 to the Start Relay coils. The sequence of events is then exactly the same as any start operation with the auto cycle button switch, except that voltage passes through isolation diode CR 1006 from the Single Cycle switch contacts and is applied to the Single Cycle Relay coil SC. The Single Cycle Relay is then held energized to receive operating voltage over a circuit traced through its own contact points 18 and 19 and through the cable and cable connector P9–P, through normally closed contacts 12 and 13 of the #1 Balance Transfer Relay BT1 and the normally closed contacts of cam switch F11, which is contained in the base portion of the accounting machine and is connected to 115 volts D.C. The Single Cycle Relay then is held operated under the control of cam switch F11, which is closed from 310° to 350° of the account-machine cycle. Since only one cycle is possible through the start circuit, the next operation must come when the Picker Clutch Relay PC is operated when the Read Check relay RC in the accounting apparatus is picked, as previously described. The circuit for the Picker Clutch Relay may be traced from accounting machine cam actuated switch F10, which make at 355° and breaks at 55° of the accounting machine cycle, through contacts 6 and 7 of RC2 which is energized over the previously described energizing circuit through the normally closed contacts 12 and 13 of LLR2, through the normally closed contacts 5, 6 of the Jammed Feed Relay JF, and the normally closed contacts 12, 13 of the single cycle relay SC, which is now energized and opens the latter points to prevent 115 volts D.C. from reaching the Picker Clutch Relay coil, thereby preventing another card cycle.

LEDGER LISTER—MOTOR CONTROL

When the Ledger Lister On-Off switch is first depressed, the motor starts as previously described. Under feed error conditions the motor does not start until the operation is started again by the operator by depressing either the Single Cycle or Auto Cycle switch button as previously described. Once the motor has started only three operations will stop it. The operations are as follows:

(1) Setting the On-Off switch to its off position.
(2) A no feed indication, which could mean that the feed hopper is empty or a malfunctioning of the picker unit.
(3) An error indication in which the form would stop in the error station.

The Motor Relay MR, which controls the Ledger Lister drive motor, is controlled by a normally closed CD-2 point in parallel with a normally open MC point, and these points are connected in series with a normally closed NFD point to the Motor Relay coil. The only time the NFD point will open is when an unsuccessful attempt is made to feed a card. When this happens the No Feed Switch makes, picking both the No Feed NF and No Feed Delay NFD Relays. These relays are held through contact points 9 and 10 of the No Feed relay NF, the normally closed contacts 13 and 12 of the Start Relay ST connected to 115 volts D.C. The NFD Relay is a four second delay relay, which is provided to allow the motor to keep running until the preceding card is properly stacked before NFD points 12 and 13 open to drop out the Motor Relay, and thus stop the motor.

Since a normally closed CD2 contact is in parallel with a normally open MC point, it is only necessary to keep the Motor Control Relay MC picked while CD2 is open. The Motor Control Relay is picked when a read check is obtained. A read check is obtained by picking the Read Switch Relay RS in the Ledger Lister, which starts two different sequential operations as follows:

(1) The Read Switch Relay point 6 makes with 7 to energize the Line Find Relay LF over a circuit traced from 115 volts D.C. through the transferred contacts of the front paper switch and contacts 6 and 7 of relay RS, the back contacts 5 and 6 of relay CD2, contacts 14 and 15 of relay JF, and through the cable connector P9–D and contact points 10, 11 of energized Ledger Lister Relay LL2 to energize the Line Find relay, LF, as indicated in Figs. 14 and 16. The Line Find Relay points in closing test the position of the pulse distribution step switches in the accounting machine through which an energizing circuit is established to pick the Read Check Relay RC, if the stepper switches have been set correctly. When points 10 and 11 of RC relay close, the Motor Control relay MC is energized over a circuit, traced from 115 volts D.C. through contacts 10 and 11 of RC1, through the normally closed contact points 5 and 6 of relay ER2, through contacts 8 and 9 of relay LL2, through the cable connector P9–B and an isolation diode to the Motor Control relay MC, which closes its points 10, 11 to supply operating voltage to the Motor Relay coil MR. This sequence of operations would take a maximum of 36 milliseconds.

(2) The Read Switch Relay point 6 in transferring to contact 7 also applies voltage to the Checking Time Delay Relay #1 coil and, when it operates, this same voltage is applied through contact points 10 and 11 of relay CD1 to the coil of the Checking Time Delay Relay CD2. The contact points of relay CD2 transfer about 40 milliseconds from the time CD1 is energized, this delay being provided to insure that points 12 and 13 of relay CD2 in the Motor Relay circuit will not open until after points 10 and 11 close, which prevents the Motor Relay MR from dropping out and the motor from stopping. The Motor Control Relay MC is held energized through its own points and points 18 and 19 of relay RS connected to operating voltage. The read Switch points break after the points of CD2 relay return to normal.

LEDGER LISTER—ERROR CORRECTION

The circuitry involved in the detection and correction of all types of mis-read errors is described as follows:

When the balance information is not transmitted correctly from tape to relays, the loss of signals or extra signals feeding through the amplifiers is detected by the erroneous positioning of the distribution step switches. If the step switches are not set properly when the Line Find Relay LF is operated, the Read Check Relay RC in the accounting apparatus will not be operated. Under this condition the Motor Control Relay MC in the Ledger Lister will not pick and the motor will stop as previously described. Read Check #2 relay in the Ledger Lister will not re-energize, and the next card will not be picked and fed from the feed hopper. The Checking Time Delay Relays CD1 and CD2 are held energized through a normally closed Motor Control Relay contact. The combination of an operated Checking Time Delay relay and an unoperated Motor Control relay is indicative of an error. When this condition exists, the Finger Stop Magnets 243 are energized to stop the form in the error station, and 6.3 volts A.C. is sent from the Ledger Lister back to the accounting machine to light the red error lamp 445 in the carriage of the latter machine. Both circuits are as follows: from 115 volts D.C. through points 5 and 6 of relay MC and points 11 and 10 of relay CD2 to the Finger Stop Magnets 243; also from 6.3 volts A.C. through points 19 and 18 of relay CD2, points 14 and 15 of relay MC, through the cable and cable connector P9–T to PTB–2, and then to the read and write error lamp of Fig. 28.

The form has then stopped in the error station, the Ledger Lister motor is off and the red error lamp 445 is glowing in the accounting machine. The operator assumes control under these conditions and inserts the correct balance in the keyboard of the accounting machine as read from the form in the error station of the Ledger Lister.

The operation and control circuitry of the Ledger Lister having been described above as an individual unit and coupled to the accounting machine for performing automatic Trial Balance accounting operations, the description will now take up the detailed system operation and control circuitry involved in an automatic Balance Transfer operation.

BALANCE TRANSFER CIRCUITRY

In a Balance Transfer operation, a stack of magnetically encoded ledger forms is placed in the hopper of the Ledger Lister and the new ledger forms, on which the balance information is to be transferred from each of the forms in the Ledger Lister, are hand fed in sequence into the carriage of the accounting machine. The information on the old or full ledger forms in the Ledger Lister will be automatically read by the magnetic head package therein and transferred to the accounting machine where this information is written on the new ledger forms successively fed into the accounting machine by the operator.

The On-Off key of the accounting machine and the On-Off button on the Ledger Lister are turned on, the control panel or program tray 438 of the accounting machine is placed in a program schedule position designated for automatic blank card, balance transfer operations, and the carriage of the accounting machine is placed in a position to the right of the New Balance column of the illustrated ledger form in which position control pins have been placed in the program panel to actuate lane switches S4033, S4034 and S4036. Lane switches S4033 and S4034 establish an energizing circuit therethrough from the +115 volt source and through In-Tab A switch S4044 for the Balance Transfer Relays BT1 and BT2 in the accounting apparatus and BT3 in the Ledger Lister, as indicated in Figs. 15 and 17, while lane switch S4036 establishes an energizing circuit for the Balance Transfer and Reconstruct Relay BTR in the accounting apparatus through In-Tab A switch S4044.

Energization of relay BT1 opens its contacts 5, 6 to deenergize the Ledger Lister Relays LL2 and LL3 in the accounting apparatus, but retains LL4 and LL5 energized through its transferred contacts 6, 7 in order to select the read head package 36 in the Ledger Lister and permit pulses sensed thereby from the fed forms to be transferred to the accounting apparatus. The magnetic head package 453 in the accounting machine is used only in the Balance Transfer mode and during writing operations only involving initial polarizing of the line find track as the new form is drawn into the carriage and subsequent encoding of pulse information therein as the form is ejected from the carriage. Energization of the Balance Transfer and Reconstruct Relay BTR causes it to transfer its various contacts including 14, 15 through which an energizing circuit is established for the Blank Card or document relays BC1 and BC2 of Fig. 28 through carriage cam actuated switch C1 which is closed from 350 to 185 degrees of the program cam shaft rotation, now setting in its 0 degree position. The Blank Card Relays function to permit registering of the new form correctly and to prepare certain circuits for conditioning the accounting machine for automatic operation.

The start circuitry for the Balance Transfer operation with the Ledger Lister is identical to that of the Trial Balance operation, previously described. Feed is started by depression of either the Single Cycle or Auto Cycle button switch on the control panel of the Ledger Lister to cause a card feed cycle in which a form is picked from the top of the stack of forms in the form table or hopper and fed past the read head therein. The leading edge of the form actuates the front paper switch 32 in the Ledger Lister and allows the Read Relay R in the accounting apparatus to be energized over a circuit which may be traced from 115 volts D.C. through the now closed front paper contacts, contacts 5, 6 of the Read Switch relay RS and contacts 13, 12 of the Jammed Feed Relay JF, all contained in the Ledger Lister, and then through the cable connector P9–C through the transferred contacts 16, 17 of relay BT2 to the high potential side of the Read Relay, the other side of which is connected to ground through the contacts of the Line minus 1 switch S5002. Energization of the Read relay R permits the magnetic information sensed by the read head package 36 from the fed card to be applied to the information and complement channels of the accounting apparatus in which the pulse information is amplified and shaped and then distributed to the information storage relays. As the leading edge of the conveyed form in the Ledger Lister engages the rear paper switch 34, the read control relay R is deenergized, as previously described, and opens its contacts to prevent transfer of any further information from the magnetic head package in the Ledger Lister to the accounting machine.

The carriage of the accounting machine is open and the operator inserts the first blank card to which the information stored in the information storage relays is to be transferred. Insertion of the card into the throat of the machine carriage closes the Alignment contact switch S5004, which sets up the following operating circuitry to energize the Carriage Motor Start relay CMS for the carriage drive motor 446 to transport the card into the accounting machine.

Figure 31:
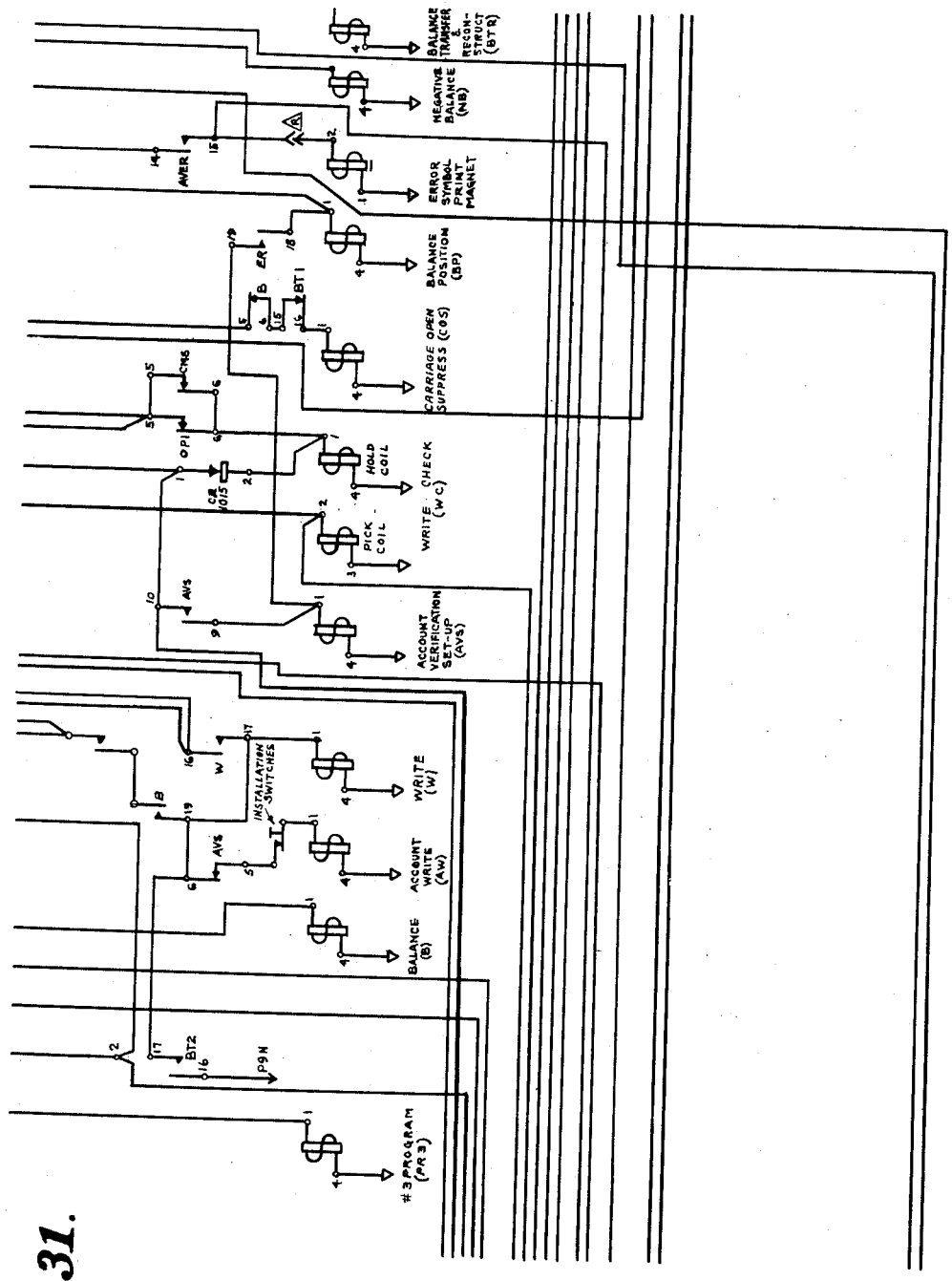

In order to energize the Carriage Motor Start Relay CMS it is necessary that the Write Check relay WC of Fig. 31 and the Operate Relays OP1 and OP2 of Fig. 28 have been energized. The Write Check relay is picked when the On-Off key switch 590 on the keyboard of the accounting machine was first actuated prior to actuating the Single Cycle or Auto Cycle switches of the Ledger Lister and is energized over a circuit traced from point PTB1–6 of the power supply section shown in Fig. 18 and through contacts 7, 8 of the voltage Sensing Relay K2005 before contact 8 has transferred to contact 9, contact 7 being connected to the pick coil of the Write Check Relay. After the contacts 7, 8 of relay K2005 have transferred, the Write Check Relay is held "in" by its hold coil, which is energized from +115 volts D.C. through the parallel connected, normally closed contacts 5, 6 of the Operate 1 Relay OP1 and the Carriage Motor Start Relay CMS, both of which are de-energized. The Blank Card Relays having been previously energized, as described above, and the Write Check Relay now energized, the Operate relays are energized over a circuit traced from +115 volts D.C., the transferred contacts 15, 14 of relay BC1, the now closed contacts 7, 6 of relay WC, isolation diode CR1001, and the contacts of the Alignment switch S5004, identified in Fig. 7 herein as the carriage front paper switch 454.

The Operate Relays are connected in parallel and are held energized thereafter through a holding circuit established from the 115 volt source through the transferred contact points 14, 15 of relay OP1 and the closed contacts of the Alignment switch S5004. Contacts 7, 6 of relay OP2 close to supply 6.3 volts A.C. from the power supply through the now closed contacts 10, 11 of the voltage Sensing Relay K2005 to turn on the green Operate or Ready Lamp 434 on the accounting machine, signifying that the power is on and that the operator may initiate a card feed cycle for Ledger Lister operation. The operate relays having been energized, contacts 10, 11 of OP2 close to supply voltage through carriage cam switch C2, which is closed from 357° to 124° of the program shaft rotation now setting at 0°, and isolation diode CR1003 to energize the Carriage Motor Start Relay CMS, which transfers its contacts 10, 11 and 18, 19 to apply –35 volts D.C. operating voltage to the carriage drive motor 446 of Fig. 28 and causes the energization of the Reverse Clutch Solenoid through CMS contacts 14, 15 and the closed contacts 12, 13 of relay BS2 connected to the 115 volt source.

Energization of the Reverse Clutch Solenoid of Fig. 30 causes the reverse clutch to be set so that when the paper feed drive rolls are lowered and driven they will turn in a direction such that the record medium will be driven into the carriage. Contacts 8, 9 of the CMS relay close to establish an energizing circuit from +115 volts D.C. through closed carriage cam switch C2 and isolation diode CR1005 to the Program Cam Unit Clutch Solenoid of Fig. 29 to apply the carriage motor drive to the carriage program cam shaft and cause it to turn through its first 144 degrees of rotation. The Program Cam Unit Clutch Solenoid is de-energized when carriage timing cam switch C2 opens at 124 degrees, but the program shaft is permitted to rotate due to the mechanical operation of the program clutch until 144° where it will be stopped and detented into position.

During the rotation of the program cam shaft over its first program cycle from its 0 to its 144 degree position, the paper pushers 650, 652 and 656, rockably mounted in the front of the carriage, are moved forwardly by their cams to contact the leading edge of the ledger form and push the form forwardly slightly, thus aligning and squaring the paper. A few milliseconds later the paper feed drive rollers 630, 632 and 636 are brought into engagement with the idler rollers 640, 642 and 646 in response to the movement of their cam followers which have been rocked into position by the program cams to grip the ledger form between them. At the same time, the magnetic transducer sensing assembly 453 in the accounting machine is lowered onto the ledger form, after which the paper pushers are cam retracted out of the way of the paper.

At 110 degrees of the program shaft rotation, carriage cam switch C3 closes its contacts to supply operating voltage therethrough and energize the Drive Clutch Solenoid over a circuit extending through the closed Line minus Three paper switch contacts S5003, isolation diode CR1006, the transferred contacts 18, 10 of relay OP2, the normally closed contacts 1, 2 of the de-energized Line Find Drop Out Relay K2003, and the Carriage Open Switch S5024 which is closed, since the carriage is open while the form is being transported therein except during the printing cycle of the accounting machine when the form is stopped. Energizing the Drive Clutch Solenoid allows the paper drive clutch to engage and causes the feed rolls to be rotated by the carriage drive motor 446 to drive the paper in a direction back into the carriage.

The carriage program cam shaft 448 keeps rotating and at 115 degrees, actuates carriage cam timing switch C11 through which operating voltage is supplied to the Carriage Motor Start Relay CMS through the normally closed contacts 5, 6 of the Line Find Drop Out Relay LFDO to keep relay CMS energized after carriage cam switch C2 opens at 124 degrees. At 132 degrees of rotation of the program cam shaft, carriage cam switch C5 contacts are closed, placing operating voltage on point 5 of the Back Stop 1 relay. However, since the #1 Back Stop Relay was energized at the same time as the Drive Clutch Solenoid, the voltage cannot get through these normally closed contacts, but remains available at BS1 point 5 for later use.

At this time, the ledger form is under the control of the carriage mechanism and is moved backwardly into the carriage past the magnetic head package 453 which is riding in contact with the form. As the record medium is driven into the carriage, the line find track of the blank card is caused to be polarized in a positive direction through a circuit which extends from a +150 volt D.C. line through the normally closed contact points 7, 8 of de-energized Back Stop 2 relay, the transferred contacts 17, 16 of Blank Card Relay, and the line find head 694, which is connected to the plate of the complement write tube 5687 whose cathode is grounded.

By means of the feed rollers and the carriage drive motor, the paper is driven further back into the carriage until the back edge thereof strikes the Line minus One (L–1) rear paper switch S5002, opening its contacts, and, shortly thereafter, strikes the Line minus Three rear paper switch S5003. The contacts of the Line minus Three switch then open, cutting off voltage supplied from carriage cam switch C3 contacts to the Drive Clutch Solenoid, which is then de-energized to stop the paper at line minus four, the terminal point in the rearward travel of the form into the carriage. Opening of the Line minus Three switch also cuts off the voltage from the Back Stop #1 Relay coil BS1, causing this relay to drop out and to close its normally closed contact points 5, 6 through which operating voltage is then supplied from carriage cam switch C5, which was closed at 132 degrees of the program shaft rotation, to energize Back Stop #2 Relay coil. BS2 is a 25 millisecond time delay relay at the end of which period it closes it contacts 16, 17, to apply operating voltage to Back Stop #3 Relay coil and opens its contacts 12, 13 to interrupt the aforementioned energizing circuit for the Reverse Clutch Solenoid. Energization of relay BS2 also causes its contacts 7, 8, located in the energizing circuit of the line find head 694 of the magnetic head package in the accounting machine, to open and interrupt the energization of the line find head to stop the positive polarization of the line find track on the tape of the new or blank ledger form in the carriage of the accounting machine.

At this point in the operation of the accounting machine, the ledger form is at its terminal stop or line minus four position at the rear of the carriage. De-energizing the Reverse Clutch Solenoid causes the reverse clutch to transfer so that the paper drive feed rollers will be set so as to drive the paper in a forward direction out of the carriage when the Drive Clutch is reengaged subsequent to its having been disengaged when the contacts of L-3 switch S5004 had opened, de-energizing the Drive Clutch Solenoid. The Drive Clutch Solenoid is re-energized through the energization of BS3 relay which is another time delay relay and transfers its various contacts 25 milliseconds after it is energized over the circuit described above to supply operating voltage from the 250 volt source through carriage cam switch C3, the transferred contacts 10 and 11 of relay BS3, contacts 18, 19 of energized relay OP2, the normally closed contacts 1, 2 of the de-energized Line Feed Drop out high speed mercury relay K2003 and the still closed contacts of the Carriage Open Switch S5024. Energization of the Drive Clutch Solenoid applies the carriage motor drive to cause the paper to start out of the carriage.

As the paper is driven outwardly from the carriage, the back edge of the form passes out from under the operate roller of the Line minus Three paper switch S5003, permitting it to close and to complete a circuit to re-energize Back Stop #1 Relay coil BS1 through carriage cam switch C3, which is closed from 110 to 200 degrees of the program cam shaft rotation.

Upon re-energization of BS1, a circuit is completed from the 115 volt D.C. source through carriage cam switch C4, contacts 14, 15 of relay BS1 and contacts 14, 15 of BS3, both energized, to the Line Find Relay coils LF, since at this time the program cam shaft is sitting at 144 degrees and carriage cam switch C4 is closed.

Picking the Line Find relays completes a circuit through contact points 18, 19 of energized relay BC1 to energize the Line Find Drop Out relays LFDO and K2003 when the Line minus One switch contact makes. This contact is positioned to energize the Line Find Drop Out relays at Line minus One so as to de-energize the Drive Clutch Solenoid at that point in the line of feed, causing the record medium to stop at line "0," which is the "Balance Brought Forward" position on the document form.

With the card in the carriage of the accounting machine now sitting at line zero, a read check circuit is completed to energize the Read Check Relay RC of Fig. 30 from a 115 volt supply line through Line Find Relay contacts 15, 16, home contact B and arm A of SS2-T2, Line Find Relay contacts 9, 10 home contact B and arm A of SS1-T2, Line Find Relay contact points 6, 7, the normally closed contact points 6, 5 of the Coincidence Check relay CC, the transferred contacts 8, 9 of the Read Check Suppress Relay RCS and the isolation diode CR1017. The Read Check Suppress Relay RCS, shown in both Figs. 14 and 30, was previously energized through the contacts of the front paper switch 32 of the Ledger Lister after the leading edge of the document actuated the rear paper switch 34 therein to energize the Read Switch Relay RS (Fig. 16) and to de-energize the Read Relay R (Figs. 14 and 30) and is held energized thereafter through its own contacts 16, 17 in a holdin circuit which supplies operating voltage to the coil of RCS through carriage cam switch C1, while the latter switch is closed from 350 to 185 degrees of rotation of the program cam shaft. If the correct number of pulses have not been received from the magnetic tape on the card fed through the Ledger Lister or if coincident pulses have been applied therefrom to the information and complement channels of the accounting apparatus, the levels of the stepper switch or clock device will not be reset to their home position and/or the contacts of the coincidence check circuit will be open to prevent energization of the Read Check Relay RC, thus signifying that a read check has not been made.

However, if a read check has been attained, the Read Check Relay RC will be energized to open its contacts 5, 7 contained in the energizing circuit of the Machine Block Solenoid of Fig. 30 and disable the machine block. The contacts 17, 16 of the RC relay will close to energize the Motor Bar #2 Solenoid of Fig. 28 and initiate an accounting machine cycle.

During this cycle, the information, which was sensed from the ledger card fed through the Ledger Lister and stored in the transfered contacts of the information relays of the accounting apparatus, is transferred by means of the timing generator and rack stop solenoids of the read-in unit to arrest the amount actuator racks and store the information in the crossfooter of Register A of the accounting machine, as previously described herein. Although the print bars of the printing section of the accounting machine are raised during the forward movement of the actuator racks, a control pin is provided in the mechanical control section of the program panel thereof to block the hammer section and prevent the accounting machine at this time from printing the information transferred from the whiffle tree contact matrix section into the mechanical storage accumulators of the accounting machine.

At 175 degrees of rotation of the main cam shaft of the accounting machine, a circuit is completed to energize the Program 2 Relay PR2 of Fig. 30 from a 115 volt supply line through machine cam actuated switch F1, the normally closed contact points 15, 16 of de-energized Ledger Lister relay LL2, and the transferred contacts 16, 18 of the Line Find Relays LF which are still held energized through carriage timing cam switch C4, since the carriage program shaft is still sitting at its 144 degree position. Relay PR2 then closes its contact points 18, 19 to supply operating voltage from the source of potential connected to carriage cam switch C4 to hold itself energized and closes its contacts 16, 17 to re-energize the Program Cam Unit Clutch Solenoid through the transferred contacts 8, 9 of the Carriage Motor Start Relay CMS, the Program Cam Unit Clutch Solenoid having been de-energized by the opening of carriage cam switch C2 at 124 degrees of the program cam shaft rotation. The Read Check relay being held in through line find, completes a circuit through its contact points 14, 15, connected to operating voltage through carriage cam switch C11, to keep the Carriage Motor Start Relay CMS energized and to maintain the carriage motor energized until carriage cam switch C11 opens at 212°.

This action starts the carriage program cam shaft to rotate through its second program cycle extending from 144° to 216°. At 196° of the program shaft rotation, carriage cam switch C4 opens to de-energize the Line Find Relays LF, which then drop out the Read Check relay RC and the Line Find Drop Out Relays LFDO. When the Line Find Drop Out Relays deenergize, CMS relay receives operating voltage from carriage cam switch C11 through the closure of the normally closed contact points 5, 6 of the Line Find Drop Out Relays LFDO to keep the carriage motor energized until 212° of the program cam shaft rotation.

The carriage of the accounting machine is still sitting in its original columnar carriage position to the right of the New Balance columnar position of the ledger form. In this position there is provided another pin in another control lane of the mechanical control section of the program panel to cause the carriage to tabulate upon the completion of the first accounting machine cycle to the "New Balance" position and to initiate an automatic repeat operation and a second machine cycle, during which the quantity stored in crossfooter "A" is transferred to Register B and the machine prints out the transferred information on the new form, provided an account verification check has been received as described below.

ACCOUNT VERIFICATION

During the insertion of the new card into the carriage of the accounting machine, the operator indexes into the keyboard thereof the two digits of the account number to be vertified against the account number sensed from the ledger card conveyed through the Ledger Lister. During the first machine cycle initiated after a read check has been received by energization of the Read Check relay RC, the actuator racks of the accounting machine have moved forward until the amount racks have been arrested by the rack stop solenoids of the read in unit. The actuator racks associated with the account verification keys are arrested through the depressed account verification keys. Before the actuator racks are returned to their rearward position, the decimal switch read out assembly, through the mechanism described in the aforementioned copending U.S. patent application S.N. 492,-232, is raised to contact the coded slides provided on the arrested account verification key actuator racks and the amount actuator racks to sense the differential positions thereof and set the individual data switches of each decimal switch unit in accordance with the setting of the corresponding actuator rack with which it is asosciated. The rack information is thus stored in the individual decimal switches, which are then retracted as a unit assembly from the actuator racks and the latter returned to their normal reset positions at the rear of the accounting machine.

At 210 degrees of the first accounting machine cycle, cam actuated switch F8 in the base machine closes its contacts to supply operating voltage over a circuit which includes the normally closed contact points 5, 6 of de-energized Account Verification #2 Relay AV2, the back contacts 5, 6 of the de-energized Account Write Relay AW to the common contact of the decimal switch read out unit associated with actuator rack 10 designated for the lowest order account verification digit. Depending then upon which data switch output contact of this decimal switch unit has been previously closed, the circuit continues from that data output contact and the particular output bus conductor associated therewith to the account verification whiffle tree section illustrated in Fig. 32.

If the account number indexed into the accounting machine verifies against that which was sensed from the magnetic tape of the card fed through the Ledger Lister and was stored in the transferred contacts of column 10 of the information storage relays designated for account number information storage, the aforesaid circuit will be completed from the bus line connected to the aforesaid data switch output contact, through the appropriate contacts of the information storage relays provided for rack 10 and then through the back contacts 8, 7 of the de-energized Write Pulse Gate Relay WPG to energize the Account Verification Relay AV1, which closes its contact points 11, 10 and 15, 16. Contact points 11, 10 provide an energizing circuit to hold AV1 energized through the restored back contacts of machine cam actuated switch F2 after machine cam switch F8 opens at 300 degrees of the base machine cycle, while the contact points 15, 16 of AV1 provide operating voltage from machine timing cam switch F2 to energize Account Verification Relay AV2. AV2 then opens its contacts 5, 6, interrupting the energizing circuit from machine cam switch F8 through the decimal read out switch circuit and whiffle tree relay contacts over which AV1 was initially energized, and closes its contact points 10, 11 to complete an account verification check circuit through the back contacts 13, 12 of the still de-energized Account Write Relay AW to the common or input terminal of the decimal switch read out unit provided for actuator rack 11 or the next highest order account verification digit.

Assuming that this indexed digit also verifies against that sensed from the card fed through the Ledger Lister, the second account verification check circuit is completed from the bus conductor leading from the activated data switch output contact of the decimal read out switch unit associated with rack 11 and through the appropriate contacts of the account verification information storage relays contained in the eleventh column of the information storage relays, the normally closed contacts 15, 16 of relay AW and the transferred contacts 16, 17 of relay AV2 to energize Account Verification Relay AV3.

If an account vertification check were not obtained for AV2 and/or AV3 relays, the contact points 12, 13 of either one or both of these relays would remain closed and an energizing circuit would be completed through the closing of carriage cam switch C7 at 200 degrees of the carriage program cam shaft rotation to keep the Machine Block Solenoid energized and prevent the accounting machine from initiating the second machine cycle. The branch circuit to the Machine Block Solenoid through the contacts 5, 6 of the Read Check Relay RC would be electrically disabled after the Read Check relay had dropped out at 196° of the carriage program cam shaft rotation and had restored its contacts 5, 6 to their normally closed position, since carriage timing cam switch C1 would prevent operating voltage to be applied therefrom to the Machine Block Solenoid when cam switch C1 opened at 185 degrees of the carriage program cam shaft rotation.

If a complete account vertification has been received, the machine block is removed to permit the accounting machine to execute a second base machine cycle as directed by the pin in a lane of the control panel calling for an automatic repeat operation when the carriage tabulates to the "New Balance" printing position. The energizing circuit for the Balance Transfer Relays BT1 and BT2 in the accounting machine and relay BT3 in the Ledger Lister is interrupted through the opening of lane switch S4034, since a contact pin for actuating this switch is not provided in the lane designated therefor in the "New Balance" position. The energization of these relays, however, is retained under this condition through an auxiliary circuit established by the transferred contacts 10, 11 of relay BT2 connected to carriage cam switch C10, which is closed from 130 to 330 degrees of the carriage shaft rotation.

With the carriage at rest in the Balance Position, a circuit will be completed from a 115 volt supply line through now closed carriage cam actuated switch C8, since the carriage program cam shaft is at its 216 degree position, the transferred contact points 16, 17 of energized OP1 relay, "In-Tab B" switch S4045, and the now closed Balance Position Relay BP. Relay BP then transfers its contacts 9, 10 shown in Fig. 31 to complete an energizing circuit from carriage cam switch C8, the restored contacts 12, 13 of BS3 relay that was dropped out by the opening of carriage cam switch C5 at 196 degrees of the carriage program cam shaft rotation, the now closed contacts 9, 10 of the just energized BP relay, and the closed contacts 10, 11 of BTR relay to energize the Balance Relay, B, which holds itself energized through its contacts 16, 17 shunting contacts 10, 11 of BTR. The Balance Transfer and Reconstruct Relay BTR was initially energized when the carriage was in its original position through lane switch S4036 and "In-Tab A" switch S4044 connected to +115 volts D.C., and thereafter holds itself energized through its transferred contacts 18, 19 and carriage cam switch C10, which is closed from 130 to 330 degrees of the program cam shaft now sitting at its 216 degree position.

The Balance Position BP and Balance B relays being energized, a circuit is then completed from +115 volts D.C. through base machine cam switch F2, when the latter transfers its contacts at 20 degrees of the just initiated second accounting machine cycle, and then through the transferred contacts 14, 15 of relay BP and the transferred contacts 11, 10 of the Balance Relay B to energize the #3 Program Relay PR3 to prepare the carriage cam shaft for its third program of rotation from 216 to 288 degrees. Relay PR3 transfers its contacts 10, 11 shown in Fig. 26 to supply +115 volts D.C. through carriage cam switch C7, closed from 200 to 268 degrees of the carriage program cam shaft rotation, and then through isolation diode CR1012 to re-energize the Carriage Motor Start Relay CMS and the carriage drive motor which were dropped out when carriage cam switch C11 opened at 212 degrees of the program shaft rotation. Contacts 8, 9 of CMS reclose to complete an energizing circuit for the Program Cam Unit Clutch Solenoid from carriage cam switch C7, the now closed contacts 10, 11 of PR3, and isolation diode CR1011, thereby applying the carriage motor drive to the program cam shaft.

The Program Cam Unit Clutch Solenoid is de-energized when carriage cam switch C7 breaks at 268 degrees of the program cam shaft rotation. However, the cam shaft will rotate due to the mechanical operation of the program clutch until 288 degrees where it will be stopped and detented into position. Energization of the Program Cam Unit Solenoid during the earlier portion of the base machine cycle completes the program cam shaft rotation from 216 to 288 degrees before the new balance is printed. Rotation of the cam shaft causes certain mechanical operations to occur in the carriage, as follows: The paper drive feed rolls and the magnetic head assembly in the carriage of the accounting machine are lowered onto the record medium in preparation for driving the record medium into the carriage as soon as the carriage platen pressure rollers release the form after printing.

Electrical controls are also set up during rotation of the program cam shaft. The Balance Relay B and the Balance Position Relay BP have been picked. At 270°, carriage cam switch C3 makes to supply operating voltage to energize the #1 Back Stop Relay BS1. The energization of BS1 occurs subsequent to the lowering of the head assembly onto the form and causes a current to flow through the line find head, in such a direction as to erase the line find track of the magnetic tape. The circuit for this operation is as follows: From 150 volts through contacts 19 and 18 of BS1 shown in Fig. 18, and contacts 10 and 11 of the Balance Relay B connected to the line find head, through the complement write tube plate resistor to 250 volts. Carriage cam switch C3 in closing also supplies voltage to one side of the Carriage Open contact S5024, which now will be open, since the carriage is closed for printing. When the carriage has opened far enough that the platen pressure feed rolls release the paper, the Carriage Open contact will close energizing the Drive Clutch Solenoid, this sequence of events occuring after the base machine cycle has been completed.

The machine, after printing and also after the program cam shaft has reached 288°, will have erased the line find track and the carriage pressure rollers will feed the paper downwardly into the carriage throat as soon as the platen pressure rollers release the paper and the Carriage Open contact makes. This occurs immediately after the base machine cycle, and as the carriage open contact makes, the Drive Clutch Solenoid is energized, causing the paper to be driven into the carriage. The reverse clutch had been set in the correct position by the picking of the Carriage Motor Start Relay CMS which establishes a circuit traced from the 115 volt source through CMS points 14 and 15, and points 12 and 13 relay BS2 to energize the Reverse Clutch Solenoid, which was energized prior to the program cam shaft operation.

When the Drive Clutch Solenoid is energized, the drive clutch engages and causes the feed rolls to turn so as to drive the paper into the carriage, erasing the line find track. The line find track will be erased until the bottom edge of the paper strikes the roller of the L-3 paper contact S5003 of Fig. 24, which open the circuit to the Drive Clutch Solenoid and also to the #1 Back Stop Relay. Opening the circuit to BS1 causes the erase circuit through the heads to be opened through the opening of contacts 18 and 19 of BS1, making the line find head inactive. Opening the circuit to the Drive Clutch Solenoid causes the drive clutch to be disengaged, as previously described, and causes the record medium to come to rest in a position corresponding to Line Minus 4.

The record medium is now ready to be ejected from the carriage, during which time the new balance will be encoded magnetically in the data and complement tracks of the magnetic tape.

This feed reversal and balance recording cycle is initiated upon de-energization of BS1 which allows BS2 and then BS3 to be picked in sequence. BS2 is energized over the following circuit traced from the 115 volt source through carriage cam switch C5 and the restored contacts 5 and 6 of de-energized relay BS1. BS2 then opens the circuit to the Reverse Clutch Solenoid causing the reverse clutch to drop out, which in turn reverses the drive to the feed rolls. BS2 also establishes an energizing circuit for the Write Relay W of Fig. 31 traced from the 115 volt source, through carriage cam switch C8, contacts 10 and 11 of relay BS2, and contacts 18, 19 of relay B to the Write Relay coil W to ground. This same voltage is also applied through points 16, 17 of relay BT2 through the cable and cable connector P9N to initiate the next card feed cycle therein.

Contacts 16 and 17 of BS2 in closing energize BS3 relay, which causes the Balance Relay B to drop out, and reenergizes the Drive Clutch Solenoid. Dropping out the Balance Relay B isolates the line find head 694 from the 150 volt source so as to prevent any further writing therethrough, and energizing the Drive Clutch Solenoid causes the paper to be driven outwardly from the carriage.

The Write relay W in being picked completes circuits through both the complement and data heads of the magnetic head package in the accounting machine and causes both the data and complement tracks to be erased through the following circuits as the paper is being ejected from the carriage: From the 150 volt source, through contact points 18 and 19 of the Write relay W, through the data head 691, through the write tube plate resistor to 250 volts; and also from the 150 volt source, through points 8 and 9 of W, through the complement head 693 and through the complement write tube plate resistor to 250 volts.

As the bottom edge of the record medium passes out from under the operating roller of the Line Minus One paper contact switch S5002, that contact will close or make, causing the Write Plus Gate Relay WPG of Fig. 25 to be picked over an energizing circuit which extends from the 115 volt source through the Write Pulse Gate relay coil, through contacts 14 and 15 of the Write Relay W, through contacts 16 and 17 of relay OP2, and through the Line Minus One paper contact switch S5002 to ground. Energizing the Write Pulse Gate Relay initiates the scanning of the decimal read-out switches through which the new balance information is recorded magnetically on the record medium, as described in detail in the Write Operation, Section 2, of the aforementioned principal Deighton application.

After the 48 bits of balance information have been recorded, approximately 60 milliseconds of time remains before the record medium passes out from under the operating roller of the alignment contact. During this time interval, a checking operation via step switch 3, tier 4 is performed. If the writing operation has been correct, the rotor contact of step switch 3, tier 4 will be sitting on contacts B, J or N. In the 60 milliseconds, if the step switch 3, tier 4 rotor contact is positioned on one of those contacts just mentioned, a circuit will be completed to energize the Write Check Relay WC of Fig. 31 from the 115 volt source through contacts 10, 11 of OP1, through contacts D, J, or N of tier 4 of SS3 to energize the pick coil of the Write Check Relay. The Write Check Relay WC will then be held energized by carriage cam C8 for the rest of the cycle.

After the paper moves out from under the paper drive feed rolls, the Write Check Relay WC will be held through a normally closed operate point and a normally closed CMS point until the next form is inserted. Energizing this Write Check Relay allows the next subsequent record medium or card operation to start. If this relay is not energized, the next record medium on being inserted into the carriage will not start the operation of the accounting machine. This locking action is accomplished by inserting Write Check points 6 and 7, into the pick circuit of the Operate Relays OP1 and OP2. If this point is not closed, the operate relays will not be picked by the insertion of the next card. The operator can energize the Write Check Relay by manually depressing the reset key to clear the machine for the insertion of a new form.

The record medium upon being driven past the alignment contact, allows that contact to open, dropping out the Operate Relays. This action initiates the rotation of the main program cam shaft from 288° to 360° over the following circuit traced from the 115 volt source, carriage timing cam switch C8, now closed points 12 and 13 of relay OP2, points 5 and 6 of relay BP and isolation diode CR1013 connected to the CMS relay. Also from the 115 volt source, operating voltage is sent through carriage cam switch C8, through contact points 12 and 13 of relay OP2, points 5 and 6 of relay BP, isolation diode CR1014, and points 8 and 9 of relay CMS to energize the carriage Program Cam Unit Clutch Solenoid of Fig. 29. This latter solenoid will be held energized until carriage cam switch C8 breaks at 340° at which time it is de-energized, but the program cam shaft will continue to turn until the clutch unit is latched in a detented position at 360°.

During this rotation of the program cam shaft various mechanical actions take place. The paper drive feed rolls and the magnetic head assembly are lifted away from the paper, the paper pusher arms are inserted into the line of paper feed, and the platen spacing mechanism is operated causing the platen to space one line, as described more fully in the aforementioned principal Deighton application. During this portion of the rotation of the program cam shaft, the following electrical circuits are acted upon: Carriage cam switch CC5 breaks at 312 degrees, dropping out both BS2 and BS3 relays. Carriage cam switch C10 breaks at 330 degrees, dropping out the Release relay, REL., of Fig. 29. With the breaking of carriage cam switch C8, the Write Relay W and the Balance Position Relay BP are dropped out. Dropping out of the Write Relay inactivates the writing circuit through the data and complement heads. Dropping out the Balance Position relay, in conjunction with the other relays just mentioned, prepares the machine for the insertion of a new form. Also, at 295 degrees of this last carriage cycle, carriage cam C9 will make to supply operating voltage to energize the Reset Relay, RES., of Fig. 32. Energizing this relay, resets all step switches to their home position, in the event that either step switch 1 or 2 has gotten out of position and will cause step switch 3 of Fig. 24 to step from contacts D, J or N to contacts B, F or L and contacts 4, 8 and 12, to contacts 2, 6 or 10, any of which are the home positions for step switch 3. The machine having completed an overall operational cycle, the carriage will tabulate back to its aforesaid original position under the control of a mechanical tab pin in the New Balance position of the program panel and is now ready to receive the next record medium.

It will be noted from the foregoing description that the circuitry required to control the card selection is different in the Balance Transfer Operation than in the Trial Balance Operation in that a card is not fed when a re-check is received from the information transfer, but only when the accounting machine starts a write operation. The accounting machine will enter a write operation when 115 volts D.C. is applied to the Write Relay W, as described above. When this voltage is applied to the Write Relay coil it is also applied down through points 17 and 16 of the Balance Transfer 2 Relay BT2 and through the cable and cable connector P9–N to energize the Picker Delay relay in the Ledger Lister. The Picker Delay relay is a ¼ second delay relay and insures that the next card being fed will not be sending information through the lines into the accounting apparatus before the control circuitry thereof is ready to receive that information after fully completing a write and reset operation in the accounting machine. The Picker Delay Relay points 6 and 7 in the Ledger Lister on closing will supply operating voltage through the normally closed points 5 and 6 of the Jammed Feed Relay JF and through the normally closed points 12 and 13 of the Single Cycle Relay SC to energize the Picker Clutch Relay PC. Energizing the Picker Clutch Relay will then cause another card feed in the Ledger Lister, as previously described.

The No Feed and Jammed Feed switch control on the Ledger Lister will operate the same for this Balance Transfer operation as for the Trial Balance operation. During Balance Transfer, contact points 12 and 13 of relay BT3 will open preventing any voltage from being applied to the Ledger Lister Error Reset Relays, as error resetting for this mode of operation is controlled by the control circuitry of the accounting apparatus, as indicated previously herein.

What is claimed is:

1. The combination with a variable storage, listing and totaling device for storing, listing and totaling numerical information contained on magnetizable record members in the form of a predetermined number of magnetically polarized pulses constituting a magnetically coded pulse message thereon, of a cyclically operable form feeding and magnetic code reading device including a magnetic sensing head contained in a reading station therein deriving electrical pulses independent of the cyclic timing of the feeding device from a magnetized record member conveyed past the sensing head, an operative interconnection between said devices for supplying electrical pulses sensed from a record member conveyed past the magnetic sensing head to the variable storage, listing and totaling device, pulse count checking means contained in said variable storage, listing and totaling device checking for receipt of a predetermined number of pulses supplied thereto from said form feeding and magnetic code reading device and control means operated from said pulse checking means and supplying a control signal to initiate operation of said variable storage, listing and totaling device and another control signal to said form feeding and magnetic code reading device to feed another record member past the magnetic sensing head if a predetermined number of pulses corresponding to the predetermined number of pulses on the previously fed record member have been supplied to the variable storage, listing and totaling device.

2. The combination with a variable storage, listing and totaling device for storing, listing and totaling numerical information contained on magnetizable record members in the form of a predetermined number of magnetically polarized pulses constituting a magnetically coded pulse message thereon, of a cyclically operable form feeding and magnetic code reading device including a magnetic sensing head contained in a reading station therein deriving electrical pulses from a magnetized record member conveyed past the sensing head, an operative interconnection between said devices for supplying electrical pulses sensed from a record member conveyed past the magnetic sensing head to the variable storage, listing and totaling device, means contained in said form feeding device controlling the transmission of pulses over the operative interconnection between the said devices including first control means actuated by a fed record member enabling said operative interconnection for transmission of pulses thereover to said variable storage, listing and totaling device before the message on the magnetizable record member has reached the magnetic sensing head and second control means actuated by said fed record member in said form feeding device after the message on the magnetizable member has passed the magnetic sensing head for disabling the operative interconnection between said devices, pulse checking means contained in said variable storage, listing and totaling device operated from said second record actuated control means in said form feeding and magnetic code reading device and control means contained in said variable storage, listing and totaling device operated from said pulse checking means and supplying a control signal to initiate operation of the variable storage, listing and totaling device and another control signal to said form feeding and magnetic code reading device to feed another record member past the magnetic sensing head contained therein if a predetermined number of pulses have been supplied to the variable storage, listing and totaling device as determined by said pulse checking means.

3. Apparatus for automatically feeding, reading, listing and totaling magnetically coded record members having a magnetizable storage portion receiving numerical information magnetically coded thereon, said apparatus comprising, in combination, a cyclically operable form feeding and magnetic code reading device including a form hopper receiving a stack of magnetically coded record members therein, form separating and feeding means for separating a record member from the stack and feeding it along a predetermined path, and magnetic sensing means in the path of a fed record member sensing the information thereon and deriving electrical signals therefrom representative of said information; and a cyclically operable accounting device including a platen having a print receiving record medium thereon, a plural order series of differentially positionable actuators, printing means and accumulating means both operated from said actuators, electrical information storage means receiving electrical signals from said magnetic sensing means, electrical read-in means controlled from said information storage means and including electrically energizable means for arresting said actuators at different positions corresponding to the various orders of information sensed by said sensing means and stored in said storage means, and control means initiating a cycle of operation of said accounting device to read the information stored in said storage means into the accumulating means and print said information on the record medium in the platen thereof and also initiating a cycle of operation of said form feeding and magnetic code reading device to feed another magnetically coded record member therethrough while the accounting device is listing and accumulating the information sensed from the previous magnetically coded record member fed by said form feeding device.

4. The combination with a magnetic code reading, variable storage, listing and totaling device for reading, storing, listing and totaling numerical balance information contained on magnetically coded documents, said device including a cyclically operable accounting device comprising a record bearing carriage portion having a magnetic transducer therein and a base portion including a plural order series of differentially positionable actuators therein and drive means for moving said actuators, printing means and accumulating means both operated from said actuators, electrical information storage means normally connected to said magnetic transducer in said carriage portion, electrical read-in means controlled from said information storage means arresting the actuators at different positions corresponding to the various orders of information stored in the information storage means, and electrical read-out means sensing the actuator positions and coupled to the magnetic transducer in the carriage portion of the accounting device for causing information corresponding to the actuator positions to be entered on the record in the carriage of the accounting device; of a cyclically operable automatic form feeding and magnetic code reading device remote from said first named device and including a form hopper receiving a stack of magnetically coded documents therein, form separating and feeding means for separating a document from the stack and feeding it along a predetermined path, and magnetic sensing means in the path of a fed document sensing information stored thereon; control means operated from said first named device for coupling said magnetic sensing means of said form feeding and magnetic code reading device to the information storage means of said first named device in place of the magnetic transducer contained in the carriage portion thereof to transfer the information on a document fed by said feeding device past the magnetic sensing means therein into the electrical information storage means of the accounting device, means operable after the aforesaid information has been transferred into the information storage means to initiate operation of the accounting device responsive to said information, means subsequently actuated during the operation of the accounting device supplying electrically encoded information read out of the accounting device through the read-out means thereof to the magnetic transducer in the carriage portion to record the latter information on the record in the carriage thereof and also to supply a control signal to initiate another cycle of operation of said feeding device to feed another magnetically coded document therefrom past the magnetic sensing means.

5. Apparatus for automatically transferring previously coded balance information on record members having a magnetizable information storage portion thereon comprising a cyclically operable form feeding and magnetic code reading device including a form hopper receiving a stack of magnetically coded record members therein each having balance information magnetically encoded thereon, form separating and feeding means for separating a record member from the stack and feeding it along a predetermined path, and magnetic sensing means in the path of a fed record member sensing the information thereon and deriving electrical signals therefrom representative of said information; and a cyclically operable accounting device having a carriage portion and a base portion, said carriage portion receiving a magnetizable document to which the information contained on a corresponding record member fed through said form feeding device is to be transferred and having a magnetic transducer therein, said base portion including a plural order series of differentially positionable actuators, printing means and accumulating means both operated from said actuators, electrical information storage means connected to receive electrical signals from said magnetic sensing means in said form feeding device, electrical read-in means controlled from said information storage means and including electrically energizable means for arresting said actuators at different positions corresponding to the various orders of information sensed by said sensing means and stored in said information storage means, decimal read-out means sensing the actuator positions and coupled to said magnetic transducer in the carriage portion of said accounting device for causing information corresponding to the actuator positions to be entered on the magnetizable portion of the document in the carriage of the accounting machine, and control means initiating a cycle of operation of said accounting device to transfer the information stored in said storage means into the accumulating means thereof and initiating a subsequent cycle of operation during which the information stored in the accumulating means is read out by said read-out means and recorded in encoded magnetizable form on the magnetizable portion of the document in the carriage of the accounting machine through the magnetic transducer thereof, and control means initiating a cycle of operation of said form feeding and magnetic code reading device to feed another magnetically coded record member therethrough upon the initiation of a magnetic recording cycle of the accounting device.

6. The combination with a variable storage, listing and totaling device for storing, listing and totaling numerical information contained on magnetizable record members in the form of magnetically polarized pulse areas providing a magnetically coded pulse message thereon, of an automatic form feeding and magnetic code reading device cyclically operable to feed successive magnetically coded record members from a stack of such members received therein past a magnetic sensing head contained in a reading station therein deriving electrical pulses from a magnetically coded record member conveyed past the magnetic sensing head, an operative interconnection between said devices supplying electrical pulses sensed from a record member conveyed past the sensing head to operate said variable storage, listing and totaling device, pulse transmission means controlling the transmission of pulses over the operative interconnection between said devices including means actuated at the reading station by a fed record member before the magnetic message on the member has reached the magnetic sensing head enabling transmission of pulses over said interconnection and means subsequently actuated in the course of travel of said record member after the magnetic message thereon has passed the head disabling the transmission of pulses over the interconnection, and control means operable after the message on the record member has been transferred to said variable storage, listing and totaling device to initiate a cycle of operation thereof and to supply a control signal therefrom to said form feeding device to feed another record member past the magnetic sensing head.

7. The combination with a variable storage data processing device for processing information magnetically encoded on magnetically striped record members providing a magnetically coded message between the striped ends of the record members; of an automatic form feeding device receiving a stack of such members and cyclically operable to feed successive record members along a predetermined path, a magnetic sensing head in the feed path of said members for deriving electrical signals from a record member intercepted by said head, electrical information storage means in said first named device adapted to be connected to said magnetic sensing head for receiving electrical signals therefrom, means actuated by a fed record member after the magnetic striping thereon has been intercepted by said head but before the start of the message on the striped member has been intercepted by the head for connecting the head to the information storage means, means subsequently actuated in the course of travel of said record member after the message thereon has passed the head but before the magnetic striping on the member has passed the head for disconnecting the head from said information storage means, and control means operable after the message on the record member has been transferred into said information storage means to initiate operation of said first named device and to supply a control signal to said automatic form feeding device to feed another record member therefrom past the sensing head.

8. The combination with a variable storage, listing and totaling device for storing, listing and totaling numerical information contained on magnetizable record members in the form of a predetermined number of magnetically polarized pulse areas constituting a magnetically coded pulse message thereon, of a cyclically operable form feeding and magnetic code reading device including a magnetic sensing head contained in a reading station therein deriving electrical pulses from a magnetized record member conveyed past the sensing head, an interconnection between said devices for supplying electrical pulses sensed from a record member conveyed past the magnetic sensing head to the variable storage, listing and totaling device, pulse count checking means contained in said variable storage, listing and totaling device checking for receipt in said first named device of a predetermined number of pulses from said form feeding and magnetic code reading device, control means operated from said pulse count checking means and supplying a control signal to initiate operation of said first named device and another control signal to said form feeding device to feed another record member past the magnetic sensing head if a predetermined number of pulses have been supplied to the first named device, and form stopping means in said form feeding and magnetic code reading device operated from said pulse count checking means of said first named device to stop the form fed past the reading station in the form feeding and magnetic code reading device if the correct number of pulses have not been received from the magnetic sensing head therein 9. Apparatus for automatically feeding, reading, listing and totaling record members having numerical information encoded in the form of sensable indicia thereon comprising, in combination, a cyclically operable form feeding device including a form hopper receiving a stack of coded record members therein and form separating and feeding means for separating a record member from the stack and feeding it along a predetermined path; indicia sensing means in the path of a fed record member sensing the information thereon and deriving electrical signals therefrom representative of said information; and a cyclically operable accounting device including a platen having a print receiving record medium thereon, a plural order series of differentially positionable actuators, printing means and accumulating means operated from said actuators, electrical information storage means receiving electrical signals from said sensing means, and electrical read-in means controlled from said information storage means including electrically energizable means for arresting said actuators at different positions corresponding to the various orders of information sensed by said sensing means and stored in said electrical information storage means; and control means operable upon transfer of information from a sensed record member into said storage means initiating a cycle of operation of said accounting device to read the information stored in said storage means into the accumulating means and print said information on the record medium in the platen thereof and also initiating a cycle of operation of said form feeding device to feed another coded member past said sensing means while the accounting device is listing and accumulating the information sensed from the coded member previously fed by said form feeding device.

10. The combination with a cyclically operable variable storage, listing and totaling device for storing, listing and totaling information contained on encoded record members in the form of a predetermined number of sensable pulse code indicia constituting a coded pulse message thereon, of a cyclically operable form feeding device including a form hopper receiving a stack of coded record members therein and form separating and feeding means for separating a record member from the stack and feeding it along a predetermined path; indicia sensing means in the path of a fed record member sensing the information thereon and deriving electrical pulse signals representative thereof independent of the cyclic timing of the feeding device; pulse count checking means contained in said variable storage, listing and totaling device checking for receipt of a predetermined number of pulses supplied thereto from said sensing means, and control means operated from said pulse count checking means and supplying a control signal to initiate operation of said variable storage, listing and totaling device and another control signal to said form feeding device to feed another record member past the sensing means, while the variable storage, listing and totaling device is listing and totaling the information sensed from the coded record member previously fed by the form feeding device, if a predetermined number of pulses have been supplied from the previously fed record mmeber to the variable storage, listing and totaling device.

11. Apparatus for automatically feeding, reading, listing and totaling record members having numerical information encoded in the form of a predetermined number of sensable pulse code indicia constituting a coded pulse message thereon comprising, in combination, a cyclically operable form feeding device including a form hopper receiving a stack of coded record members therein and form separating and feeding means for separating a record member from the stack and feeding it along a predetermined path; indicia sensing means in the path of a fed record member sensing the information thereon and deriving electrical pulse signals therefrom representative of said information; and a cyclically operable accounting device including a platen having a print receiving record medium thereon, a plural order series of differentially positionable actuators, a printing means and accumulating means operated from said actuators, pulse count checking means receiving pulses from said sensing means and checking for receipt of a predetermined number of pulses therefrom, electrical information storage means receiving electrical signals from said sensing means, electrical read-in means operable from said electrical information storage means including electrically energizable means for arresting said actuators at different positions corresponding to the various orders of information sensed by said sensing means and stored in said storage means, and control means operated from said pulse count checking means and supplying a control signal to initiate operation of said accounting device and another control signal to said form feeding device to feed another record member past the sensing means if a predetermined number of pulses have been supplied to the accounting device.

12. Apparatus for processing record members having numerical account number and amount information encoded in the form of sensable indicia thereon comprising, in combination, a cyclically operable form feeding device including a form hopper receiving a stack of coded record members therein and form separating and feeding means for separating a record member from the stack and feeding it along a predetermined path; indicia sensing means in the path of a fed record member deriving electrical signals representative of the information thereon; and a cyclically operable accounting device including accumulating and computing mechanism, a keyboard having a plurality of amount keys for indexing of account number and new amount information therein, electrical read-out means responsive to indexing of account number information into the accounting device, electrical information storage means receiving signals from said sensing means and storing account number and old balance information therein corresponding to the information on a fed record member sensed by said sensing means, electrical read-in means operable to transfer old balance amount information stored in the electrical information storage means into the accounting device, account number verification control means under the joint control of said account number information storage means and the keyboard indexed account number read-out means enabling operation of the accounting device in the event of an account verification to compute a new balance from the old balance information transferred into the accounting device from the information storage means and the amounts entered in the accounting device through the keyboard thereof, and control means operable from the accounting device to feed another coded member from the form feeding device past the sensing means in the event of an account verification in the accounting device.

13. Apparatus for automatically transferring previously coded balance information on record members having a magnetizable information storage portion thereon comprising a cyclically operable form feeding and magnetic code reading device including a form hopper receiving a stack of magnetically coded record members therein each having balance information magnetically encoded thereon, form separating and feeding means for separating a record member from the stack and feeding it along a predetermined path, and magnetic sensing means in the path of a fed record member sensing the information thereon and deriving electrical signals therefrom representative of said information; and a cyclically operable accounting device having a carriage portion and a base portion, said carriage portion receiving a magnetizable document to which the information contained on a corresponding record member fed through said form feeding device is to be transferred and having a magnetic transducer therein, said base portion including a plural order series of differentially positionable actuators, printing means and accumulating means both operated from said actuators, electrical information storage means connected to receive electrical signals from said magnetic sensing means in said form feeding device, electrical read-in means controlled from said information storage means and including electrically energizable means for arresting said actuators at different positions corresponding to the various orders of information sensed by said sensing means and stored in said information storage means, read-out means sensing the actuator positions and coupled to said magnetic transducer in the carriage portion of said accounting device for causing information corresponding to the actuator positions to be entered on the magnetizable portion of the document in the carriage of the accounting machine, and control means initiating a cycle of operation of said accounting device to transfer the information stored in said storage means into the accumulating means thereof and initiating a subsequent cycle of operation during which the information stored in the accumulating means is read out by said read-out means and recorded in magnetizable form on the magnetizable portion of the document in the carriage of the accounting machine through the magnetic transducer thereof, and feed control means operated upon initiation of a magnetic recording cycle of the accounting device for controlling the initiation of a cycle of operation of the form feeding device and including means for delaying the feeding of another record member past said magnetic sensing means for reading thereof until completion of the magnetic recording cycle of the accounting device.

14. Apparatus for automatically transferring previously coded balance information on record members having a magnetizable information storage portion thereon comprising a cyclically operable form feeding and magnetic code reading device including a form hopper receiving a stack of magnetically coded record members therein each having balance information magnetically encoded thereon, form separating and feeding means for separating a record member from the stack and feeding it along a predetermined path, and magnetic sensing means in the path of a fed record member sensing the infomation thereon and deriving electrical signals therefrom representative of said information; and a cyclically operable accounting device having a carriage portion and a base portion, said carriage portion receiving a magnetizable document to which the infomation contained on a corresponding record member fed through said form feeding device is to be transferred and having a magnetic transducer therein, said base portion including a plural order series of differentially positionable actuators, printing means and accumulating means both operated from said actuators, electrical information storage means connected to receive electrical signals from said magnetic sensing means in said form feeding device, electrical read-in means controlled from said information storage means and including electrically energizable means for arresting said actuators at different positions corresponding to the vaious ordes of information sensed by said sensing means and stored in said information storage means, read-out means sensing the actuator positions and coupled to said magnetic transducer in the carriage portion of said accounting device for causing information corresponding to the actuator positions to be entered on the magnetizable portion of the document in the carriage of the accounting machine, and control means initiating a cycle of operation of said accounting device to transfer the information stored in said storage means into the accumulating means thereof and initiating a subsequent cycle of operation during which the information stored in the accumulating means is read out by said read-out means and recorded in magnetizable form on the magnetizable portion of the document in the carriage of the accounting machine through the magnetic transducer thereof, and control means initiating a cycle of operation of said form feeding and magnetic code reading device to feed another magnetically coded record member past said magnetic sensing means for reading of the member after a magnetic recording cycle of the accounting machine.

15. The combination with a variable storage data processing device for processing information magnetically encoded on magnetically striped record members providing a magnetically coded message between the striped ends of the record members; of an automatic form feeding device cyclically operable to feed successive magnetizable record members from a stack of such members received therein, a magnetic sensing head in the path of said members for deriving electrical pulses from a record member intercepted by said head, electrical information storage means in said first named device adapted to be connected to said magnetic sensing head for receiving electrical signals therefrom, means actuated after the magnetic striping on a fed record member is positioned adjacent said head but before the start of the magnetically encoded massage on a striped member intercepted by the head for connecting the head to the information storage means, means subsequently actuated in the course of travel of said record member past the head after the message thereon has passed the head but before the striped end of the member has passed the head for disconnecting the head from said information storage means, and control means operable after the message on the record member has been transferred into said information storage means to initiate operation of said first named device and to supply a control signal to said automatic form feeding device to feed another record member therefrom.

16. The combination with a cyclically operable variable storage, listing and totaling device for storing, listing and totaling information contained on encoded record members in the form of a predetermined number of orders of sensable pulse code indicia thereon, of a cyclically operable form feeding device including a form hopper receiving a stack of coded record members therein and form separating and feeding means for separating a record member from the stack and feeding it along a predetermined path; indicia sensing means in the path of a fed record member sensing the information thereon and deriving a number of electrical signal pulses representative thereof independent of the cyclic timing of the feeding device; pulse checking means contained in said variable storage, listing and totaling device coupled to said sensing means and checking for receipt of said predetermined number of orders of pulses supplied thereto from said sensing means, and control means operated from said pulse checking means and supplying a control signal to initiate operation of said variable storage, listing and totaling device and another control signal to said form feeding device to feed another record member past the sensing means, while the variable storage, listing and totaling device is listing and totaling the information sensed from the record members previously fed past the sensing means, if said predetermined number of orders of pulses representing all of the information encoded on said previously fed record member have been sensed and supplied therefrom to the variable storage, listing and totaling device.

17. Apparatus for automatically feeding, reading, listing and totaling record members having numerical information encoded in the form of a predetermined number of orders of sensable pulse code indicia constituting a coded pulse message thereon comprising, in combination, a cyclically operable form feeding device including a form hopper receiving a stack of coded record members therein and form separating and feeding means for separating a record member from the stack and feeding it along a predetermined path; indicia sensing means in the path of a fed record member sensing the indicia thereon and deriving a number of electrical signal pulses therefrom representative of said information; and a cyclically operable accounting device including a plural order series of differentially positionable actuators, printing means and accumulating means operated from said actuators, pulse checking means receiving pulses from said sensing means and checking for receipt of said predetermined number of pulse orders therefrom, electrical information storage means receiving electrical signals from said sensing means, electrical read-in means operable from said electrical information storage means including electrically energizable means for arresting said actuators at different positions corresponding to the various numerical orders of information sensed by said sensing means and stored in said storage means and control means operated from said pulse checking means and supplying a control signal to initiate operation of said accounting device and another control signal to said form feeding device to feed another record member past the sensing means if said predetermined number of pulse orders have been supplied to the accounting device.

References Cited in the file of this patent

UNITED STATES PATENTS 2,615,629    Dayger et al. _____ Oct. 28, 1952